(12) United States Patent
Decker et al.

(10) Patent No.: US 10,387,104 B2
(45) Date of Patent: Aug. 20, 2019

(54) AUDIO CONTROL FOR WEB BROWSER

(71) Applicant: Apple Inc., Cupertino, CA (US)

(72) Inventors: Kevin Decker, San Jose, CA (US);
Steven Falkenburg, Los Altos, CA (US); Alan Hshieh, Cupertino, CA (US); Patrick L. Coffman, San Francisco, CA (US); Ada Chan, Cupertino, CA (US); Richard Mondello, Mountain View, CA (US); Chanaka G. Karunamuni, San Jose, CA (US)

(73) Assignee: Apple Inc., Cupertino, CA (US)

( * ) Notice: Subject to any disclaimer, the term of this patent is extended or adjusted under 35 U.S.C. 154(b) by 524 days.

(21) Appl. No.: 14/869,981

(22) Filed: Sep. 29, 2015

(65) Prior Publication Data

US 2016/0357507 A1 Dec. 8, 2016

Related U.S. Application Data

(60) Provisional application No. 62/172,131, filed on Jun. 7, 2015.

(51) Int. Cl.
  *G06F 3/16* (2006.01)
  *G06F 3/0484* (2013.01)
  *G06F 16/957* (2019.01)
(52) U.S. Cl.
  CPC .......... *G06F 3/165* (2013.01); *G06F 3/04842* (2013.01); *G06F 3/04847* (2013.01); *G06F 16/957* (2019.01)
(58) Field of Classification Search
  CPC .. G06F 3/165; G06F 3/04842; G06F 3/04847; G06F 17/30899
  See application file for complete search history.

(56) References Cited

U.S. PATENT DOCUMENTS 7,502,480 B2 * 3/2009 Baudisch ............ G06F 3/04847
  381/104
8,280,541 B1  10/2012 Chen
  (Continued)

FOREIGN PATENT DOCUMENTS

WO  2015074548 A1  5/2015

OTHER PUBLICATIONS

International Search Report and Written Opinion for PCT Patent Application No. PCT/US2015/064329, dated Apr. 28, 2016, 11 pages.
(Continued)

*Primary Examiner* — Justin R. Blaufeld
(74) *Attorney, Agent, or Firm* — Dentons US LLP

(57) ABSTRACT

The present aspects relate to audio management for a web browser. For example, an electronic device such as a mobile device may enable a user to navigate to a webpage within a web browser. In some embodiments, the webpage may automatically initiate presentation of audio content. However, the user may wish to quickly silence the audio content that is playing without locating the media player controls of the audio content within the webpage. Accordingly, the present aspects provide audio control for a web browser. Specifically, an audio control affordance may be displayed at a noticeable and recognizable position or area in the web browser, and based on a determination that a webpage includes audio content and/or determination of playback of the audio content. The user may in turn readily adjust a property of the audio content.

78 Claims, 25 Drawing Sheets

(56) References Cited

U.S. PATENT DOCUMENTS

| | | | | |
|---|---|---|---|---|
| 8,681,203 B1* | 3/2014 | Yin | ................... | H04N 7/15 |
| | | | | 348/14.08 |
| 2004/0201608 A1* | 10/2004 | Ma | ................... | G06F 3/0481 |
| | | | | 715/719 |
| 2006/0069458 A1* | 3/2006 | Lee | ................... | G06F 3/0219 |
| | | | | 700/94 |
| 2006/0218500 A1* | 9/2006 | Sauve | ................... | G06F 3/0481 |
| | | | | 715/767 |
| 2006/0236255 A1* | 10/2006 | Lindsay | ................... | G06F 3/0481 |
| | | | | 715/766 |
| 2006/0291666 A1* | 12/2006 | Ball | ................... | G06F 3/165 |
| | | | | 381/58 |
| 2007/0244586 A1* | 10/2007 | Champion | ................... | G06F 3/165 |
| | | | | 700/94 |
| 2011/0113337 A1* | 5/2011 | Liu | ................... | G06F 3/0483 |
| | | | | 715/727 |
| 2014/0068434 A1* | 3/2014 | Filev | ................... | G06F 3/165 |
| | | | | 715/716 |
| 2014/0281983 A1* | 9/2014 | Xian | ................... | G06F 3/167 |
| | | | | 715/716 |
| 2015/0324166 A1* | 11/2015 | Lin | ................... | G06F 3/165 |
| | | | | 709/203 |

OTHER PUBLICATIONS

International Preliminary Report on Patentability for PCT Patent Application No. PCT/US2015/064329, dated Dec. 21, 2017, 9 pages.

* cited by examiner

AUDIO CONTROL FOR WEB BROWSER

CROSS-REFERENCE TO RELATED APPLICATIONS

This application claims priority to U.S. Provisional Patent Application No. 62/172,131, entitled "AUDIO CONTROL FOR WEB BROWSER," filed Jun. 7, 2015, the content of which is hereby incorporated by reference in its entirety for all purposes.

FIELD

The present disclosure relates generally to computer user interfaces, and more specifically to techniques for controlling audio in a web browser.

BACKGROUND

Electronic devices may present audio content of a webpage in a web browser. For example, a user may navigate, in the web browser, to the webpage having audio content. The webpage may present the audio content, and in some cases, in conjunction with video content. However, electronic devices may be limited in providing a way for managing the audio content of the webpage playing within the browser.

BRIEF SUMMARY

Some techniques for audio control using electronic devices, however, are generally cumbersome and inefficient. For example, existing techniques may use a complex and time-consuming user interface, which may include multiple contact inputs, key presses or keystrokes. Existing techniques require more time than necessary, detracting from the user's experience, and wasting user time and device energy. This latter consideration may be particularly important in battery-operated devices.

Moreover, web browsers often present multiple webpages to user, each in its own tab of the browser. Often, audio content being played is associated with a background tab of the browser and/or window.

In such cases, a user may have a difficulty identifying the source of the audio content and/or require multiple time consuming steps to identify the source of the audio content among multiple open tabs.

Accordingly, the present embodiments provide for electronic devices with faster, more efficient methods and interfaces for audio control for a web browser. Such methods and interfaces optionally complement or replace other methods for audio control for a web browser. Such methods and interfaces reduce the cognitive burden on a user and produce a more efficient human-machine interface. For battery-operated computing devices, such methods and interfaces conserve power and increase the time between battery charges.

The present embodiments provide for methods and/or interfaces that also reduce the number of unnecessary, extraneous, repetitive, and/or redundant inputs, and may create a faster and more efficient user interface arrangement, which may reduce the number of required inputs, reduce processing power, and reduce the amount of time for which user interfaces need to be displayed in order for desired functions to be accessed and carried out.

In accordance with some embodiments, a method is performed at an electronic device including a display and one or more audio output devices: displaying, on the display, a browser interface of a browser application, the browser interface including a first portion configured to display content in a set of tabbed windows that include a plurality of tabbed windows and a second portion distinct from the first portion that includes one or more control affordances, wherein displaying the second portion of the browser interface includes: in accordance with a determination that one or more of the tabbed windows includes audio content, displaying an audio control affordance in the second portion of the browser interface; while the audio control affordance is displayed, receiving a first input representing a selection of the audio control affordance; and in response to receiving the first input representing the selection of the audio control affordance, adjusting a property of the presentation of the audio content.

In accordance with some embodiments, an electronic device comprising: one or more processors; memory; a display and one or more audio output devices each coupled to the one or more processors and memory; and one or more programs stored in memory, the one or more programs including instructions for: displaying, on the display, a browser interface of a browser application, the browser interface including a first portion configured to display content in a set of tabbed windows that include a plurality of tabbed windows and a second portion distinct from the first portion that includes one or more control affordances, wherein displaying the second portion of the browser interface includes: in accordance with a determination that one or more of the tabbed windows includes audio content, displaying an audio control affordance in the second portion of the browser interface; while the audio control affordance is displayed, receiving a first input representing a selection of the audio control affordance; and in response to receiving the first input representing the selection of the audio control affordance, adjusting a property of the presentation of the audio content.

In accordance with some embodiments, a non-transitory computer-readable storage medium comprising one or more programs for execution by one or more processors of an electronic device, the one or more programs including instructions which, when executed by the one or more processors, cause the electronic device to: display, on a display, a browser interface of a browser application, the browser interface including a first portion configured to display content in a set of tabbed windows that include a plurality of tabbed windows and a second portion distinct from the first portion that includes one or more control affordances, wherein displaying the second portion of the browser interface includes: in accordance with a determination that one or more of the tabbed windows includes audio content, displaying an audio control affordance in the second portion of the browser interface; while the audio control affordance is displayed, receiving a first input representing a selection of the audio control affordance; and in response to receiving the first input representing the selection of the audio control affordance, adjusting a property of the presentation of the audio content.

Thus, devices are provided with faster, more efficient methods and interfaces for audio control for a web browser, thereby increasing the effectiveness, efficiency, and user satisfaction with such devices. Such methods and interfaces may complement or replace other methods for audio control for a web browser.

DESCRIPTION OF THE FIGURES

For a better understanding of the various described embodiments, reference should be made to the Description of Embodiments below, in conjunction with the following drawings in which like reference numerals refer to corresponding parts throughout the figures.

DESCRIPTION OF EMBODIMENTS

Figure 1A:
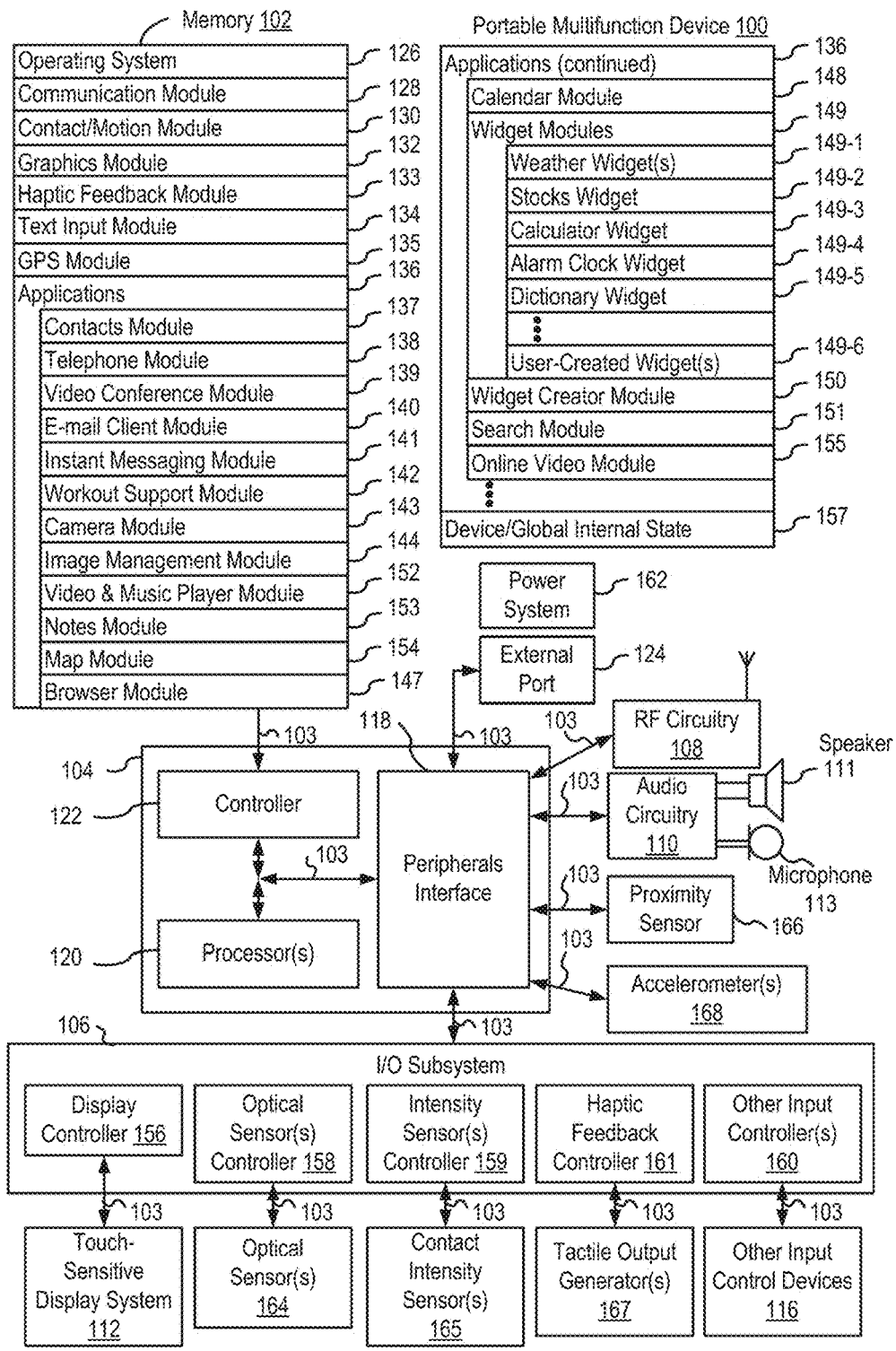
FIG. 1A is a block diagram illustrating a portable multifunction device with a touch-sensitive display in accordance with some embodiments.

The following description sets forth exemplary methods, parameters, and the like. It should be recognized, however, that such description is not intended as a limitation on the scope of the present disclosure but is instead provided as a description of exemplary embodiments.

The present embodiments generally relate to audio control and management for a web browser. For example, an electronic device such as a mobile device may enable a user to navigate to a webpage within a web browser. In some embodiments, the webpage automatically initiates presentation of audio content. However, the user may wish to quickly silence the audio content that is playing without locating the media player controls of the audio content within the webpage, or in some cases, silence or mute the presentation of the audio content when there are no media player controls associated with the audio content. Further, in some embodiments, the user may have multiple webpages open and presented as tabs in the web browser. In some embodiments, a web browser may present webpages in multiple windows.

As such, navigation to a particular webpage triggers the opening of one or more background webpages or tabs having presentation of audio content. In addition, a background tab that was previously silent can start playing audio suddenly, regardless of whether that tab was just triggered or selected to open in the web browser. Nonetheless, the user may be unable to readily identify which webpage and/or corresponding tab is presenting the audio content. Similarly, the user may wish to swiftly silence or control the audio that is playing in one or more of the background tabs, notably when audio content is currently playing in another tab as desired by the user, without having to tediously locate the undesired audio content playing in another webpage.

Accordingly, the present embodiments provide audio control for a web browser. Specifically, an audio control affordance is displayed at a noticeable and recognizable position or area in the web browser, and based on a determination that a webpage includes audio content and/or determination of playback of the audio content.

Accordingly, there may be a need for electronic devices that provide efficient methods and interfaces for audio control and management for a web browser. Such techniques can reduce the cognitive and/or physical burden on a user in controlling audio in a web browser, thereby enhancing efficiency and productivity. Further, such techniques can reduce processor and battery power otherwise wasted on redundant user inputs.

Below, FIGS. 1A-1B, 2, 3, 4A-4B, and 5A-5B provide a description of exemplary devices for performing the techniques for movement between multiple views. FIGS. 6A-6G illustrate exemplary user interfaces for readily moving between multiple views. The user interfaces in the figures are also used to illustrate the processes described below, including the process in FIGS. 7A & 7B.

Although the following description uses terms "first," "second," etc. to describe various elements, these elements should not be limited by the terms. These terms are only used to distinguish one element from another. For example, a first touch could be termed a second touch, and, similarly, a second touch could be termed a first touch, without departing from the scope of the various described embodiments. The first touch and the second touch are both touches, but they are not the same touch.

The terminology used in the description of the various described embodiments herein is for the purpose of describing particular embodiments only and is not intended to be limiting. As used in the description of the various described embodiments and the appended claims, the singular forms "a", "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The term "if" can optionally be construed to mean "when" or "upon" or "in response to determining" or "in response to detecting," depending on the context. Similarly, the phrase "if it is determined" or "if [a stated condition or event] is detected" can optionally be construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, Calif. Other portable electronic devices, such as laptops or tablet computers with touch-sensitive surfaces (e.g., touch screen displays and/or touchpads), are, optionally, used. It should also be understood that, in some embodiments, the device is not a portable communications device, but is a desktop computer with a touch-sensitive surface (e.g., a touch screen display and/or a touchpad).

In the discussion that follows, an electronic device that includes a display and a touch-sensitive surface is described. It should be understood, however, that the electronic device optionally includes one or more other physical user-interface devices, such as a physical keyboard, a mouse, and/or a joystick.

The device can optionally support a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Attention is now directed toward embodiments of portable devices with touch-sensitive displays. FIG. 1A is a block diagram illustrating portable multifunction device 100 with touch-sensitive display system 112 in accordance with some embodiments. Touch-sensitive display 112 is sometimes called a "touch screen" for convenience and is sometimes known as or called a "touch-sensitive display system." Device 100 includes memory 102 (which optionally includes one or more computer-readable storage mediums), memory controller 122, one or more processing units (CPUs) 120, peripherals interface 118, RF circuitry 108, audio circuitry 110, speaker 111, microphone 113, input/output (I/O) subsystem 106, other input control devices 116, and external port 124. Device 100 optionally includes one or more optical sensors 164. Device 100 optionally includes one or more contact intensity sensors 165 for detecting intensity of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "intensity" of a contact on a touch-sensitive surface refers to the force or pressure (force per unit area) of a contact (e.g., a finger contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure, and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that can otherwise not be accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, a palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, or a combination of both hardware and software, including one or more signal processing and/or application-specific integrated circuits.

Memory 102 can optionally include one or more computer-readable storage mediums. The computer-readable storage mediums can optionally be tangible and non-transitory. Memory 102 can optionally include high-speed random access memory and can optionally also include non-volatile memory, such as one or more magnetic disk storage devices, flash memory devices, or other non-volatile solid-state memory devices. Memory controller 122 can optionally control access to memory 102 by other components of device 100. Executable instructions for performing these functions are, optionally, included in a transitory computer-readable storage medium or other computer program product configured for execution by one or more processors.

Peripherals interface 118 can be used to couple input and output peripherals of the device to CPU 120 and memory 102. The one or more processors 120 run or execute various software programs and/or sets of instructions stored in memory 102 to perform various functions for device 100 and to process data. In some embodiments, peripherals interface 118, CPU 120, and memory controller 122 can optionally be implemented on a single chip, such as chip 104. In some embodiments, they can optionally be implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The RF circuitry 108 optionally includes well-known circuitry for detecting near field communication (NFC) fields, such as by a short-range communication radio. The wireless communication optionally uses any of a plurality of communications standards, protocols, and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Bluetooth Low Energy (BTLE), Wireless Fidelity (Wi-Fi) (e.g., IEEE 802.11a, IEEE 802.11b, IEEE 802.11g, IEEE 802.11n, and/or IEEE 802.11ac), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data can optionally be retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 optionally includes display controller 156, optical sensor controller 158, intensity sensor controller 159, haptic feedback controller 161, and one or more input controllers 160 for other input or control devices. The one or more input controllers 160 receive/send electrical signals from/to other input control devices 116. The other input control devices 116 optionally include physical buttons (e.g., push buttons, rocker buttons, etc.), dials, slider switches, joysticks, click wheels, and so forth. In some alternate embodiments, input controller(s) 160 are, optionally, coupled to any (or none) of the following: a keyboard, an infrared port, a USB port, and a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2).

A quick press of the push button can optionally disengage a lock of touch screen 112 or begin a process that uses gestures on the touch screen to unlock the device, as described in U.S. patent application Ser. No. 11/322,549, "Unlocking a Device by Performing Gestures on an Unlock Image," filed Dec. 23, 2005, U.S. Pat. No. 7,657,849, which is hereby incorporated by reference in its entirety. A longer press of the push button (e.g., 206) can optionally turn power to device 100 on or off. The user can optionally be able to customize a functionality of one or more of the buttons. Touch screen 112 is used to implement virtual or soft buttons and one or more soft keyboards.

Touch-sensitive display 112 provides an input interface and an output interface between the device and a user. Display controller 156 receives and/or sends electrical signals from/to touch screen 112. Touch screen 112 displays visual output to the user. The visual output can optionally include graphics, text, icons, video, and any combination thereof (collectively termed "graphics"). In some embodiments, some or all of the visual output can optionally correspond to user-interface objects.

Touch screen 112 has a touch-sensitive surface, sensor, or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and convert the detected contact into interaction with user-interface objects (e.g., one or more soft keys, icons, web pages, or images) that are displayed on touch screen 112. In an exemplary embodiment, a point of contact between touch screen 112 and the user corresponds to a finger of the user.

Touch screen 112 can optionally use LCD (liquid crystal display) technology, LPD (light emitting polymer display) technology, or LED (light emitting diode) technology, although other display technologies can optionally be used in some embodiments. Touch screen 112 and display controller 156 can optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone® and iPod Touch® from Apple Inc. of Cupertino, Calif.

A touch-sensitive display in some embodiments of touch screen 112 can optionally be analogous to the multi-touch sensitive touchpads described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference in its entirety. However, touch screen 112 displays visual output from device 100, whereas touch-sensitive touchpads do not provide visual output.

A touch-sensitive display in some embodiments of touch screen 112 can optionally be as described in the following applications: (1) U.S. patent application Ser. No. 11/381,313, "Multipoint Touch Surface Controller," filed May 2, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228,700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

Touch screen 112 can optionally have a video resolution in excess of 100 dpi. In some embodiments, the touch screen has a video resolution of approximately 160 dpi. The user can make contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 can optionally include a touchpad (not shown) for activating or deactivating particular functions. In some embodiments, the touchpad is a touch-sensitive area of the device that, unlike the touch screen, does not display visual output. The touchpad can optionally be a touch-sensitive surface that is separate from touch screen 112 or an extension of the touch-sensitive surface formed by the touch screen.

Device 100 also includes power system 162 for powering the various components. Power system 162 can optionally include a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 can optionally also include one or more optical sensors 164. FIG. 1A shows an optical sensor coupled to optical sensor controller 158 in I/O subsystem 106. Optical sensor 164 can optionally include charge-coupled device (CCD) or complementary metal-oxide semiconductor (CMOS) phototransistors. Optical sensor 164 receives light from the environment, projected through one or more lenses, and converts the light to data representing an image. In conjunction with imaging module 143 (also called a camera module), optical sensor 164 can optionally capture still images or video. In some embodiments, an optical sensor is located on the back of device 100, opposite touch screen display 112 on the front of the device so that the touch screen display can optionally be used as a viewfinder for still and/or video image acquisition. In some embodiments, an optical sensor is located on the front of the device so that the user's image can be obtained for video conferencing while the user views the other video conference participants on the touch screen display. In some embodiments, the position of optical sensor 164 can be changed by the user (e.g., by rotating the lens and the sensor in the device housing) so that a single optical sensor 164 can optionally be used along with the touch screen display for both video conferencing and still and/or video image acquisition.

Device 100 optionally also includes one or more contact intensity sensors 165. FIG. 1A shows a contact intensity sensor coupled to intensity sensor controller 159 in I/O subsystem 106. Contact intensity sensor 165 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 165 receives contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch screen display 112, which is located on the front of device 100.

Device 100 can optionally also include one or more proximity sensors 166. FIG. 1A shows proximity sensor 166 coupled to peripherals interface 118. Alternately, proximity sensor 166 can optionally be coupled to input controller 160 in I/O subsystem 106. Proximity sensor 166 can optionally perform as described in U.S. patent application Ser. No. 11/241,839, "Proximity Detector In Handheld Device"; Ser. No. 11/240,788, "Proximity Detector In Handheld Device"; Ser. No. 11/620,702, "Using Ambient Light Sensor To Augment Proximity Sensor Output"; Ser. No. 11/586,862, "Automated Response To And Sensing Of User Activity In Portable Devices"; and Ser. No. 11/638,251, "Methods And Systems For Automatic Configuration Of Peripherals," which are hereby incorporated by reference in their entirety. In some embodiments, the proximity sensor turns off and disables touch screen 112 when the multifunction device is placed near the user's ear (e.g., when the user is making a phone call).

Device 100 optionally also includes one or more tactile output generators 167. FIG. 1A shows a tactile output generator coupled to haptic feedback controller 161 in I/O subsystem 106. Tactile output generator 167 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 165 receives tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch screen display 112, which is located on the front of device 100.

Device 100 can optionally also include one or more accelerometers 168. FIG. 1A shows accelerometer 168 coupled to peripherals interface 118. Alternately, accelerometer 168 can optionally be coupled to an input controller 160 in I/O subsystem 106. Accelerometer 168 can optionally perform as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are incorporated by reference herein in their entirety. In some embodiments, information is displayed on the touch screen display in a portrait view or a landscape view based on an analysis of data received from the one or more accelerometers. Device 100 optionally includes, in addition to accelerometer(s) 168, a magnetometer (not shown) and a GPS (or GLONASS or other global navigation system) receiver (not shown) for obtaining information concerning the location and orientation (e.g., portrait or landscape) of device 100.

Figure 3:
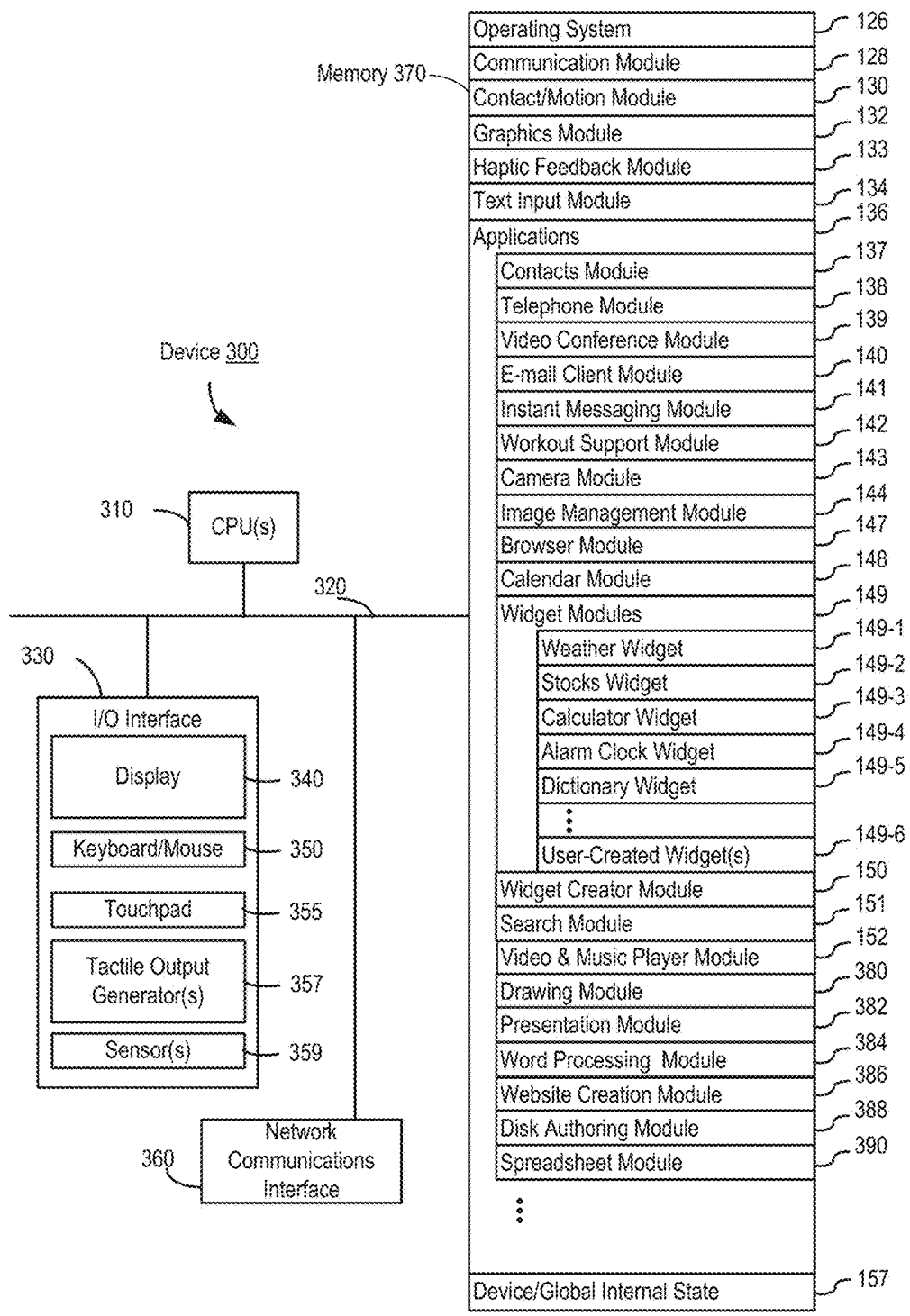
FIG. 3 is a block diagram of an exemplary multifunction device with a display and a touch-sensitive surface in accordance with some embodiments.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments, memory 102 (FIG. 1A) or 370 (FIG. 3) stores device/global internal state 157, as shown in FIGS. 1A and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, iOS, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with, the 30-pin connector used on iPod® (trademark of Apple Inc.) devices.

Contact/motion module 130 optionally detects contact with touch screen 112 (in conjunction with display controller 156) and other touch-sensitive devices (e.g., a touchpad or physical click wheel). Contact/motion module 130 includes various software components for performing various operations related to detection of contact, such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 130 and display controller 156 detect contact on a touchpad.

In some embodiments, contact/motion module 130 uses a set of one or more intensity thresholds to determine whether an operation has been performed by a user (e.g., to determine whether a user has "clicked" on an icon). In some embodiments, at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch screen display can be set to any of a large range of predefined threshold values without changing the trackpad or touch screen display hardware. Additionally, in some implementations, a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (liftoff) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (liftoff) event.

Graphics module 132 includes various known software components for rendering and displaying graphics on touch screen 112 or other display, including components for changing the visual impact (e.g., brightness, transparency, saturation, contrast, or other visual property) of graphics that are displayed. As used herein, the term "graphics" includes any object that can be displayed to a user, including, without limitation, text, web pages, icons (such as user-interface objects including soft keys), digital images, videos, animations, and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 167 to produce tactile outputs at one or more locations on device 100 in response to user interactions with device 100.

Text input module 134, which can optionally be a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone 138 for use in location-based dialing; to camera 143 as picture/video metadata; and to applications that provide location-based services such as weather widgets, local yellow page widgets, and map/navigation widgets).

Applications 136 can optionally include the following modules (or sets of instructions), or a subset or superset thereof:

Contacts module 137 (sometimes called an address book or contact list);
Telephone module 138;
Video conference module 139;
E-mail client module 140;
Instant messaging (IM) module 141;
Workout support module 142;
Camera module 143 for still and/or video images;
Image management module 144;
Video player module;
Music player module;
Browser module 147;
Calendar module 148;
Widget modules 149, which can optionally include one or more of: weather widget 149-1, stocks widget 149-2, calculator widget 149-3, alarm clock widget 149-4, dictionary widget 149-5, and other widgets obtained by the user, as well as user-created widgets 149-6;
Widget creator module 150 for making user-created widgets 149-6;
Search module 151;
Video and music player module 152, which merges video player module and music player module;
Notes module 153;
Map module 154; and/or
Online video module 155.

Examples of other applications 136 that can optionally be stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact/motion module 130, graphics module 132, and text input module 134, contacts module 137 can optionally be used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138, video conference module 139, e-mail 140, or IM 141; and so forth.

In conjunction with RF circuitry 108, audio circuitry 110, speaker 111, microphone 113, touch screen 112, display controller 156, contact/motion module 130, graphics module 132, and text input module 134, telephone module 138 can optionally be used to enter a sequence of characters corresponding to a telephone number, access one or more telephone numbers in contacts module 137, modify a telephone number that has been entered, dial a respective telephone number, conduct a conversation, and disconnect or hang up when the conversation is completed. As noted above, the wireless communication may use any of a plurality of communications standards, protocols, and technologies.

In conjunction with RF circuitry 108, audio circuitry 110, speaker 111, microphone 113, touch screen 112, display controller 156, optical sensor 164, optical sensor controller 158, contact/motion module 130, graphics module 132, text input module 134, contacts module 137, and telephone module 138, video conference module 139 includes executable instructions to initiate, conduct, and terminate a video conference between a user and one or more other participants in accordance with user instructions.

In conjunction with RF circuitry 108, touch screen 112, display controller 156, contact/motion module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact/motion module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages, and to view received instant messages. In some embodiments, transmitted and/or received instant messages can optionally include graphics, photos, audio files, video files and/or other attachments as are supported in an MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact/motion module 130, graphics module 132, text input module 134, GPS module 135, map module 154, and music player module, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store, and transmit workout data.

In conjunction with touch screen 112, display controller 156, optical sensor(s) 164, optical sensor controller 158, contact/motion module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact/motion module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display controller 156, contact/motion module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display controller 156, contact/motion module 130, graphics module 132, text input module 134, e-mail client module 140, and browser module 147, calendar module 148 includes executable instructions to create, display, modify, and store calendars and data associated with calendars (e.g., calendar entries, to-do lists, etc.) in accordance with user instructions.

In conjunction with RF circuitry 108, touch screen 112, display controller 156, contact/motion module 130, graphics module 132, text input module 134, and browser module 147, widget modules 149 are mini-applications that can optionally be downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display controller 156, contact/motion module 130, graphics module 132, text input module 134, and browser module 147, the widget creator module 150 can optionally be used by a user to create widgets (e.g., turning a user-specified portion of a web page into a widget).

In conjunction with touch screen 112, display controller 156, contact/motion module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display controller 156, contact/motion module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present, or otherwise play back videos (e.g., on touch screen 112 or on an external, connected display via external port 124). In some embodiments, device 100 optionally includes the functionality of an MP3 player, such as an iPod (trademark of Apple Inc.).

In conjunction with touch screen 112, display controller 156, contact/motion module 130, graphics module 132, and text input module 134, notes module 153 includes executable instructions to create and manage notes, to-do lists, and the like in accordance with user instructions.

In conjunction with RF circuitry 108, touch screen 112, display controller 156, contact/motion module 130, graphics module 132, text input module 134, GPS module 135, and browser module 147, map module 154 can optionally be used to receive, display, modify, and store maps and data associated with maps (e.g., driving directions, data on stores and other points of interest at or near a particular location, and other location-based data) in accordance with user instructions.

In conjunction with touch screen 112, display controller 156, contact/motion module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video. Additional description of the online video application can be found in U.S. Provisional Patent Application No. 60/936,562, "Portable Multifunction Device, Method, and Graphical User Interface for Playing Online Videos," filed Jun. 20, 2007, and U.S. patent application Ser. No. 11/968,067, "Portable Multifunction Device, Method, and Graphical User Interface for Playing Online Videos," filed Dec. 31, 2007, the contents of which are hereby incorporated by reference in their entirety.

Each of the above-identified modules and applications corresponds to a set of executable instructions for performing one or more functions described above and the methods described in this application (e.g., the computer-implemented methods and other information processing methods described herein). These modules (e.g., sets of instructions) need not be implemented as separate software programs, procedures, or modules, and thus various subsets of these modules can optionally be combined or otherwise rearranged in various embodiments. For example, video player module can be combined with music player module into a single module (e.g., video and music player module 152, FIG. 1A). In some embodiments, memory 102 can optionally store a subset of the modules and data structures identified above. Furthermore, memory 102 can optionally store additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 may be reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some embodiments, the menu button is a physical push button or other physical input control device instead of a touchpad.

Figure 1B:
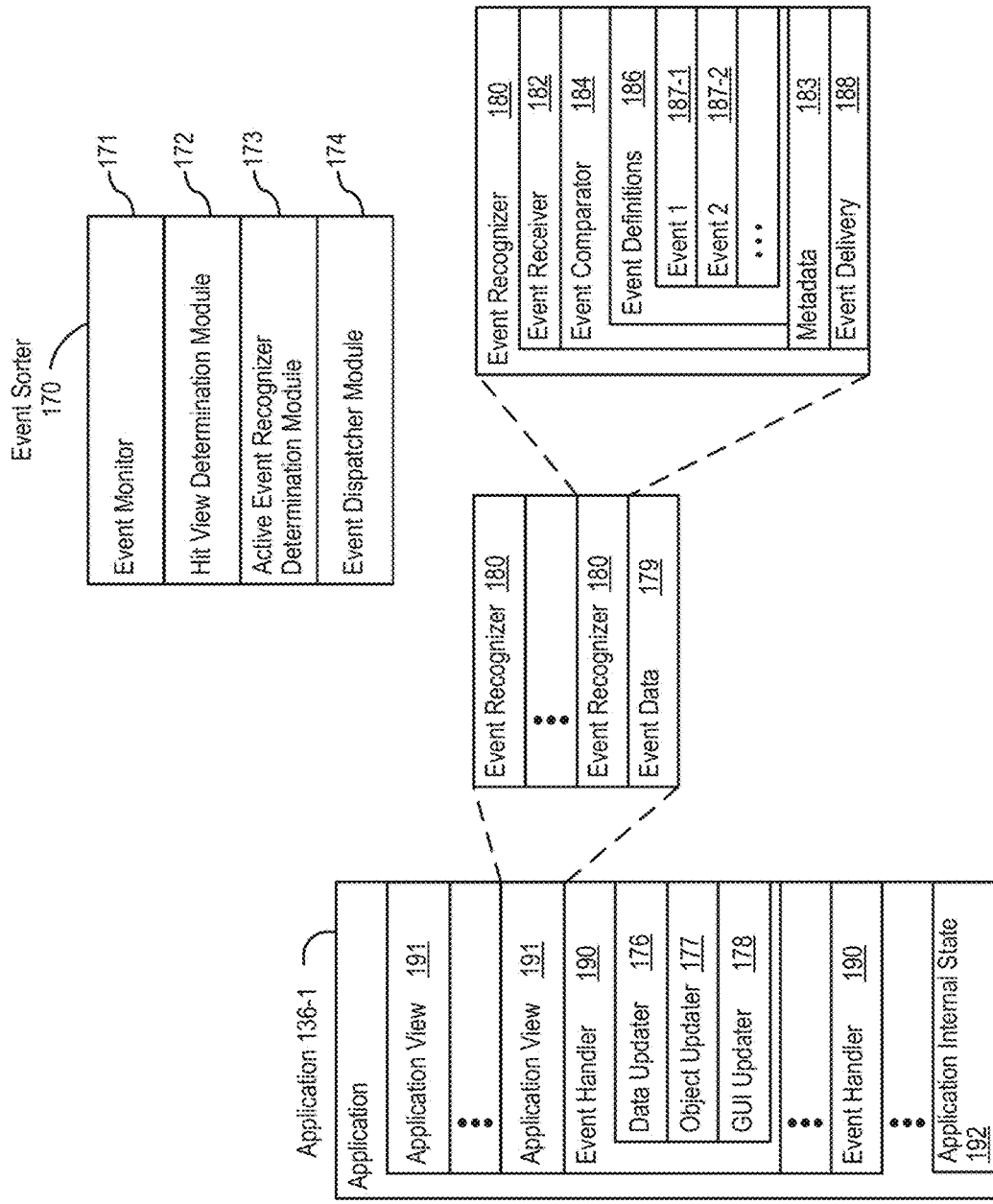
FIG. 1B is a block diagram illustrating exemplary components for event handling in accordance with some embodiments.

FIG. 1B is a block diagram illustrating exemplary components for event handling in accordance with some embodiments. In some embodiments, memory 102 (FIG. 1A) or 370 (FIG. 3) includes event sorter 170 (e.g., in operating system 126) and a respective application 136-1 (e.g., any of the aforementioned applications 137-151, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In some embodiments, peripherals interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views when touch-sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected can optionally correspond to programmatic levels within a programmatic or view hierarchy of the application. For example, the lowest level view in which a touch is detected may be called the hit view, and the set of events that are recognized as proper inputs may be determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (e.g., the first sub-event in the sequence of sub-events that form an event or potential event). Once the hit view is identified by the hit view determination module 172, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In some embodiments, active event recognizer determination module 173 determines that all views that include the physical location of a sub-event are actively involved views, and therefore determines that all actively involved views should receive a particular sequence of sub-events. In some embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver 182.

In some embodiments, operating system 126 includes event sorter 170. Alternatively, application 136-1 includes event sorter 170. In some embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In some embodiments, one or more of event recognizers 180 are part of a separate module, such as a user interface kit (not shown) or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 can optionally utilize or call data updater 176, object updater 177, or GUI updater 178 to update the application internal state 192. Alternatively, one or more of the application views 191 include one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170 and identifies an event from the event information. Event recognizer 180 includes event receiver 182 and event comparator 184. In some embodiments, event recognizer 180 also includes at least a subset of: metadata 183, and event delivery instructions 188 (which may include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information can optionally also include speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event (187) include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first liftoff (touch end) for a predetermined phase, a second touch (touch begin) on the displayed object for a predetermined phase, and a second liftoff (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and liftoff of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event (187) also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers can optionally interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In some embodiments, they are included in two or more software modules.

It shall be understood that the foregoing discussion regarding event handling of user touches on touch-sensitive displays also applies to other forms of user inputs to operate multifunction devices 100 with input devices, not all of which are initiated on touch screens. For example, mouse movement and mouse button presses, optionally coordinated with single or multiple keyboard presses or holds; contact movements such as taps, drags, scrolls, etc. on touchpads; pen stylus inputs; movement of the device; oral instructions; detected eye movements; biometric inputs; and/or any combination thereof are optionally utilized as inputs corresponding to sub-events which define an event to be recognized.

Figure 2:
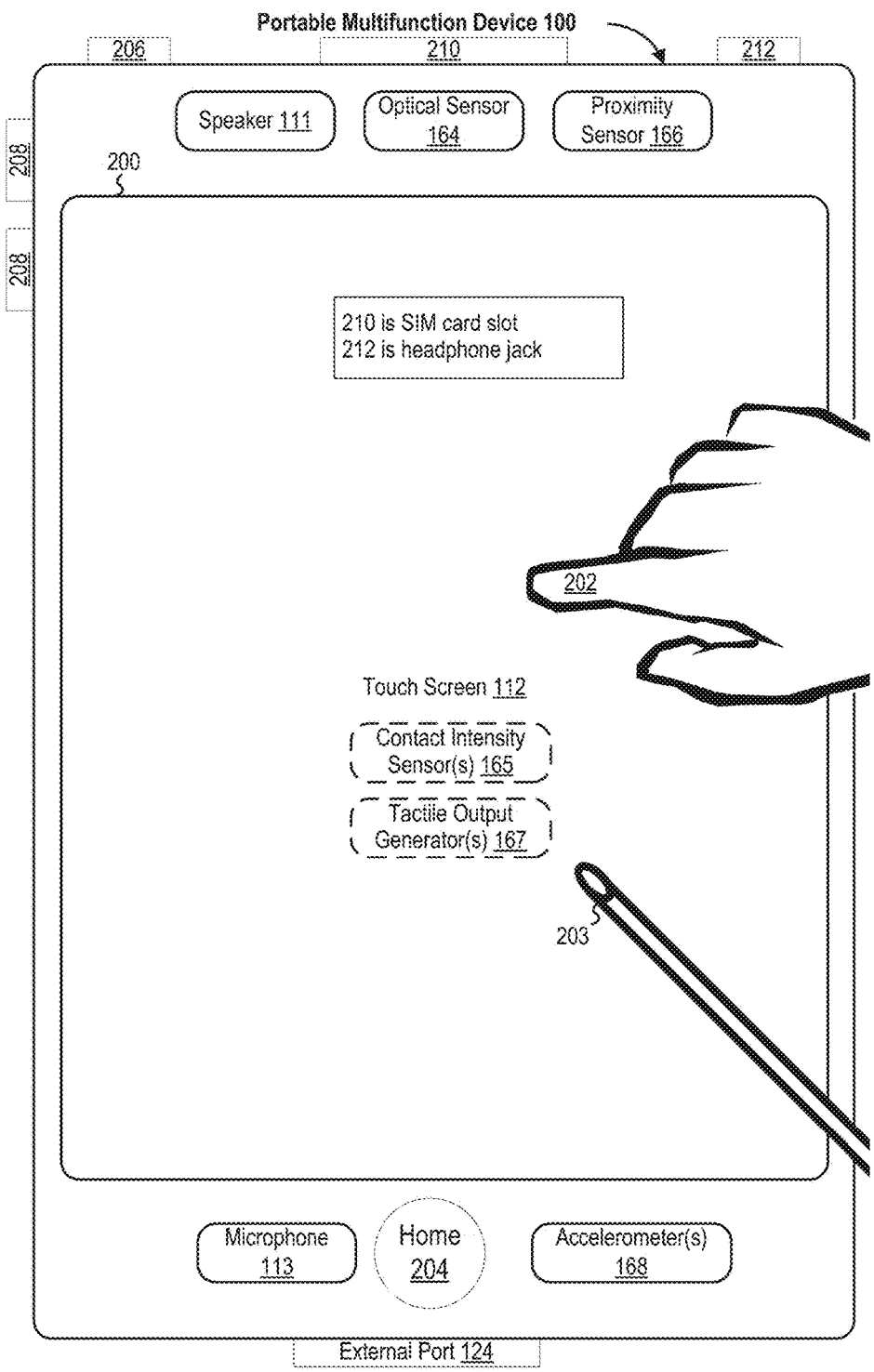
FIG. 2 illustrates a portable multifunction device having a touch screen in accordance with some embodiments.

FIG. 2 illustrates a portable multifunction device 100 having a touch screen 112 in accordance with some embodiments. The touch screen optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward), and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 can optionally also include one or more physical buttons, such as "home" or menu button 204. As described previously, menu button 204 can optionally be used to navigate to any application 136 in a set of applications that can optionally be executed on device 100. Alternatively, in some embodiments, the menu button is implemented as a soft key in a GUI displayed on touch screen 112.

In one embodiment, device 100 includes touch screen 112, menu button 204, push button 206 for powering the device on/off and locking the device, volume adjustment button(s) 208, subscriber identity module (SIM) card slot 210, headset jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. Device 100 also, optionally, includes one or more contact intensity sensors 165 for detecting intensity of contacts on touch screen 112 and/or one or more tactile output generators 167 for generating tactile outputs for a user of device 100.

FIG. 3 is a block diagram of an exemplary multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPUs) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM, or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above-identified elements in FIG. 3 can optionally be stored in one or more of the previously mentioned memory devices. Each of the above-identified modules corresponds to a set of instructions for performing a function described above. The above-identified modules or programs (e.g., sets of instructions) need not be implemented as separate software programs, procedures, or modules, and thus various subsets of these modules can optionally be combined or otherwise rearranged in various embodiments. In some embodiments, memory 370 can optionally store a subset of the modules and data structures identified above. Furthermore, memory 370 can optionally store additional modules and data structures not described above.

Attention is now directed towards embodiments of user interfaces that can optionally be implemented on, for example, portable multifunction device 100.

Figure 4A:
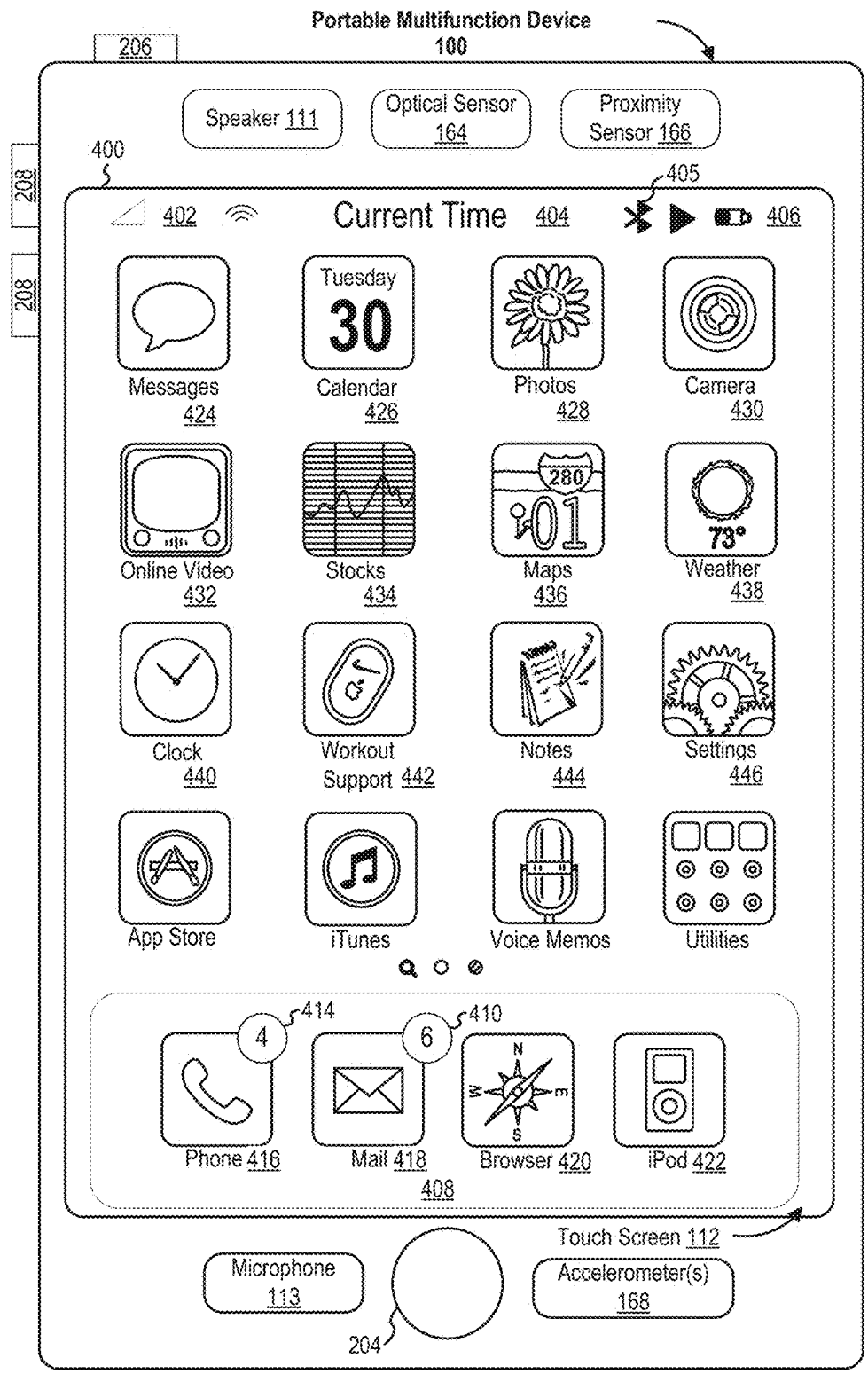
FIG. 4A illustrates an exemplary user interface for a menu of applications on a portable multifunction device in accordance with some embodiments.

FIG. 4A illustrates an exemplary user interface for a menu of applications on portable multifunction device 100 in accordance with some embodiments. Similar user interfaces can optionally be implemented on device 300. In some embodiments, user interface 400 includes the following elements, or a subset or superset thereof:

Signal strength indicator(s) 402 for wireless communication(s), such as cellular and Wi-Fi signals;
Time 404;
Bluetooth indicator 405;
Battery status indicator 406;
Tray 408 with icons for frequently used applications, such as:
  Icon 416 for telephone module 138, labeled "Phone," which optionally includes an indicator 414 of the number of missed calls or voicemail messages;
  Icon 418 for e-mail client module 140, labeled "Mail," which optionally includes an indicator 410 of the number of unread e-mails;
  Icon 420 for browser module 147, labeled "Browser;" and
  Icon 422 for video and music player module 152, also referred to as iPod (trademark of Apple Inc.) module 152, labeled "iPod;" and
Icons for other applications, such as:
  Icon 424 for IM module 141, labeled "Messages;"
  Icon 426 for calendar module 148, labeled "Calendar;"
  Icon 428 for image management module 144, labeled "Photos;"
  Icon 430 for camera module 143, labeled "Camera;"
  Icon 432 for online video module 155, labeled "Online Video;"
  Icon 434 for stocks widget 149-2, labeled "Stocks;"
  Icon 436 for map module 154, labeled "Maps;"
  Icon 438 for weather widget 149-1, labeled "Weather;"
  Icon 440 for alarm clock widget 149-4, labeled "Clock;"
  Icon 442 for workout support module 142, labeled "Workout Support;"
  Icon 444 for notes module 153, labeled "Notes;" and
  Icon 446 for a settings application or module, labeled "Settings," which provides access to settings for device 100 and its various applications 136.

It should be noted that the icon labels illustrated in FIG. 4A are merely exemplary. For example, icon 422 for video and music player module 152 can optionally be labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

Figure 4B:
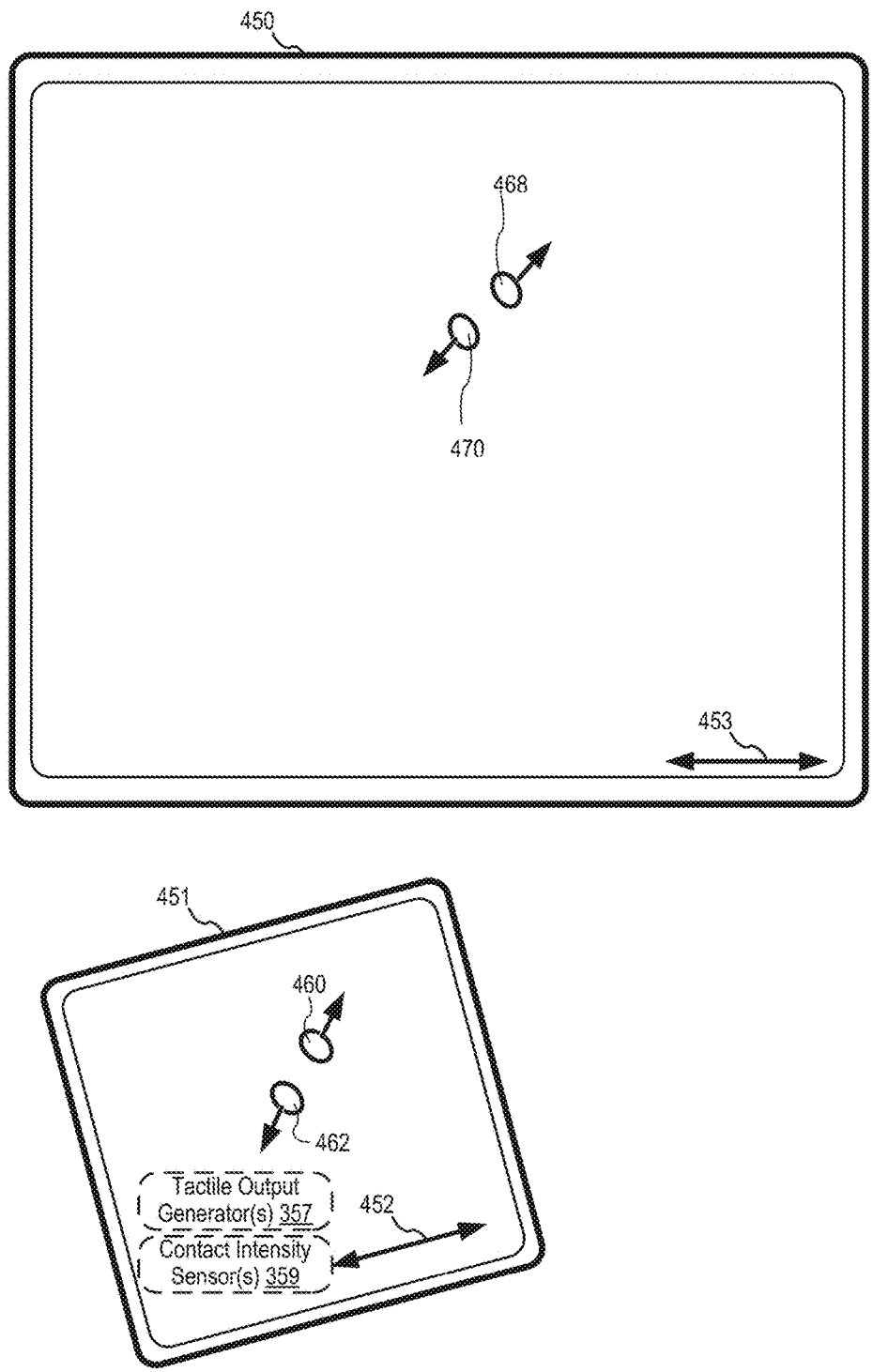
FIG. 4B illustrates an exemplary user interface for a multifunction device with a touch-sensitive surface that is separate from the display in accordance with some embodiments.

FIG. 4B illustrates an exemplary user interface on a device (e.g., device 300, FIG. 3) with a touch-sensitive surface 451 (e.g., a tablet or touchpad 355, FIG. 3) that is separate from the display 450 (e.g., touch screen display 112). Device 300 also, optionally, includes one or more contact intensity sensors (e.g., one or more of sensors 357) for detecting intensity of contacts on touch-sensitive surface 451 and/or one or more tactile output generators 359 for generating tactile outputs for a user of device 300.

Although some of the examples which follow will be given with reference to inputs on touch screen display 112 (where the touch-sensitive surface and the display are combined), in some embodiments, the device detects inputs on a touch-sensitive surface that is separate from the display, as shown in FIG. 4B. In some embodiments, the touch-sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse-based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

Figure 5A:
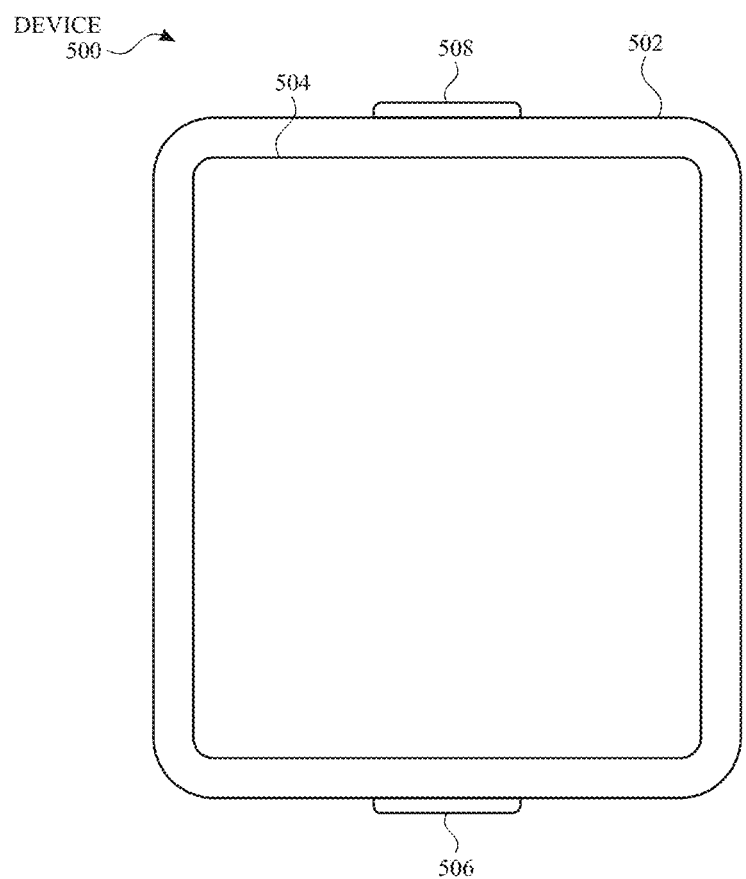
FIG. 5A illustrates a personal electronic device in accordance with some embodiments.

FIG. 5A illustrates exemplary personal electronic device 500. Device 500 includes body 502. In some embodiments, device 500 can include some or all of the features described with respect to devices 100 and 300 (e.g., FIGS. 1A-4B). In some embodiments, device 500 has touch-sensitive display screen 504, hereafter touch screen 504. Alternatively, or in addition to touch screen 504, device 500 has a display and a touch-sensitive surface. As with devices 100 and 300, in some embodiments, touch screen 504 (or the touch-sensitive surface) can optionally have one or more intensity sensors for detecting intensity of contacts (e.g., touches) being applied. The one or more intensity sensors of touch screen 504 (or the touch-sensitive surface) can provide output data that represents the intensity of touches. The user interface of device 500 can respond to touches based on their intensity, meaning that touches of different intensities can invoke different user interface operations on device 500.

Techniques for detecting and processing touch intensity can be found, for example, in related applications: International Patent Application Serial No. PCT/US2013/040061, titled "Device, Method, and Graphical User Interface for Displaying User Interface Objects Corresponding to an Application," filed May 8, 2013, and International Patent Application Serial No. PCT/US2013/069483, titled "Device, Method, and Graphical User Interface for Transitioning Between Touch Input to Display Output Relationships," filed Nov. 11, 2013, each of which is hereby incorporated by reference in their entirety.

In some embodiments, device 500 has one or more input mechanisms 506 and 508. Input mechanisms 506 and 508, if included, can be physical. Examples of physical input mechanisms include push buttons and rotatable mechanisms. In some embodiments, device 500 has one or more attachment mechanisms. Such attachment mechanisms, if included, can permit attachment of device 500 with, for example, hats, eyewear, earrings, necklaces, shirts, jackets, bracelets, watch straps, chains, trousers, belts, shoes, purses, backpacks, and so forth. These attachment mechanisms can permit device 500 to be worn by a user.

Figure 5B:
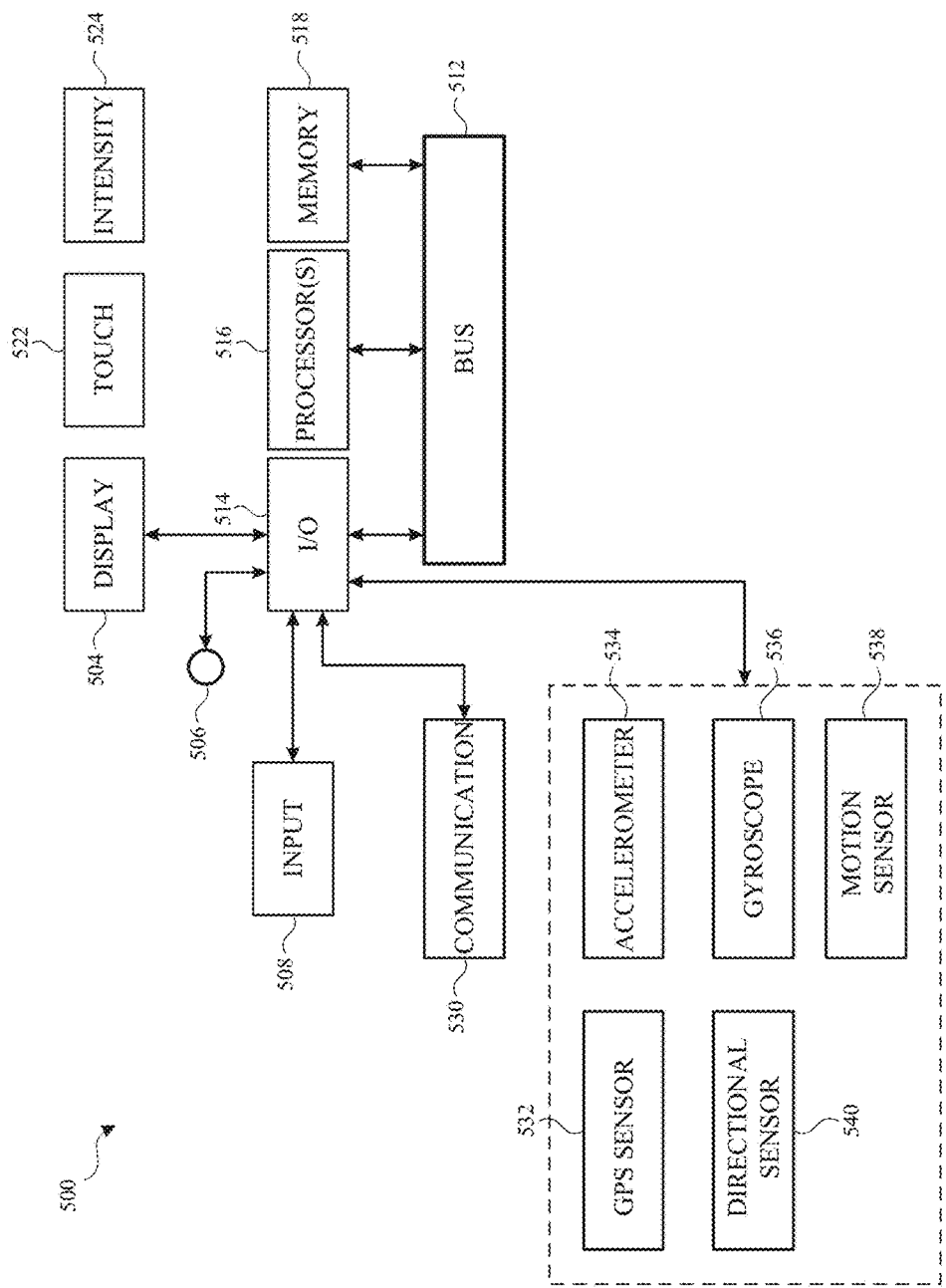
FIG. 5B is a block diagram illustrating a personal electronic device in accordance with some embodiments.

FIG. 5B depicts exemplary personal electronic device 500. In some embodiments, device 500 can include some or all of the components described with respect to FIGS. 1A, 1B, and 3. Device 500 has bus 512 that operatively couples I/O section 514 with one or more computer processors 516 and memory 518. I/O section 514 can be connected to display 504, which can have touch-sensitive component 522 and, optionally, intensity sensor 524 (e.g., contact intensity sensor). In addition, I/O section 514 can be connected with communication unit 530 for receiving application and operating system data, using Wi-Fi, Bluetooth, near field communication (NFC), cellular, and/or other wireless communication techniques. Device 500 can include input mechanisms 506 and/or 508. Input mechanism 506 can optionally be a rotatable input device or a depressible and rotatable input device, for example. Input mechanism 508 can optionally be a button, in some examples.

Input mechanism 508 can optionally be a microphone, in some examples. Personal electronic device 500 can include various sensors, such as GPS sensor 532, accelerometer 534, directional sensor 540 (e.g., compass), gyroscope 536, motion sensor 538, and/or a combination thereof, all of which can be operatively connected to I/O section 514.

Memory 518 of personal electronic device 500 can be a non-transitory computer-readable storage medium, for storing computer-executable instructions, which, when executed by one or more computer processors 516, for example, can cause the computer processors to perform the techniques described above, including processes 702-712 (FIG. 7). The computer-executable instructions can also be stored and/or transported within any non-transitory computer-readable storage medium for use by or in connection with an instruction execution system, apparatus, or device, such as a computer-based system, processor-containing system, or other system that can fetch the instructions from the instruction execution system, apparatus, or device and execute the instructions. For purposes of this document, a "non-transitory computer-readable storage medium" can be any medium that can tangibly contain or store computer-executable instructions for use by or in connection with the instruction execution system, apparatus, or device. The non-transitory computer-readable storage medium can include, but is not limited to, magnetic, optical, and/or semiconductor storages. Examples of such storage include magnetic disks, optical discs based on CD, DVD, or Blu-ray technologies, as well as persistent solid-state memory such as flash, solid-state drives, and the like. Personal electronic device 500 is not limited to the components and configuration of FIG. 5B, but can include other or additional components in multiple configurations. Executable instructions for performing these functions are, optionally, included in a transitory computer-readable storage medium or other computer program product configured for execution by one or more processors.

As used here, the term "affordance" refers to a user-interactive graphical user interface object that can optionally be displayed on the display screen of devices 100, 300, and/or 500 (FIGS. 1, 3, and 5). For example, an image (e.g., icon), a button, and text (e.g., hyperlink) each can optionally constitute an affordance.

As used herein, the term "focus selector" refers to an input element that indicates a current part of a user interface with which a user is interacting. In some implementations that include a cursor or other location marker, the cursor acts as a "focus selector" so that when an input (e.g., a press input) is detected on a touch-sensitive surface (e.g., touchpad 355 in FIG. 3 or touch-sensitive surface 451 in FIG. 4B) while the cursor is over a particular user interface element (e.g., a button, window, slider or other user interface element), the particular user interface element is adjusted in accordance with the detected input. In some implementations that include a touch screen display (e.g., touch-sensitive display system 112 in FIG. 1A or touch screen 112 in FIG. 4A) that enables direct interaction with user interface elements on the touch screen display, a detected contact on the touch screen acts as a "focus selector" so that when an input (e.g., a press input by the contact) is detected on the touch screen display at a location of a particular user interface element (e.g., a button, window, slider, or other user interface element), the particular user interface element is adjusted in accordance with the detected input. In some implementations, focus is moved from one region of a user interface to another region of the user interface without corresponding movement of a cursor or movement of a contact on a touch screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch screen display) that is controlled by the user so as to communicate the user's intended interaction with the user interface (e.g., by indicating, to the device, the element of the user interface with which the user is intending to interact). For example, the location of a focus selector (e.g., a cursor, a contact, or a selection box) over a respective button while a press input is detected on the touch-sensitive surface (e.g., a touchpad or touch screen) will indicate that the user is intending to activate the respective button (as opposed to other user interface elements shown on a display of the device).

As used in the specification and claims, the term "characteristic intensity" of a contact refers to a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.05, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds can optionally include a first intensity threshold and a second intensity threshold. In this example, a contact with a characteristic intensity that does not exceed the first threshold results in a first operation, a contact with a characteristic intensity that exceeds the first intensity threshold and does not exceed the second intensity threshold results in a second operation, and a contact with a characteristic intensity that exceeds the second threshold results in a third operation. In some embodiments, a comparison between the characteristic intensity and one or more thresholds is used to determine whether or not to perform one or more operations (e.g., whether to perform a respective operation or forgo performing the respective operation) rather than being used to determine whether to perform a first operation or a second operation.

Figure 5C:
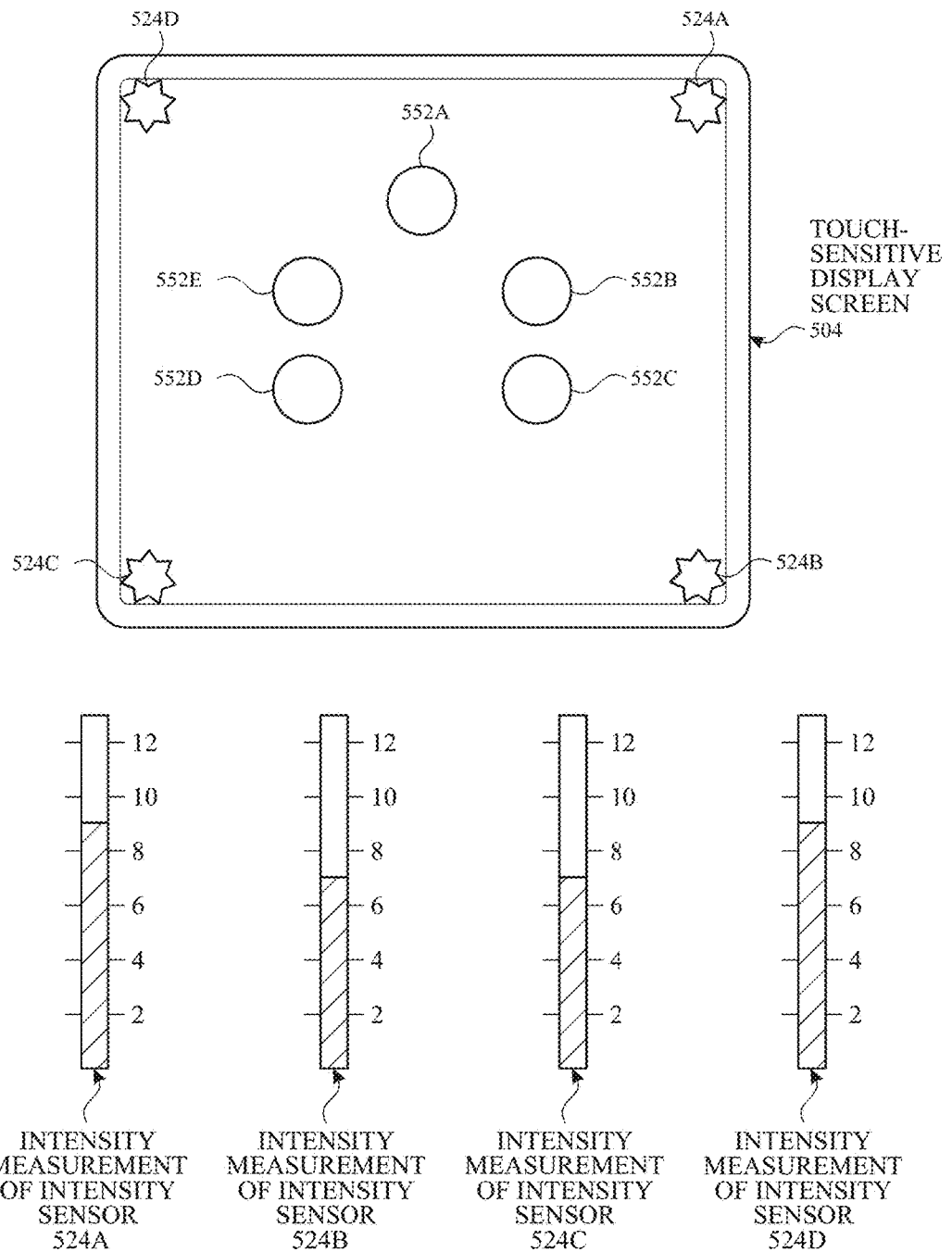
FIGS. 5C-5D illustrate exemplary components of a personal electronic device having a touch-sensitive display and intensity sensors in accordance with some embodiments.
Figure 5D:
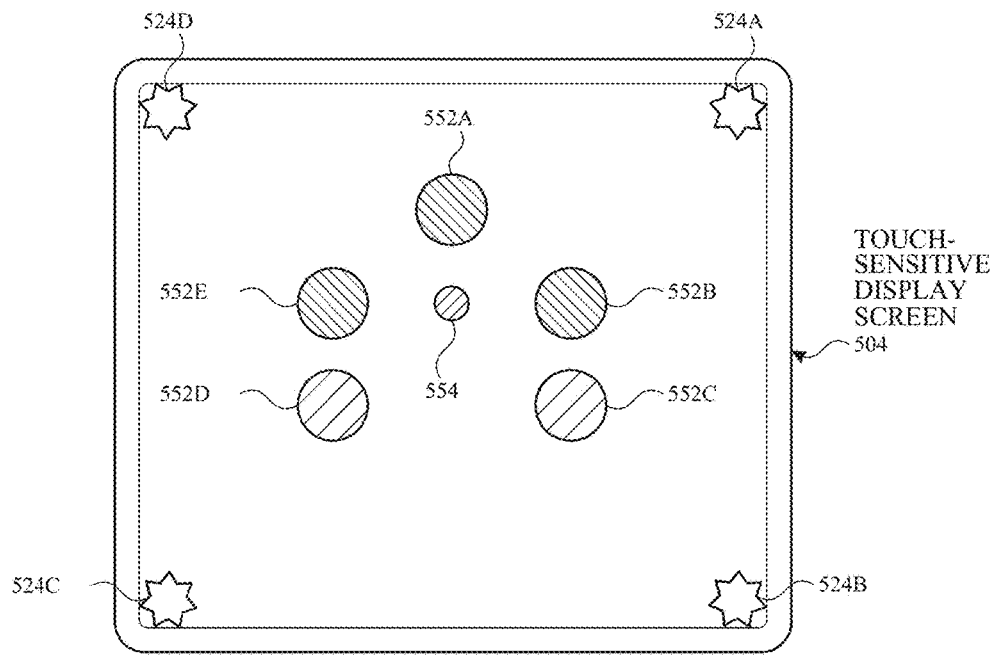
Figure 5D:
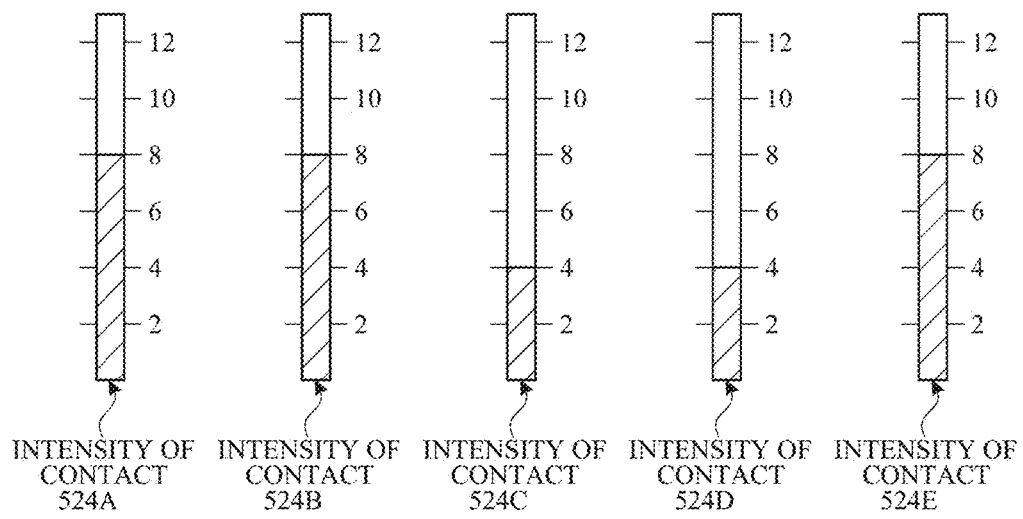

FIG. 5C illustrates detecting a plurality of contacts 552A-552E on touch-sensitive display screen 504 with a plurality of intensity sensors 524A-524D. FIG. 5C additionally includes intensity diagrams that show the current intensity measurements of the intensity sensors 524A-524D relative to units of intensity. In this example, the intensity measurements of intensity sensors 524A and 524D are each 9 units of intensity, and the intensity measurements of intensity sensors 524B and 524C are each 7 units of intensity. In some implementations, an aggregate intensity is the sum of the intensity measurements of the plurality of intensity sensors 524A-524D, which in this example is 32 intensity units. In some embodiments, each contact is assigned a respective intensity that is a portion of the aggregate intensity. FIG. 5D illustrates assigning the aggregate intensity to contacts 552A-552E based on their distance from the center of force 554. In this example, each of contacts 552A, 552B, and 552E are assigned an intensity of contact of 8 intensity units of the aggregate intensity, and each of contacts 552C and 552D are assigned an intensity of contact of 4 intensity units of the aggregate intensity. More generally, in some implementations, each contact j is assigned a respective intensity $I_j$ that is a portion of the aggregate intensity, A, in accordance with a predefined mathematical function, $I_j = A \cdot (D_j / \Sigma D_i)$, where $D_j$ is the distance of the respective contact j to the center of force, and $\Sigma D_i$ is the sum of the distances of all the respective contacts (e.g., i=1 to last) to the center of force. The operations described with reference to FIGS. 5C-5D can be performed using an electronic device similar or identical to device 100, 300, or 500. In some embodiments, a characteristic intensity of a contact is based on one or more intensities of the contact. In some embodiments, the intensity sensors are used to determine a single characteristic intensity (e.g., a single characteristic intensity of a single contact). It should be noted that the intensity diagrams are not part of a displayed user interface, but are included in FIGS. 5C-5D to aid the reader.

In some embodiments, a portion of a gesture is identified for purposes of determining a characteristic intensity. For example, a touch-sensitive surface can optionally receive a continuous swipe contact transitioning from a start location and reaching an end location, at which point the intensity of the contact increases. In this example, the characteristic intensity of the contact at the end location may be based on only a portion of the continuous swipe contact, and not the entire swipe contact (e.g., only the portion of the swipe contact at the end location). In some embodiments, a smoothing algorithm can optionally be applied to the intensities of the swipe contact prior to determining the characteristic intensity of the contact. For example, the smoothing algorithm optionally includes one or more of: an unweighted sliding-average smoothing algorithm, a triangular smoothing algorithm, a median filter smoothing algorithm, and/or an exponential smoothing algorithm. In some circumstances, these smoothing algorithms eliminate narrow spikes or dips in the intensities of the swipe contact for purposes of determining a characteristic intensity.

The intensity of a contact on the touch-sensitive surface can optionally be characterized relative to one or more intensity thresholds, such as a contact-detection intensity threshold, a light press intensity threshold, a deep press intensity threshold, and/or one or more other intensity thresholds. In some embodiments, the light press intensity threshold corresponds to an intensity at which the device will perform operations typically associated with clicking a button of a physical mouse or a trackpad. In some embodiments, the deep press intensity threshold corresponds to an intensity at which the device will perform operations that are different from operations typically associated with clicking a button of a physical mouse or a trackpad. In some embodiments, when a contact is detected with a characteristic intensity below the light press intensity threshold (e.g., and above a nominal contact-detection intensity threshold below which the contact is no longer detected), the device will move a focus selector in accordance with movement of the contact on the touch-sensitive surface without performing an operation associated with the light press intensity threshold or the deep press intensity threshold. Generally, unless otherwise stated, these intensity thresholds are consistent between different sets of user interface figures.

An increase of characteristic intensity of the contact from an intensity below the light press intensity threshold to an intensity between the light press intensity threshold and the deep press intensity threshold is sometimes referred to as a "light press" input. An increase of characteristic intensity of the contact from an intensity below the deep press intensity threshold to an intensity above the deep press intensity threshold is sometimes referred to as a "deep press" input. An increase of characteristic intensity of the contact from an intensity below the contact-detection intensity threshold to an intensity between the contact-detection intensity threshold and the light press intensity threshold is sometimes referred to as detecting the contact on the touch-surface. A decrease of characteristic intensity of the contact from an intensity above the contact-detection intensity threshold to an intensity below the contact-detection intensity threshold is sometimes referred to as detecting liftoff of the contact from the touch-surface. In some embodiments, the contact-detection intensity threshold is zero. In some embodiments, the contact-detection intensity threshold is greater than zero.

In some embodiments described herein, one or more operations are performed in response to detecting a gesture that includes a respective press input or in response to detecting the respective press input performed with a respective contact (or a plurality of contacts), where the respective press input is detected based at least in part on detecting an increase in intensity of the contact (or plurality of contacts) above a press-input intensity threshold. In some embodiments, the respective operation is performed in response to detecting the increase in intensity of the respective contact above the press-input intensity threshold (e.g., a "down stroke" of the respective press input). In some embodiments, the press input includes an increase in intensity of the respective contact above the press-input intensity threshold and a subsequent decrease in intensity of the contact below the press-input intensity threshold, and the respective operation is performed in response to detecting the subsequent decrease in intensity of the respective contact below the press-input threshold (e.g., an "up stroke" of the respective press input).

Figure 5E:
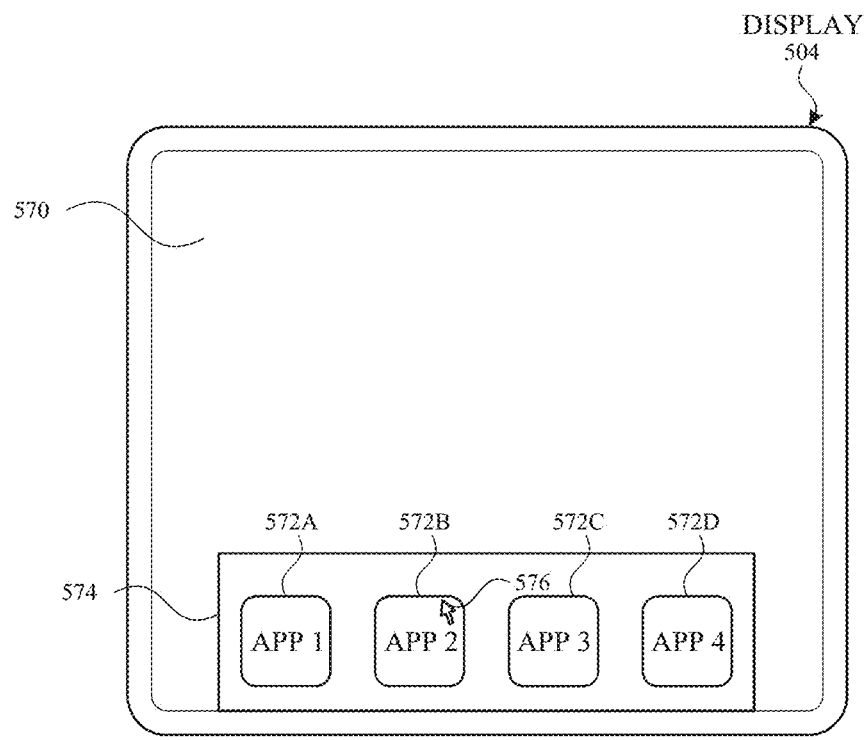
FIGS. 5E-5H illustrate exemplary components and user interfaces of a personal electronic device in accordance with some embodiments.
Figure 5E:
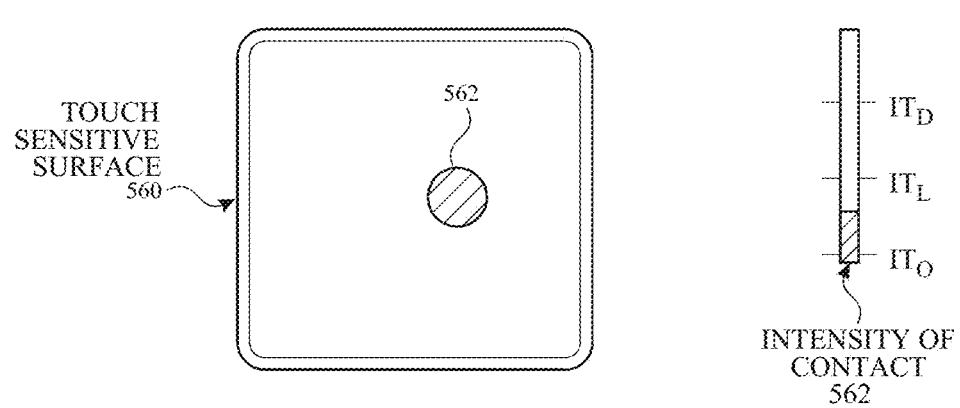
Figure 5F:
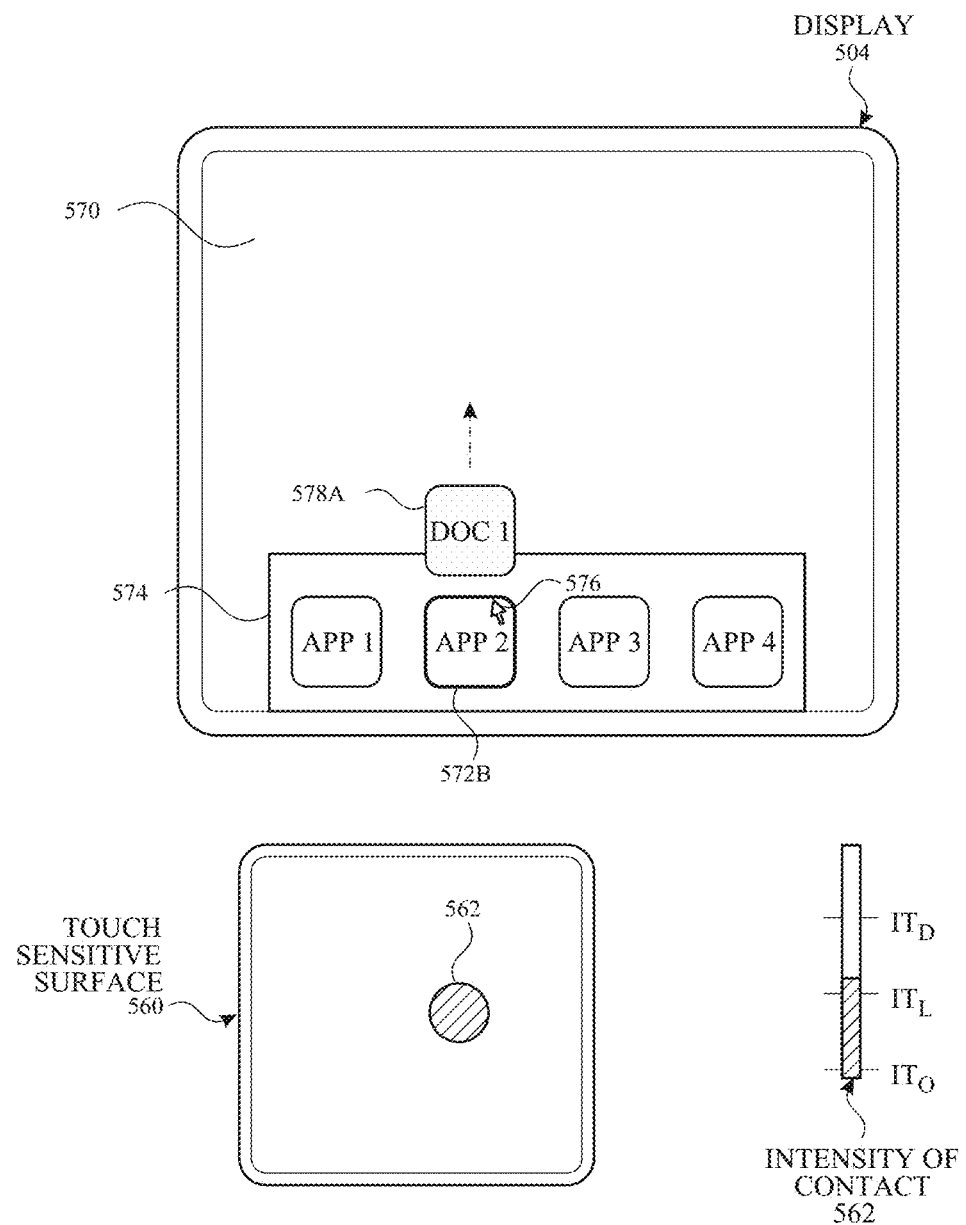
Figure 5G:
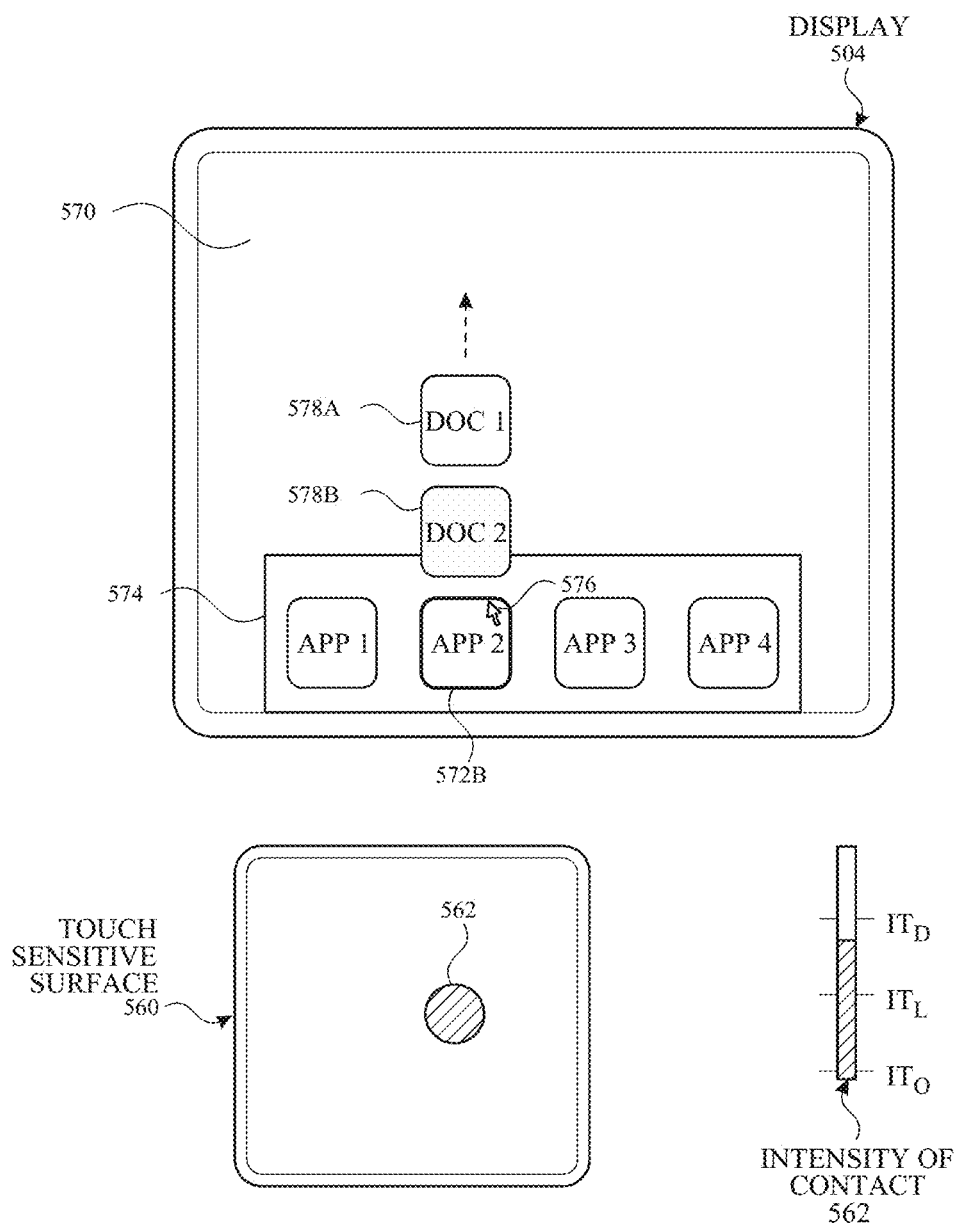
Figure 5H:
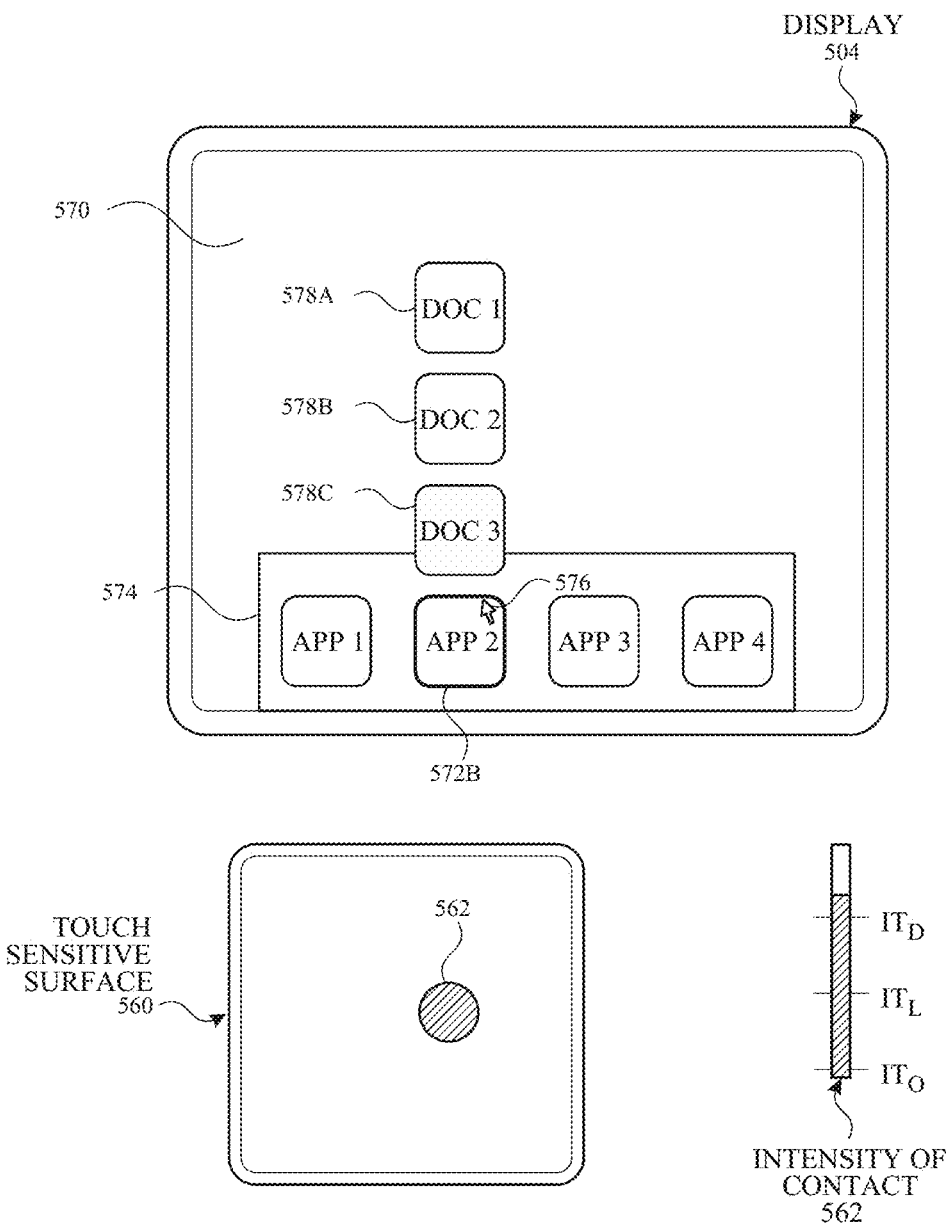

FIGS. 5E-5H illustrate detection of a gesture that includes a press input that corresponds to an increase in intensity of a contact 562 from an intensity below a light press intensity threshold (e.g., "ITL") in FIG. 5E, to an intensity above a deep press intensity threshold (e.g., "ITD") in FIG. 5H. The gesture performed with contact 562 is detected on touch-sensitive surface 560 while cursor 576 is displayed over application icon 572B corresponding to App 2, on a displayed user interface 570 that includes application icons 572A-572D displayed in predefined region 574. In some embodiments, the gesture is detected on touch-sensitive display 504. The intensity sensors detect the intensity of contacts on touch-sensitive surface 560. The device determines that the intensity of contact 562 peaked above the deep press intensity threshold (e.g., "ITD"). Contact 562 is maintained on touch-sensitive surface 560. In response to the detection of the gesture, and in accordance with contact 562 having an intensity that goes above the deep press intensity threshold (e.g., "ITD") during the gesture, reduced-scale representations 578A-578C (e.g., thumbnails) of recently opened documents for App 2 are displayed, as shown in FIGS. 5F-5H. In some embodiments, the intensity, which is compared to the one or more intensity thresholds, is the characteristic intensity of a contact. It should be noted that the intensity diagram for contact 562 is not part of a displayed user interface, but is included in FIGS. 5E-5H to aid the reader.

In some embodiments, the display of representations 578A-578C includes an animation. For example, representation 578A is initially displayed in proximity of application icon 572B, as shown in FIG. 5F. As the animation proceeds, representation 578A moves upward and representation 578B is displayed in proximity of application icon 572B, as shown in FIG. 5G. Then, representations 578A moves upward, 578B moves upward toward representation 578A, and representation 578C is displayed in proximity of application icon 572B, as shown in FIG. 5H. Representations 578A-578C form an array above icon 572B. In some embodiments, the animation progresses in accordance with an intensity of contact 562, as shown in FIGS. 5F-5G, where the representations 578A-578C appear and move upwards as the intensity of contact 562 increases toward the deep press intensity threshold (e.g., "ITD"). In some embodiments, the intensity, on which the progress of the animation is based, is the characteristic intensity of the contact. The operations described with reference to FIGS. 5E-5H can be performed using an electronic device similar or identical to device 100, 300, or 500.

In some embodiments, the device employs intensity hysteresis to avoid accidental inputs sometimes termed "jitter," where the device defines or selects a hysteresis intensity threshold with a predefined relationship to the press-input intensity threshold (e.g., the hysteresis intensity threshold is X intensity units lower than the press-input intensity threshold or the hysteresis intensity threshold is 75%, 90%, or some reasonable proportion of the press-input intensity threshold). Thus, in some embodiments, the press input includes an increase in intensity of the respective contact above the press-input intensity threshold and a subsequent decrease in intensity of the contact below the hysteresis intensity threshold that corresponds to the press-input intensity threshold, and the respective operation is performed in response to detecting the subsequent decrease in intensity of the respective contact below the hysteresis intensity threshold (e.g., an "up stroke" of the respective press input). Similarly, in some embodiments, the press input is detected only when the device detects an increase in intensity of the contact from an intensity at or below the hysteresis intensity threshold to an intensity at or above the press-input intensity threshold and, optionally, a subsequent decrease in intensity of the contact to an intensity at or below the hysteresis intensity, and the respective operation is performed in response to detecting the press input (e.g., the increase in intensity of the contact or the decrease in intensity of the contact, depending on the circumstances).

For ease of explanation, the descriptions of operations performed in response to a press input associated with a press-input intensity threshold or in response to a gesture including the press input are, optionally, triggered in response to detecting either: an increase in intensity of a contact above the press-input intensity threshold, an increase in intensity of a contact from an intensity below the hysteresis intensity threshold to an intensity above the press-input intensity threshold, a decrease in intensity of the contact below the press-input intensity threshold, and/or a decrease in intensity of the contact below the hysteresis intensity threshold corresponding to the press-input intensity threshold. Additionally, in examples where an operation is described as being performed in response to detecting a decrease in intensity of a contact below the press-input intensity threshold, the operation is, optionally, performed in response to detecting a decrease in intensity of the contact below a hysteresis intensity threshold corresponding to, and lower than, the press-input intensity threshold.

FIGS. 6A-6E illustrate example user interfaces for managing or controlling the presentation of audio content in accordance with some embodiments. For example, the electronic device enables a user to navigate to a webpage within a browser interface (e.g., browser interface 600). In some embodiments, the webpage automatically initiates presentation of audio content. However, the user may desire to quickly silence or mute the audio content that is playing without locating the media player controls of the audio content within the webpage. In some embodiments, the audio content that is playing does not have or otherwise is not associated with a set of media player controls. As such, the electronic device is configured to adjust (e.g., mute) audio content that is playing irrespective of the presence of the set of media player controls.

Accordingly, the present embodiments provide audio control for a browser interface of a browser application. Specifically, an audio control affordance is displayed at a noticeable and recognizable position or area in the browser interface, and based on a determination that a webpage (e.g., within a tabbed window) includes audio content and/or determination of playback of the audio content. The user may in turn readily adjust a property of the audio content.

The embodiments of FIGS. 6A-6G are implemented in an electronic device including at least a display and one or more audio output devices. In some embodiments, the electronic device is the same as or similar to portable multifunction device 100 (FIG. 1), multifunction device 300 (FIG. 3), and/or personal electronic device 500 (FIG. 5). Further, in some embodiments, display is the same as or similar to one touch-sensitive display system 112 (FIG. 1), display 340 (FIG. 3), and/or touch-sensitive display screen 504 (FIG. 5). In some embodiments, the one or more audio output devices is the same as or similar to speaker 111 (FIG. 1) and/or audio circuitry 110 (FIG. 1).

Figure 6A:
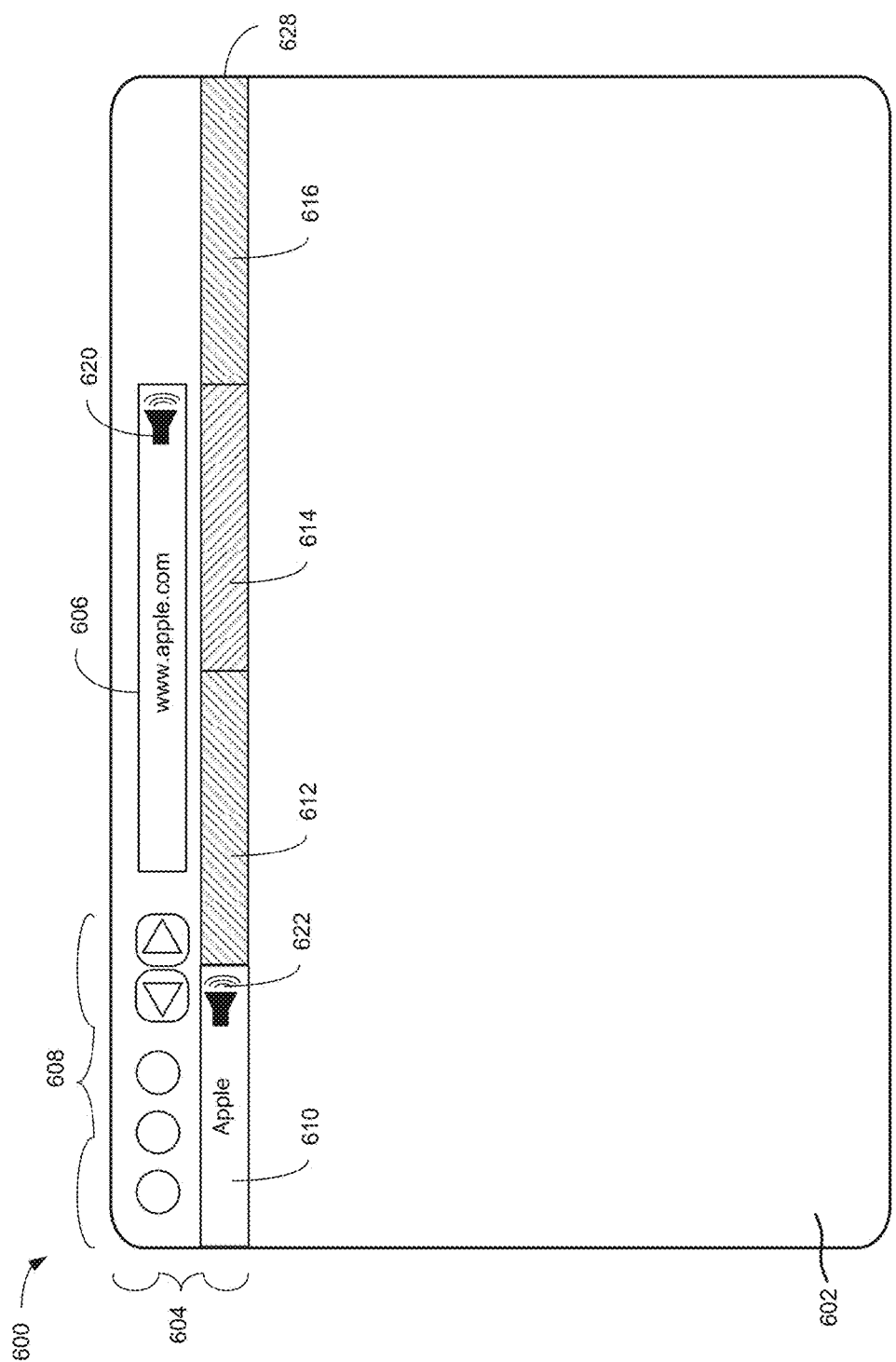
FIG. 6A illustrates an example user interface for audio control in a browser interface in accordance with some embodiments.

Referring to FIG. 6A, a browser interface 600 is illustrated in accordance with some embodiments. Specifically, browser interface 600 is a browser of a browser application (e.g., Safari released by Apple Inc. of Cupertino, Calif.) for retrieving, presenting and traversing information resources (e.g., webpage content) on the World Wide Web. Browser interface 600 is displayed on a display such as display 112 (FIG. 1), 340 (FIG. 3), and/or 504 (FIG. 5). In some embodiments, browser interface 600 allows a user to control the presentation of audio content associated with one or more webpages displayed in respective tabbed windows. For example, browser interface 600 is configured to display one or more webpages that include audio content.

Browser interface 600 includes a first portion 602 and a second portion 604 distinct from the first portion 602. First portion 602 is configured to display content in a set of tabbed windows that include a plurality of tabbed windows. In some embodiments, the first portion 602 includes a body of the webpages without one or more control affordances. Second portion 604 includes one or more control affordances and is sometimes referred to as the "chrome" of the browser. For example, second portion 604 includes one or more control affordances 608, address bar 606, and/or a tab bar 618.

In a non-limiting example, the one or more control affordances 608 include one or more of an exit affordance, a previous webpage affordance, and/or a forward webpage affordance. The address bar 606 includes a current uniform resource locator (URL) and accepts an entered URL that navigates the user to a chosen webpage in browser interface 600. That is, the address bar 606 includes a web address entry region of the browser interface 600. In some embodiments, the actual or literal URL is not displayed in the address bar 606. In some embodiments the web address entry region is also configured to receive search queries and display bookmarks. In some embodiments, the address bar 606 is also referred to as, and/or includes the functionalities of a smart search field, which provides search results in response to entered text. Further, the tab bar 618 includes a first tab 610, a second tab 612, a third tab 614, and a fourth tab 616, each of which is associated with a respective tabbed window from the set of tabbed windows. Although shown as including four tabbed windows, it should be understood that browser interface 600 includes any number of tabbed windows.

In some embodiments, browser interface 600 is configured to display one or more audio control affordances 620, 622, and/or 624 for managing the presentation of audio content associated with one or more of the tabbed windows. For example, in some embodiments, browser interface 600 includes a large number of tabbed windows as part of the set of tabbed windows. Upon navigation to a webpage in a tabbed window having audio content, a user may desire to swiftly adjust (e.g., mute) the presentation of the audio content without having to locate the precise tabbed window including the media player controls of the audio content to perform such action. In some embodiments, a webpage is considered to have audio content (or include audio content) when that audio content is being played/presented in the webpage.

As such, browser interface 600 includes one or more audio control affordances 620, 622, 624, and/or 626 positioned or located in the second portion 604 (e.g., in address bar 606 and/or in one or more tabs 610, 612, 614, and/or 616) for swift management of the presentation of audio content. For instance, one or more audio control affordances 620, 622, and/or 624 are displayed at certain locations in the second portion 604 of browser interface 600 when audio content is determined to playing in at least one tabbed window (e.g., in a webpage). In some embodiments, the audio content is one or more of hypertext markup language embedded audio content, a web audio content, and/or a plug-in audio content.

Specifically, in some embodiments, the electronic device such as electronic device 100 (FIG. 1), 300 (FIG. 3), or 500 (FIG. 5) is configured to determine whether one or more of the tabbed windows (e.g., first tab 610, second tab 612, third tab 614, or fourth tab 616) includes audio content. For instance, referring to FIG. 6A, the electronic device determines that first tab 610 includes audio content (e.g., first tab 610 includes a presentation/playing of audio content). In some embodiments, first tab 610 is part of a tabbed window that is associated with the first portion 602 and is displayed in the foreground of the first portion 602. In some embodiments, the first tab 610 is part of a tabbed window that is associated with the first portion 602 but is not displayed in the foreground (e.g., displayed in background) of the first portion 602. As such, the audio content is associated with a webpage rendered in a background tab.

In addition, the electronic device is configured to display one or more of the one or more audio control affordances 620, 622, and/or 624 in the second portion 604 of the browser interface 600 in accordance with a determination that one or more of the tabbed windows includes audio content. In some embodiments, the second portion 604 includes one or both of an address bar 606 and a tab bar 628 including one or more tabs (e.g., first tab 610, second tab 612, third tab 614, and/or fourth tab 616). For example, in some embodiments, browser interface 600 is configured to display a first audio control affordance 620 in or adjacent address bar 606 in accordance with a determination that the tabbed window of the first tab 610 includes audio content. In such example, the tabbed window of the first tab 610 is playing web audio content from or within a webpage.

Moreover, in such instance, browser interface 600 is configured to display a second audio control affordance 622 in a first tab 610 associated with a tabbed window in accordance with determination that one or more of the tabbed windows includes audio content. In some embodiments, first tab 610 is a foreground tab. In some embodiments, first tab 610 is a background tab. As such, in some embodiments, second audio control affordance 622, which is displayed in the address bar 606, is displayed in conjunction with, and having the same appearance, as first audio control affordance 620, when second audio control affordance 622 is displayed in a foreground tab.

Conversely, the electronic device is configured to forgo displaying at least one of the one or more audio control affordances 620, 622, and/or 624 in the second portion 604 of the browser interface 600 in accordance with a determination that the set of one or more tabbed windows do not include audio content. For example, the electronic device determines that fourth tab 616 does not include and/or present audio content. Accordingly, the electronic device is configured to forgo display of an audio control affordance at one or both of the address bar 606 and at the fourth tab 616 (e.g., second portion 604) when the fourth tab 616 is a foreground tabbed window, or at the fourth tab 616 (e.g., second portion 604) when the fourth tab 616 is a background tab.

The electronic device is also configured to cease or change an appearance of the display of the one or more audio control affordances 620, 622, and/or 624 based on whether the presentation of the audio content has adjusted or ceased. In some embodiments, while the audio control affordance is displayed, the electronic device configured browser interface 600 to determine that presentation of the audio content has terminated. Accordingly, the electronic device ceases display (or alters display) of at least one of the one or more audio control affordances in response to determining that presentation of the audio content has terminated.

For instance, in some embodiments, the presentation of the audio content associated with the tabbed window of the first tab 610 terminates. As such, the electronic device is configured to cease display of second audio control affordance 622. In such an example, first tab 610 would then be displayed in a similar manner as fourth tab 616, which does not have or is presenting audio content. Further, in such example, tabbed window of first tab 610 is a foreground tabbed window. Accordingly, first audio control affordance 620 is correspondingly displayed at address bar 606. In a similar manner as to the display of the second audio control affordance 622 in the first tab 610 when audio content has terminated, the electronic device ceases display of first audio control affordance 620 at the address bar 606, and if no other tab (e.g., second tab 612 and/or third tab 614 is presenting audio content in the background).

In some embodiments, the electronic device configures browser interface to adjust an appearance of the one or more audio control affordances 620, 622, 624, and 626 based on whether the a property of the presentation of the audio content has been adjusted (e.g., muted or unmuted). Specifically, while the audio control affordance is displayed, the electronic device determines that presentation of the audio content has adjusted and/or terminated. Accordingly, the electronic device changes an appearance (e.g., a change in color or intensity) of the audio control affordance to indicate that the presentation of the audio content has terminated in response to determining that presentation of the audio content has terminated.

For example, in some embodiments, the presentation of the audio content associated with the tabbed window of the first tab 610 terminates. As such, the electronic device configures browser interface 600 to change display of second audio control affordance 622 (e.g., no longer displays second audio control affordance 622 at first tab 610). Further, tabbed window of first tab 610 is a foreground tabbed window (e.g., the contents of the foreground tabbed window are displayed, while the contents of the background tabbed windows are not displayed). Accordingly, first audio control affordance 620 is correspondingly displayed at address bar 606. In a similar manner as to the display of the second audio control affordance 622 in the first tab 610 when audio content has terminated, the electronic device changes an appearance of the first audio control affordance 620 at the address bar 606.

For example, upon terminating the presentation of the audio content at the first (foreground) tab 610, the electronic device configures browser interface 600 to determine whether other (background) tabs are presenting or playing audio content. The electronic device configures browser interface 600 to maintain display of the first audio control affordance 620 and change an appearance (e.g., from first appearance to second appearance) of the first audio control affordance 620 based on determining that other (background) tabs are presenting or playing audio content. However, the electronic device configures browser interface 600 to terminate or cease display of the first audio control affordance 620 based on determining that other (background) tabs are not presenting or playing audio content.

Referring to FIGS. 6A-6D, the one or more audio control affordances 620, 622, and/or 624 are displayed or otherwise presented in various forms based on an audio control affordance presentation state. That is, to facilitate the user in readily determining whether audio content of a particular tabbed window is being presented and unmuted or muted, and whether the particular tabbed window is a foreground tabbed window or a background tabbed window, the electronic device configures browser interface 600 to render and display the one or more audio control affordances 620, 622, and/or 624 in various audio control affordance presentation states. Accordingly, a respective audio control affordance indicates an audio content presentation status.

Referring to FIG. 6A, a first audio control affordance presentation state includes a deep filled representation indicating that audio content is being presented or playing in a foreground tab. In some embodiments, first audio control affordance 620, which is displayed within or proximate to address bar 606, and second audio control affordance 622, which is displayed in first (foreground) tab 610, are displayed having a deep filled representation. For instance, the audio content can be associated with a first webpage of a first tab 610 (e.g., corresponding to first tabbed window). In some embodiments, the electronic device configures browser interface 600 to determine whether the first webpage of the first tab 610 is rendered in a foreground tab.

Accordingly, the electronic device configures browser interface 600 to display the second audio control affordance 622 having the first audio control affordance presentation state in accordance with a determination that the first webpage is playing audio content and is rendered in the foreground tab. In some embodiments, the first audio control affordance presentation state is a deep filled presentation of the second audio control affordance 622. In some embodiments, the electronic device configures browser interface 600 to display the first audio control affordance 620 according to the same or similar determination described above with respect to the second audio control affordance 622.

Figure 6B:
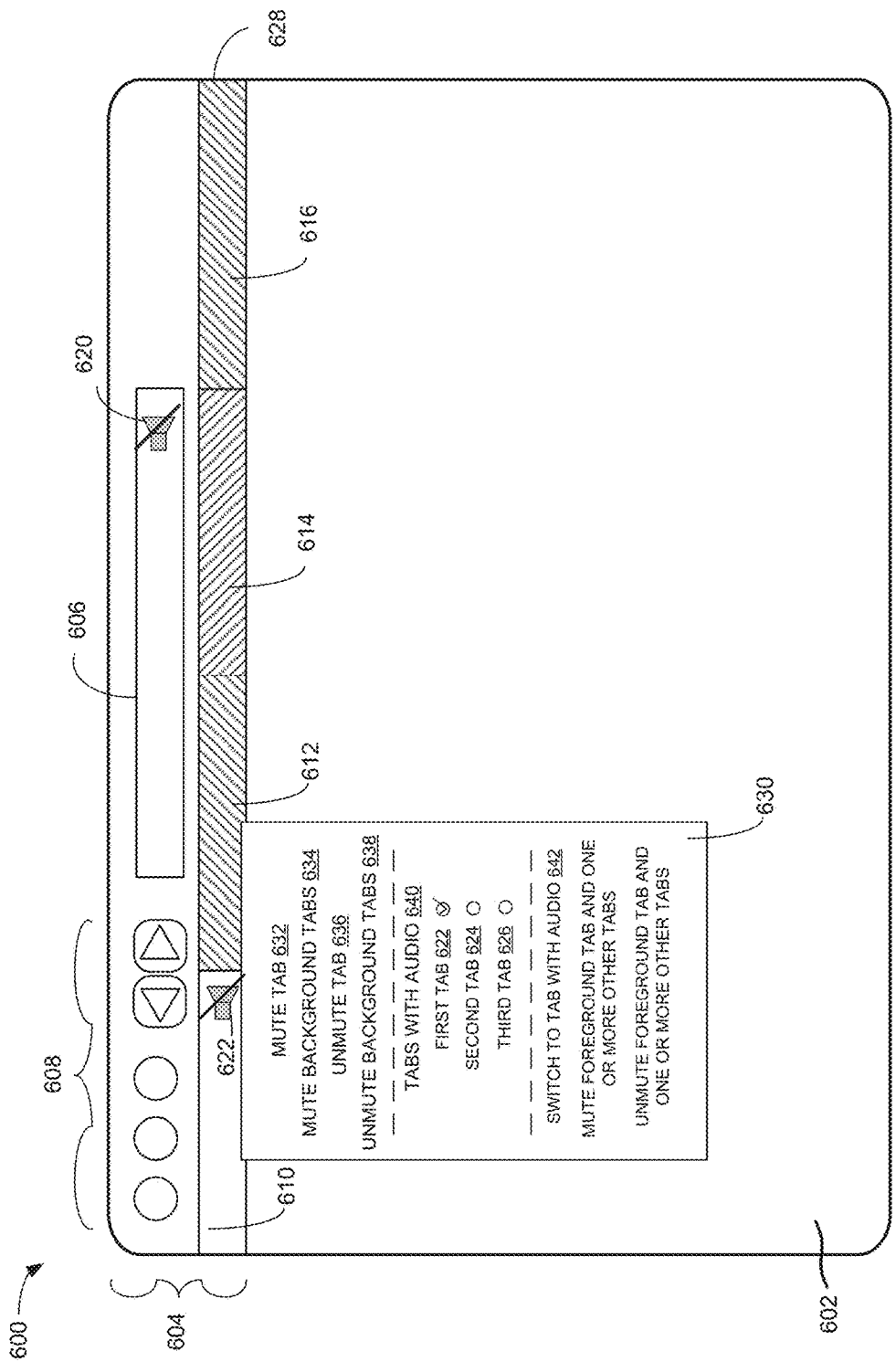
FIG. 6B illustrates another example user interface for audio control in a browser interface in accordance with some embodiments.

Referring to FIG. 6B, second audio control affordance presentation state includes a stricken and/or crossed-out filled representation indicating that audio content presented or playing in a foreground tab is muted. In some embodiments, one or both of first audio control affordance 620 and second audio control affordance 622 are displayed having a stroked and/or crossed-out filled representation. For example, the audio content can be associated with a webpage of a first tab 610 (e.g., corresponding to first tabbed window).

In some embodiments, the electronic device configures browser interface 600 to determine whether the webpage of the first tab 610 is rendered in a foreground tab. Accordingly, the electronic device configures browser interface 600 to display the second audio control affordance 622 having a second audio control affordance presentation state different from the first audio control affordance presentation state in accordance with a determination that the audio content being presented has been muted and that the webpage is rendered in the foreground tab.

Figure 6C:
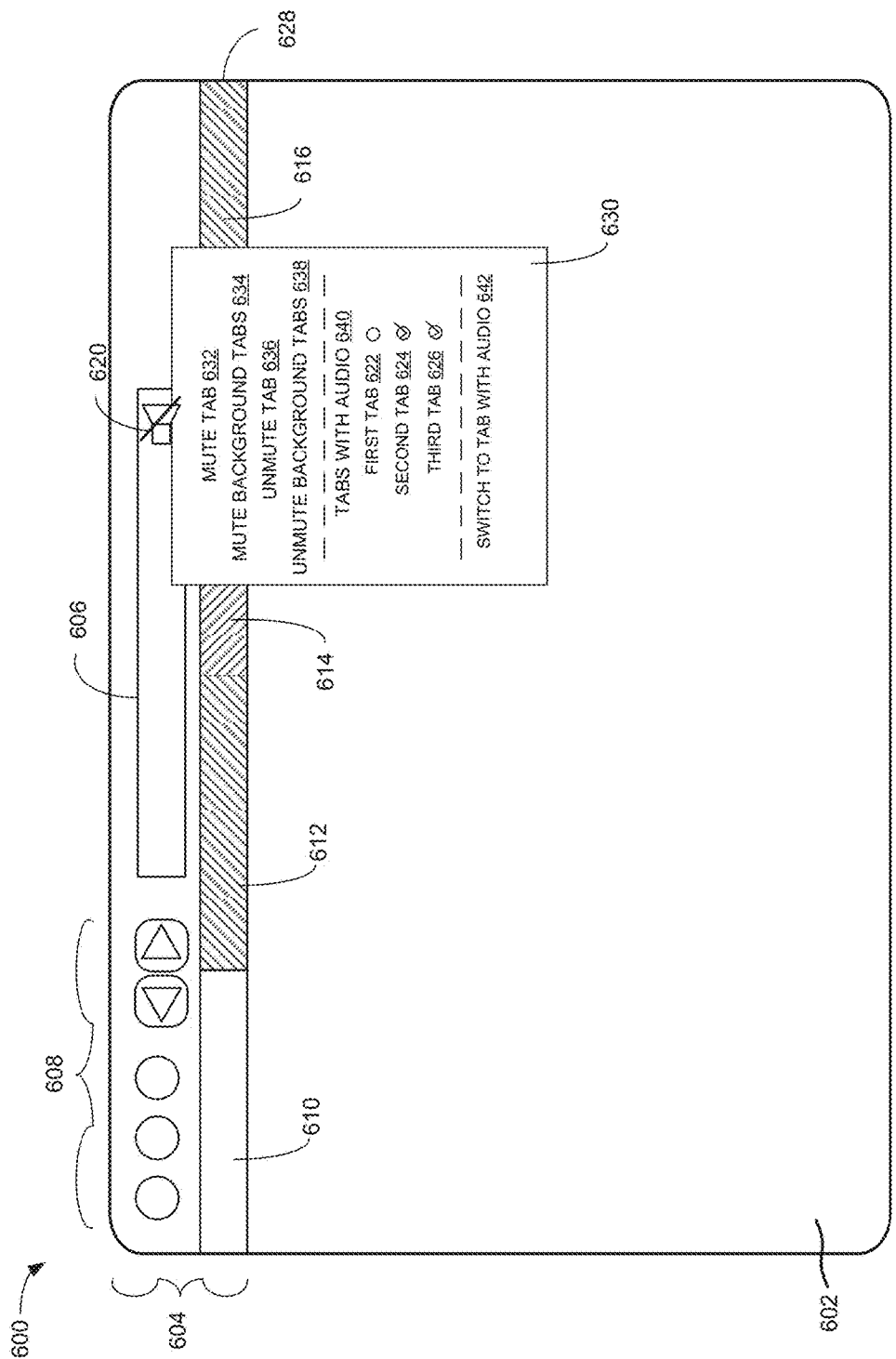
FIG. 6C illustrates a further example user interface for audio control in a browser interface in accordance with some embodiments.

Referring to FIG. 6C, a third audio control affordance presentation state includes a stricken and/or crossed-out unfilled representation indicating that audio content presented or playing in a background tab is muted. In some embodiments, first audio control affordance 620, which is displayed in address bar 606, is displayed having a stricken and/or crossed-out unfilled representation. For example, the audio content can be associated with a webpage of a background tab such as second tab 612 (e.g., corresponding to second tabbed window). In some embodiments, the electronic device configures browser interface 600 to determine whether the webpage of the second tab 612 is rendered in a background tab.

Accordingly, the electronic device configures browser interface 600 to display the first audio control affordance 620 having the third audio control affordance presentation state different from the first and second audio control affordance presentation states in accordance with a determination that the webpage includes audio content that is presented and muted, and is not rendered in the foreground tab (e.g., rendered in a background tab). In some embodiments, the electronic device configures browser interface 600 to forgo displaying of the second audio control affordance 622 at the second tab 612 having the third audio control affordance presentation state.

Figure 6D:
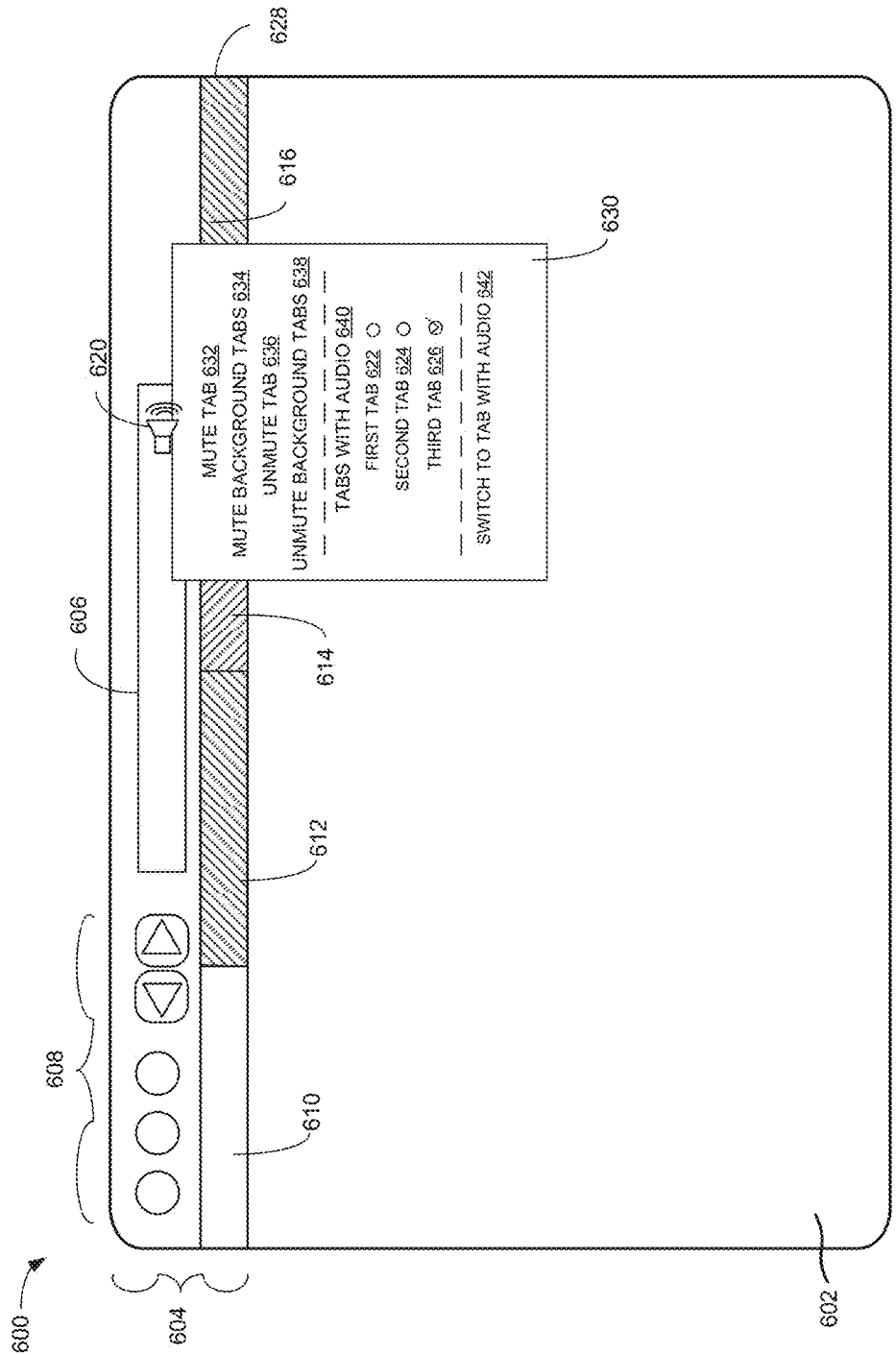
FIG. 6D illustrates an additional example user interface for audio control in a browser interface in accordance with some embodiments.
Figure 6E:
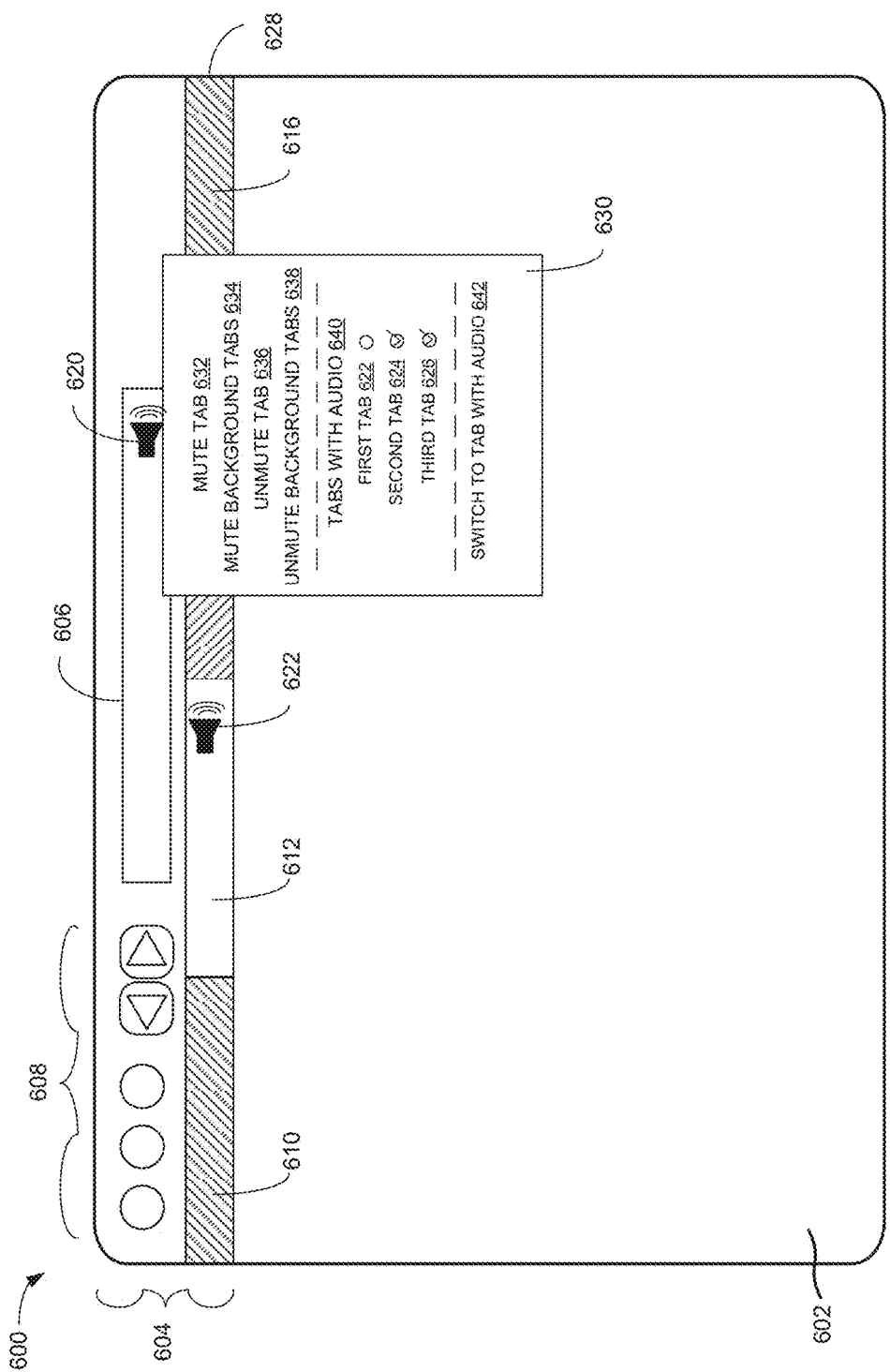
FIG. 6E illustrates an example user interface for audio control in a browser interface in accordance with some embodiments.

Referring to FIG. 6D, a fourth audio control affordance presentation state includes a unfilled representation indicating a presentation or playing of audio content in a background tab. In some embodiments, first audio control affordance 620, which is displayed in address bar 606, is displayed having the unfilled representation. For example, the electronic device determines that a background tab is presenting or playing in a background tab. In some embodiments, the electronic device determines that the third (background) tab 614 (e.g., including a third webpage) is presenting the audio content. The electronic device configures browser interface 600 to display the first audio control affordance 620 having a fourth audio control affordance presentation state different from the first, second, and third audio control affordance presentation states in accordance with a determination that the third tab 614 is presenting audio content in the background.

In some embodiments, the electronic device configures browser interface to determine whether a selection of a tab having an audio control affordance is made at a portion or area including the audio control affordance, or another portion or area outside the audio control affordance, yet within the tab. As such, the electronic device configures browser interface 600 to switch display to another tabbed window as the foreground tabbed window in accordance with a determination that the input or selection is outside the portion or area of the audio control affordance. Otherwise, the electronic device configures browser interface 600 to adjust a property of the presentation of the audio content associated with the tabbed window without switching to the tabbed window in accordance with a determination that the input or selection is within the portion or area including the audio control affordance.

In some embodiments, the first audio control affordance 620 in the address bar 606 of the browser interface 600 controls audio content for each tabbed window in the set of tabbed windows (e.g., first tab 610, second tab 612, third tab 614 and/or fourth tab 616). That is, first audio control affordance 620 in the address bar 606 works across all tabs in all windows. In some embodiments, the one or more audio control affordances at each tabbed window (e.g., second audio control affordance 622, third audio control affordance 624, and/or fourth audio control affordance 626) from the set of tabbed windows controls audio content for only the respective tabbed windows.

Referring back to FIG. 6B, an example user interface for controlling the presentation of audio content is illustrated in accordance with some embodiments. In particular, the electronic device is configured to perform an audio related procedure based on a receiving an input one of the one or more audio control affordances 620, 622, and/or 624. In some embodiments, for instance, the electronic device receives a first input representing a selection of second audio control affordance 622. In some embodiments, the first input takes the form of a selection of the second audio control affordance 622 using a mouse pointer. In some embodiments, the first input takes the form of a selection of the second audio control affordance 622 based on a touch or contact of a touch screen display.

The electronic device configures browser interface 600 based on the received input. For example, in some embodiments, the electronic device configures one or more audio output devices and/or browser interface 600 to adjust a property of the presentation of the audio content in response to receiving the first input representing the selection of the second audio control affordance 622. In some embodiments, adjusting the property of the presentation of the audio content includes one of muting the presentation of the audio content or unmuting the presentation of the audio content. As such, the foregoing embodiments enable a user to mute/unmute a presentation of audio content in a background tabbed window. That is, the electronic device configures browser interface 600 to mute/unmute first tab 610 presenting audio after switching to another tab (e.g., second tab 612 and/or third tab 614) in response to detecting selection of the second audio control affordance 622.

Further, the electronic device configures browser interface 600 to display menu 630 for enabling enhanced functionality and control of audio content associated with one or more tabbed windows. In some embodiments, while the second audio control affordance is displayed 622, receiving a second input representing a selection of the second audio control affordance 622. The electronic device determines whether a characteristic of the second input meets or exceeds the characteristic threshold in response to receiving the second input. That is, the electronic device determines whether a duration of the second input exceeds a temporal threshold or determines whether an intensity of the second input exceeds an intensity threshold.

Accordingly, the electronic device configures browser interface 600 to display menu 630 associated with one or more audio contents in accordance with a determination that the second input meets or exceeds the characteristic threshold. Otherwise, the electronic device configures one or more of the audio output devices and/or browser interface 600 to adjust a property of the presentation of the audio content in accordance with a determination that the second input does not meet or exceed the characteristic threshold.

Menu 630 is configured (e.g., via the electronic device and/or browser interface 600) to display one or more options (e.g., in the form of affordances) for controlling audio content at one or more tabs and/or tabbed windows. That is, menu 630 provides extended control and functionality for the management of audio content. As such, in the event a user desires to swiftly identify an audio content that is being presented, yet cannot identify which tabbed window is presenting the audio content, the user can prompt menu 630 to readily identify and adjust a property of the presentation of the audio content. That is, the improved user interface including the one or more audio control affordances enables the user to interact with the user interface (e.g., browser interface 600) more quickly and efficiently, thereby reducing device use time and saving battery life.

Specifically, in some embodiments, menu 630 includes a mute tab affordance 632 (e.g., a first affordance) that, when activated (e.g., in response to detecting user input selecting the first affordance) causes the device to mute presentation of the audio content associated with a foreground tabbed window (e.g., second tab 612) of the browser application without adjusting presentation of the audio content associated one or more other tabbed windows (e.g., first tab 610 and/or third tab 614). In some embodiments, menu 630 further includes a mute background tabs affordance 634 (e.g., a second affordance) that, when activated (e.g., in response to detecting user input selecting the second affordance) causes the device to mute presentation of audio content associated with one or more background tabbed windows (e.g., third tab 614, and optionally one or more additional tabs) of the browser application without adjusting presentation of the audio content associated one or more other tabbed windows (e.g., first tab 610 and/or second tab 612).

In some embodiments, menu 630 includes an unmute tab affordance 636 (e.g., a third affordance) that, when activated (e.g., in response to detecting user input selecting the third affordance) causes the device to unmute presentation of the audio content associated with a foreground tabbed window (e.g., first tab 610) of the browser interface 600 without adjusting presentation of the audio content associated one or more other tabbed windows (e.g., second tab 612 and/or third tab 614). In some embodiments, menu 630 includes an unmute background tabs affordance 638 (e.g., a fourth affordance) that, when activated (e.g., in response to detecting user input selecting the fourth affordance) causes the device to unmute presentation of the audio content associated with one or more background tabbed windows (e.g., second tab 612 and/or third tab 614) of the browser application without adjusting presentation of the audio content associated one or more other tabbed windows (e.g., first tab 610).

In some embodiments, menu 630 includes tabs with audio indication 640 indicating respective tabbed windows that are associated with audio content. The tabs with audio indication 640 include one or more affordances specifying each tab having audio. As shown in menu 630, first tab 610, second tab 612, and third tab 614 includes a corresponding and adjacent indication that indicates whether the tab has audio content, and/or whether the audio content is being presented.

In some embodiments, menu 630 includes a fifth affordance that, when activated (e.g., in response to detecting user input selecting the fifth affordance) causes the device to mute presentation of the audio content associated with the foreground tabbed window (e.g., first tab 610) of the browser application and a second audio content associated with one or more other tabbed windows (e.g., second tab 612 and/or third tab 614). In some embodiments, menu 630 includes a sixth affordance that, when activated (e.g., in response to detecting user input selecting the sixth affordance) causes the device to unmute presentation of the audio content associated with the foreground tabbed window (e.g., first tab 610) of the browser application and the second audio content associated with one or more other tabbed windows (e.g., second tab 612 and/or third tab 614).

In some embodiments, menu 630 includes a seventh affordance that, when activated (e.g., in response to detecting user input selecting the seventh affordance) causes the device to mute presentation of one or more audio contents associated with each background tabbed window (e.g., second tab 612 and/or third tab 614) of the browser application without adjusting presentation of the audio content associated foreground tabbed window (e.g., first tab 610). In some embodiments, menu 630 includes a switch to tab with audio affordance 642 (e.g., an eighth affordance) that switches display from a current foreground tabbed window (e.g., first tab 610) to a tabbed window including the second audio content as the foreground tabbed window (e.g., second tab 612). In some embodiments, menu 630 controls or enables management of audio content in one or more additional browser interface (e.g., of the same browser application) different from the browser interface 600.

It should be understood that although the above example referred to or involved receiving an input of the second audio control affordance, any of the audio control affordances displayed on browser interface 600 can be selected in a similar manner. For example, referring to FIG. 6E, the electronic device configures browser interface 600 to receive an input representing a selection of the first audio control affordance 620. In a similar manner described herein with respect to the second audio control affordance 622, upon determining that the input meets or exceeds the characteristic threshold (e.g., as described herein with respect to FIG. 6B), the electronic device configured browser interface 600 to display menu 630 associated with the audio content at or proximate to the first audio control affordance 620 (e.g., located in address bar 606).

Figure 6F:
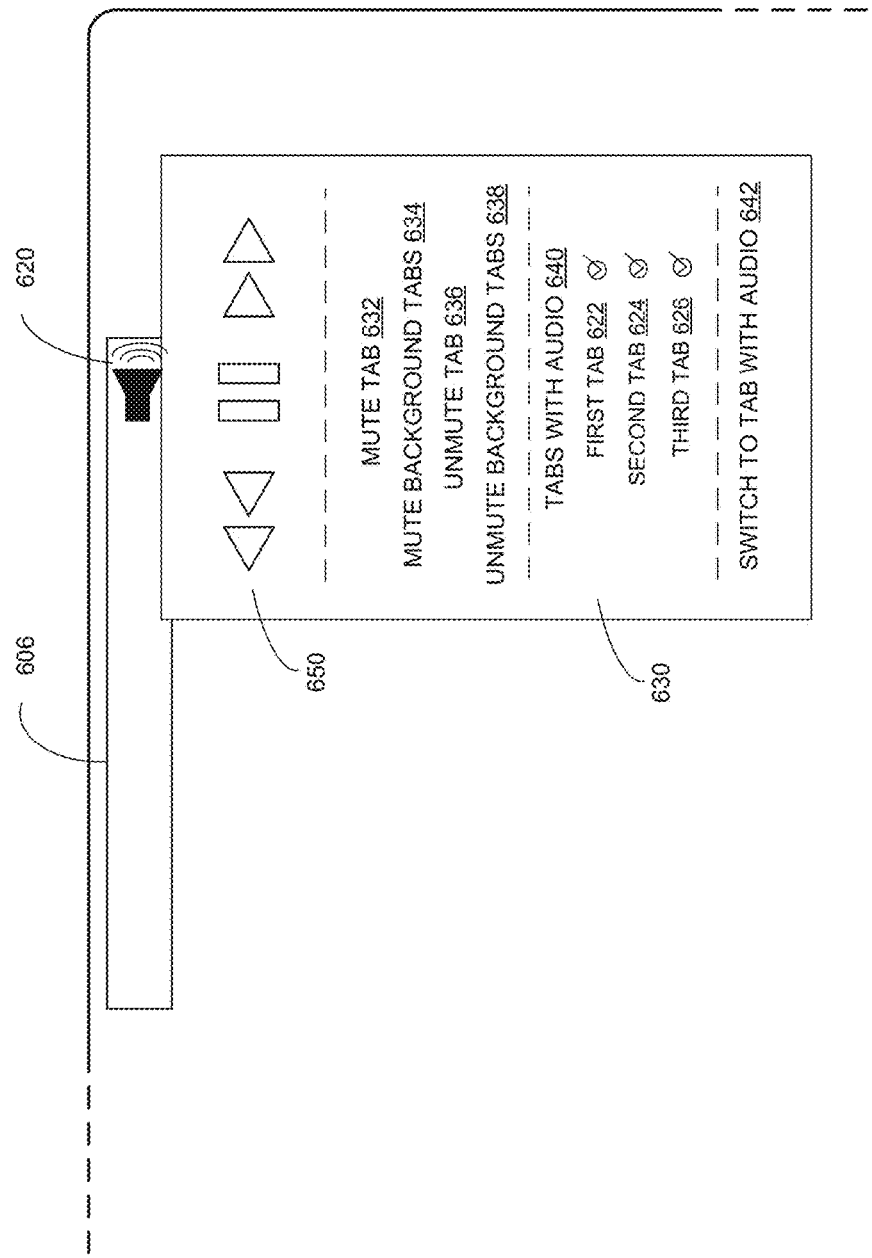
FIG. 6F illustrates an example user interface for audio control in a browser interface in accordance with some embodiments.

Referring to FIG. 6F, an example user interface for controlling the presentation of audio content is illustrated in accordance with some embodiments. Specifically, menu 630 includes extended audio control features and functionalities. For instance, menu 630 includes a set of media player control affordances 650 for controlling the presentation of the audio content. In some embodiments, the set of media player control affordances 650 includes a ninth affordance that ceases presentation of the audio content associated with the tabbed window (e.g., first tab 610, second tab 612 and/or third tab 614) and initiates presentation of a previous audio content associated with the tabbed window. In some embodiments, the tabbed window is displayed as one of the foreground tabbed window or the background tabbed window.

In some embodiments, the set of media player control affordances 650 includes a tenth affordance that pauses presentation of the audio content associated with the tabbed window. Additionally, the set of media player control affordances 650 includes an eleventh affordance that ceases presentation of the audio content associated with the tabbed window and initiates presentation of a subsequent audio content associated with the tabbed window. In some embodiments, the set of media player control affordances 650 includes an AirPlay affordance. In some embodiments, the set of media player control affordances 650 includes an affordance for causing the set of media player controls to be displayed in a separate window.

Figure 6G:
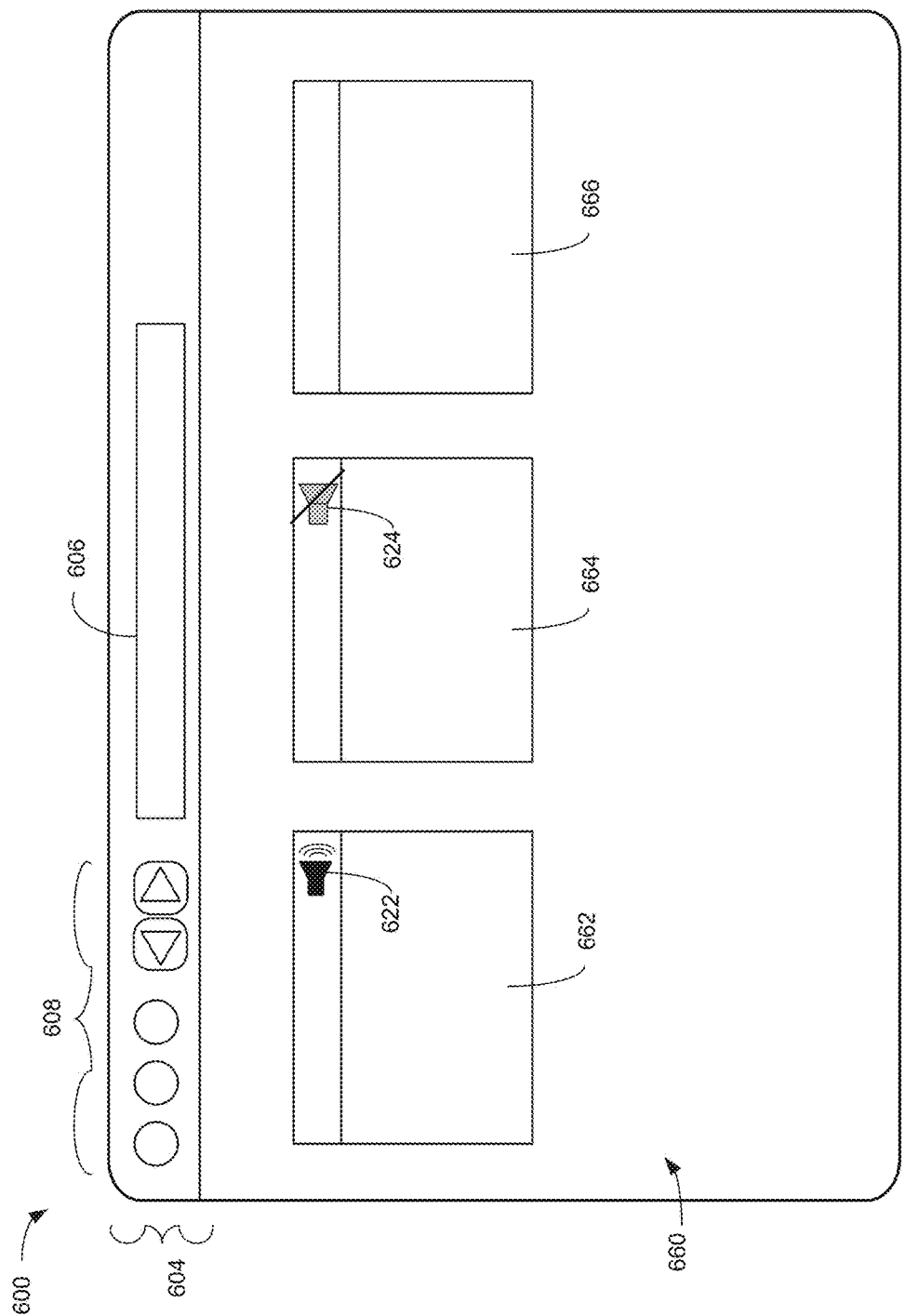
FIG. 6G illustrates an example user interface for audio control in a browser interface in accordance with some embodiments.

Referring to FIG. 6G, an example user interface for controlling the presentation of audio content is illustrated in accordance with some embodiments. For example, the electronic device configures browser interface 600 to display one or more audio control affordances in a webpage selection interface 660 of the browser interface 600 including one or more webpages. In some embodiments, webpage selection interface 660 includes first tabbed window 662 having second audio control affordance 622 in a first audio control presentation state, second tabbed window 664 having a third audio control affordance 624 in a second audio control presentation state, and/or third tabbed window 666 not including and/or presenting audio content. It should be understood that the webpage selection interface 660 can include any number of webpages and/or tabbed windows.

In some embodiments, the electronic device can control audio content in other browser interfaces. For example, the electronic device includes a second browser interface of the browser application. Further, while the audio control affordance is displayed, the electronic device configures another browser interface to adjust a property of a presentation of an audio content of one or more tabbed windows of the other browser interface in response to receiving the twelfth input representing a selection of an audio control affordance. In some embodiments, to avoid flickering of the one or more audio control affordances, the electronic device controls the display of the audio control affordances. Specifically, the electronic device configures browser interface 600 to display the audio control affordance in accordance with a determination that a set of one or more audio control affordance display criteria are met. In some embodiments, the audio control affordance display criteria include a criterion that is met when the audio content is presented. For example, the audio control affordance display criteria include a criterion that the presentation of the audio content meets or exceeds a presentation time threshold.

Figure 7A:
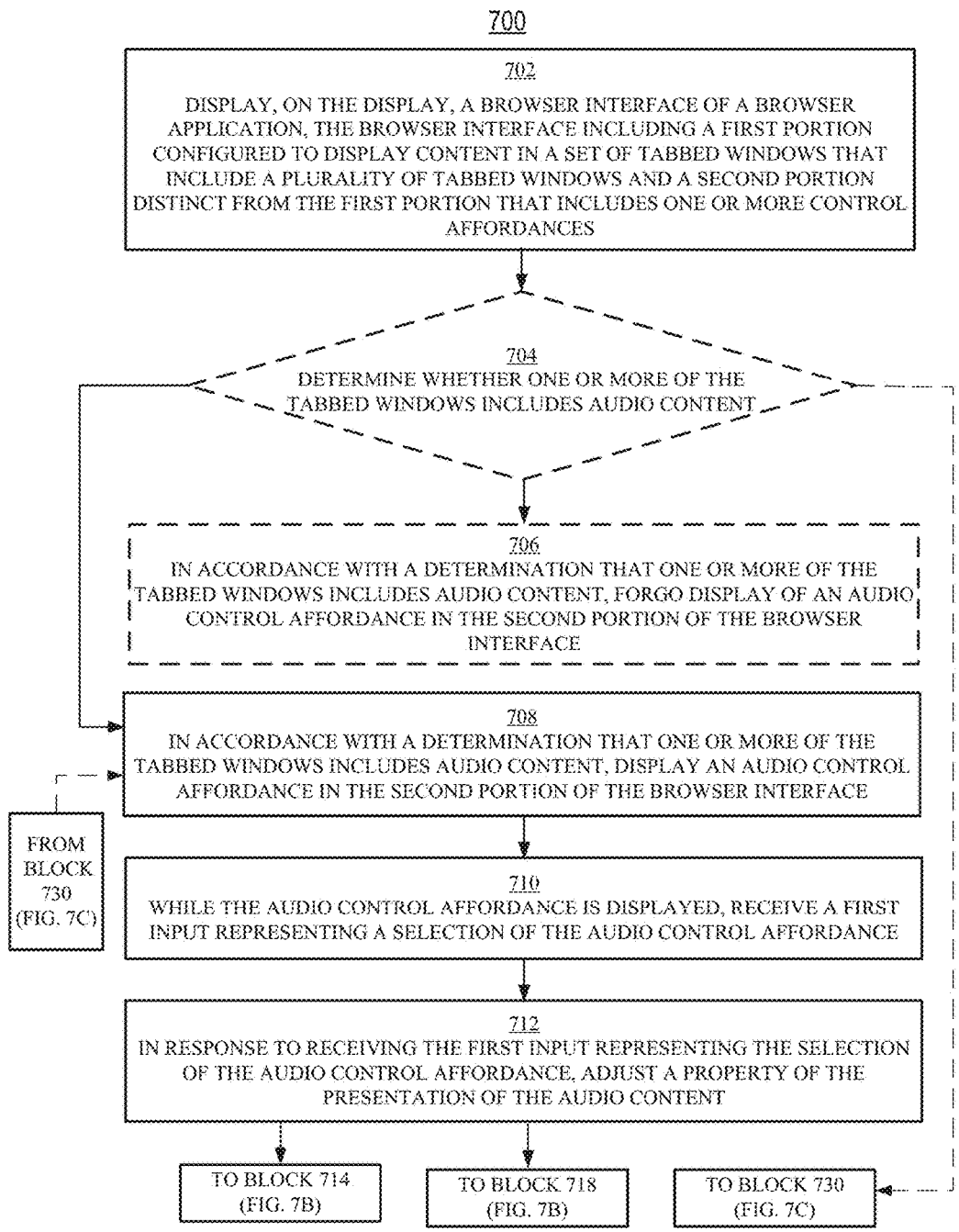
FIG. 7A is a flow diagram of an example process of audio control in a browser interface in accordance with some embodiments.
Figure 7B:
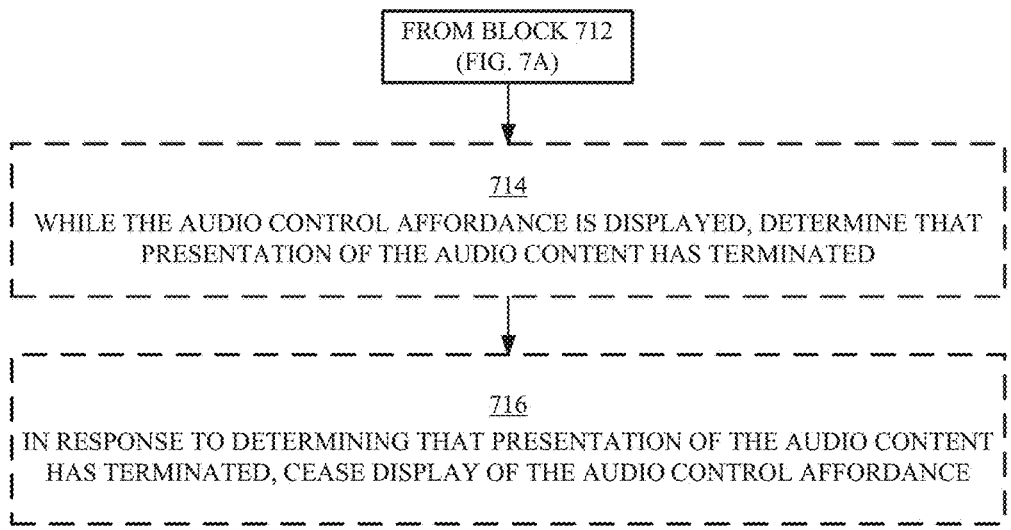
FIG. 7B is a flow diagram of a further example process of audio control in a browser interface in accordance with some embodiments.
Figure 7B:
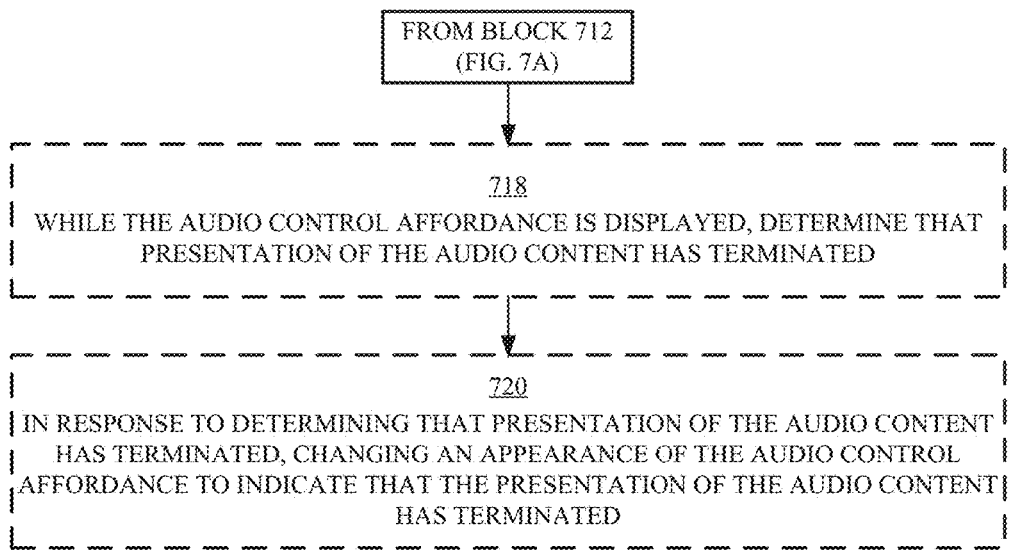
Figure 7C:
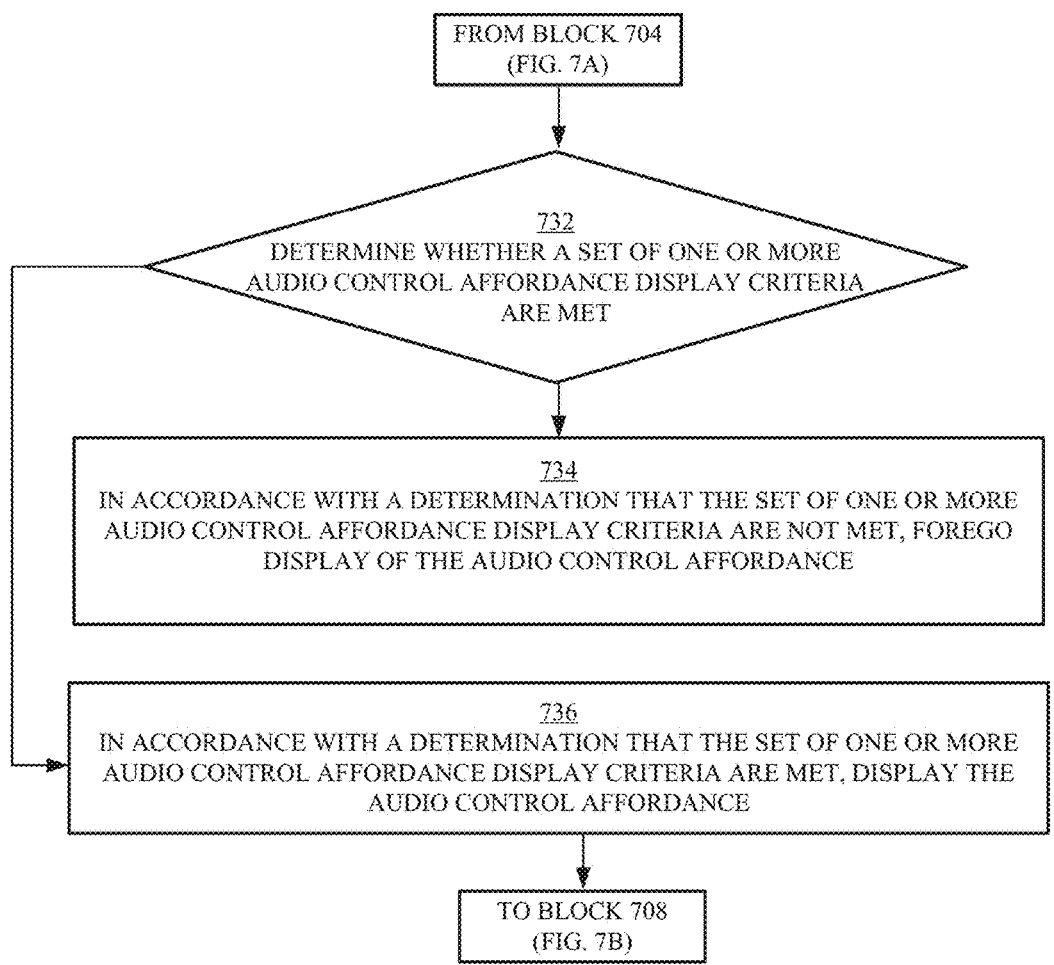
FIG. 7C is a flow diagram of a further example process of audio control in a browser interface in accordance with some embodiments.

FIGS. 7A-7C are flow diagrams illustrating a method of audio control in a browser interface using an electronic device and in accordance with some embodiments. Method 700 is performed at a device (e.g., 100, 300, and/or 500) with a display and one or more audio output devices. Some operations in method 700 may be combined, the order of some operations may be changed, and some operations may be omitted.

As described below, method 700 provides an intuitive way for readily and swiftly controlling or managing audio content in a browser interface. The method reduces the cognitive and/or physical burden on a user during such procedure, thereby creating a more efficient human-machine interface. For battery-operated computing devices, enabling a user to manage or control audio content faster and more efficiently conserves power and increases the time between battery charges.

At block 702, the electronic device displays, on the display (e.g., display 112, FIG. 1), a browser interface (e.g., browser interface 600, FIG. 6) of a browser application, the browser interface including a first portion (e.g., first portion 602, FIG. 6) configured to display content in a set of tabbed windows that include a plurality of tabbed windows and a second portion (e.g., second portion 604, FIG. 6) distinct from the first portion that includes one or more control affordances.

At block 704, the electronic device determines whether one or more of the tabbed windows (e.g., first tab 610, second tab 612, third tab 614, and/or fourth tab 616) includes audio content. Further, at block 706, the electronic device, in accordance with a determination that one or more of the tabbed windows includes audio content, forgoes display of an audio control affordance (e.g., one or more audio control affordances 620, 622, and/or 624, FIG. 6) in the second portion (e.g., second portion 604, FIG. 6) of the browser interface (e.g., browser interface 600, FIG. 6).

Optionally, the electronic device continues to block 730 (FIG. 7C), where a determination is made whether a set of one or more audio control affordance display criteria are met. At block 732, method 700, in accordance with a determination that the set of one or more audio control affordance display criteria are not met, forgoes displaying of the audio control affordance (e.g., first audio control affordance, FIG. 6). Alternatively, at block 736, the electronic device, in accordance with a determination that the set of one or more audio control affordance display criteria are met, displays the audio control affordance (e.g., first audio control affordance 620, FIG. 6). Method 700 then continues to block 708.

At block 708, the electronic device, in accordance with a determination that one or more of the tabbed windows includes audio content, displays an audio control affordance (e.g., one or more audio control affordances 620, 622, and/or 624, FIG. 6) in the second portion (e.g., second portion 604, FIG. 6) of the browser interface (e.g., browser interface 600, FIG. 6).

At block 710, the electronic device includes, while the audio control affordance (e.g., one or more audio control affordances 620, 622, and/or 624, FIG. 6) is displayed, receiving a first input representing a selection of the audio control affordance. At block 712, the electronic device, in response to receiving the first input representing the selection of the audio control affordance (e.g., one or more audio control affordances 620, 622, and/or 624, FIG. 6), adjust a property of the presentation of the audio content.

The electronic device proceeds to either block 714 or block 718 while the audio control affordance is displayed. In some embodiments, at block 714, the electronic device includes, while the audio control affordance is displayed, determining that presentation of the audio content has terminated. At block 716, the electronic device includes, in response to determining that presentation of the audio content has terminated, ceasing display of the audio control affordance.

In some embodiments, at block 718, the electronic device includes, while the audio control affordance is displayed, determining that presentation of the audio content has terminated. At block 720, the electronic device includes, in response to determining that presentation of the audio content has terminated, changing an appearance of the audio control affordance to indicate that the presentation of the audio content has terminated.

In accordance with some embodiments, the audio content is associated with a webpage rendered in a background tab.

In accordance with some embodiments in which the first input does not meet or exceed a characteristic threshold, the method (e.g., method 700) further includes: while the audio control affordance (e.g., one or more audio control affordances 620, 622, 624, and/or 626, FIG. 6) is displayed, receiving a second input representing a selection of the audio control affordance; in response to receiving the second input, determining whether a characteristic of the second input meets or exceeds the characteristic threshold; in accordance with a determination that the second input meets or exceeds the characteristic threshold, displaying a menu (e.g., menu 630, FIG. 6) associated with the audio content; and in accordance with a determination that the second input does not meet or exceed the characteristic threshold, adjusting a property of the presentation of the audio content.

In accordance with some embodiments, adjusting the property of the presentation of the audio content includes one of muting presentation of the audio content or unmuting presentation of the audio content.

In accordance with some embodiments, the menu (e.g., menu 630, FIG. 6) associated with the audio content includes one or more of: a first affordance (e.g., mute tab affordance 632, FIG. 6) that mutes presentation of the audio content associated with a foreground tabbed window (e.g., first tab 610, FIG. 6) of the browser application without adjusting presentation of the audio content associated one or more other tabbed windows, a second affordance (e.g., mute background tabs affordance 634, FIG. 6) that mutes presentation of an audio content associated with a background tabbed window of the browser application without adjusting presentation of the audio content associated one or more other tabbed windows, a third affordance (e.g., unmute tab affordance 636, FIG. 6) that unmutes presentation of the audio content associated with a foreground tabbed window of the browser application without adjusting presentation of the audio content associated one or more other tabbed windows, a fourth affordance (e.g., unmute background tabs 638, FIG. 6) that unmutes presentation of the audio content associated with a background tabbed window of the browser application without adjusting presentation of the audio content associated one or more other tabbed windows, and one or more affordances (e.g., tabs with audio 640, FIG. 6) indicating respective tabbed windows that are associated with audio content.

In accordance with some embodiments, the menu (e.g., menu 630, FIG. 6) associated with the audio content further includes one or more of: a fifth affordance that mutes presentation of the audio content associated with the foreground tabbed window of the browser application and a second audio content associated with one or more other tabbed windows (e.g., using tabs with audio indication/affordance 640, FIG. 6), a sixth affordance that unmutes presentation of the audio content associated with the foreground tabbed window of the browser application and the second audio content associated with one or more other tabbed windows (e.g., using tabs with audio affordance 640, FIG. 6), a seventh affordance that mutes presentation of one or more audio contents associated with each background tabbed window of the browser application without adjusting presentation of the audio content associated foreground tabbed window (e.g., using tabs with audio affordance 640, FIG. 6), and an eighth affordance (e.g., switch to tab with audio 642, FIG. 6) that switches display from a current foreground tabbed window to a tabbed window including the second audio content as the foreground tabbed window.

In accordance with some embodiments, the method further includes: receiving a third input representing a selection of the first affordance (e.g., mute tab affordance 632, FIG. 6); and in response to receiving the third input, muting presentation of the audio content associated with a foreground tabbed window (e.g., first tab 610, FIG. 6) of the browser application without adjusting presentation of the audio content associated one or more other tabbed windows.

In accordance with some embodiments, the method further includes: receiving a fourth input representing a selection of the second affordance (e.g., mute background tabs, FIG. 6); and in response to receiving the fourth input, muting presentation of an audio content associated with a background tabbed window (e.g., second tab 612, FIG. 6) of the browser application without adjusting presentation of the audio content associated one or more other tabbed windows.

In accordance with some embodiments, the method further includes: receiving a fifth input representing a selection of the third affordance (e.g., unmute tab affordance 636, FIG. 6); and in response to receiving the fifth input, unmuting presentation of the audio content associated with a foreground tabbed window (e.g., first tab 610, FIG. 6) of the browser application without adjusting presentation of the audio content associated one or more other tabbed windows.

In accordance with some embodiments, the method further includes: receiving a sixth input representing a selection of the fourth affordance (unmute background tabs 638, FIG. 6); and in response to receiving the sixth input, unmuting presentation of the audio content associated with a background tabbed window (e.g., second tab 612, FIG. 6) of the browser application without adjusting presentation of the audio content associated one or more other tabbed windows.

In accordance with some embodiments, the method further includes: receiving a seventh input representing a selection of the fifth affordance (e.g., two or more of first tab 610, second tab 612, and/or third tab 614 in the tabs with audio affordance 640, FIG. 6); and in response to receiving the seventh input, muting presentation of the audio content associated with the foreground tabbed window of the browser application and a second audio content associated with one or more other tabbed windows.

In accordance with some embodiments, the method further includes: receiving an eighth input representing a selection of the sixth affordance (e.g., using tabs with audio affordance 640, FIG. 6); and in response to receiving the eighth input, unmuting presentation of the audio content associated with the foreground tabbed window of the browser application and the second audio content associated with one or more other tabbed windows.

In accordance with some embodiments, the method further includes: receiving an ninth input representing a selection of the seventh affordance (e.g., using tabs with audio affordance 640, FIG. 6); and in response to receiving the ninth input, muting presentation of one or more audio contents associated with each background tabbed window of the browser application without adjusting presentation of the audio content associated foreground tabbed window.

In accordance with some embodiments, the method further includes: receiving a tenth input representing a selection of the eighth affordance (e.g., switch to tab with audio affordance 642, FIG. 6); in response to receiving the tenth input: ceasing display of the current foreground tabbed window; and displaying the tabbed window including the second audio content as the foreground tabbed window.

In accordance with some embodiments, the menu (e.g., menu 630, FIG. 6) associated with the audio content further includes one or more of: a ninth affordance (e.g., set of media player controls 650, FIG. 6) that ceases presentation of the audio content associated with the tabbed window and initiates presentation of a previous audio content associated with the tabbed window, wherein the tabbed window is displayed as one of the foreground tabbed window or the background tabbed window; a tenth affordance (e.g., set of media player controls 650, FIG. 6) that pauses presentation of the audio content associated with the tabbed window; or an eleventh affordance (e.g., set of media player controls 650, FIG. 6) that ceases presentation of the audio content associated with the tabbed window and initiates presentation of a subsequent audio content associated with the tabbed window.

In accordance with some embodiments, the audio content is associated with a first webpage (e.g., associated with first tab 610, FIG. 6), and wherein displaying the audio control affordance (e.g., second audio control affordance 622, FIG. 6) includes: determining whether the first webpage is rendered in a foreground tab; in accordance with a determination that the first webpage is rendered in the foreground tab, displaying the audio control affordance having a first appearance; and in accordance with a determination that the first webpage is not rendered in the foreground tab, displaying the audio control affordance having a second appearance (e.g., appearance of third audio control affordance 624, FIG. 6) different from the first appearance.

In accordance with some embodiments, displaying the audio control affordance includes: determining that the presentation of the audio content has been muted; and in accordance with a determination that the presentation of the audio content has been muted, displaying the audio control affordance having a third appearance different from the first appearance and the second appearance.

In accordance with some embodiments, displaying the audio control affordance in the second portion (e.g., second portion 604) includes displaying the audio control affordance in a web address entry region of the browser interface (e.g., browser interface 600, FIG. 6).

In accordance with some embodiments, displaying the audio control affordance in the second portion (e.g., second portion 604) includes displaying the audio control affordance in a tab of a second tabbed window from the set of tabbed windows within the browser interface.

In accordance with some embodiments, the method further includes: receiving an eleventh input representing a selection of the tab (e.g., first tab 610, FIG. 6), wherein the tab includes a third portion including the audio control affordance (e.g., portion including second audio control affordance 622, FIG. 6) and a fourth portion configured to switch to the second tabbed window (e.g., portion outside second audio control affordance 622, yet within the first tab 610, FIG. 6); in response to receiving the eleventh input, determining whether the tenth input represents selection of the third portion or the fourth portion; in accordance with a determination that the eleventh input represents selection of the third portion, adjusting a property of the presentation of a third audio content associated with the second tabbed window without switching to the second tabbed window; and in accordance with a determination that the eleventh input represents selection of the fourth portion, switching display to the second tabbed window as the foreground tabbed window.

In accordance with some embodiments, displaying the audio control affordance in the second portion includes one or both of: displaying an audio control affordance in an address bar (e.g., address bar 606, FIG. 6) of the browser interface, wherein the audio control affordance controls audio content for each tabbed window in the set of tabbed windows, or displaying one or more audio control affordances at each tabbed window from the set of tabbed windows, wherein the one or more audio control affordances control audio content for only the respective tabbed windows.

In accordance with some embodiments, the set of tabbed windows includes a third tabbed window (e.g., third tab 614, FIG. 6) including fourth audio content that is not being played, wherein displaying the audio control affordance (e.g., one or both of first audio control affordance 620 and/or second audio control affordance 622, FIG. 6) includes: displaying, in the tabbed window (e.g., first tab 610, FIG. 6), the audio control affordance; and forgoing display, in the third tabbed window, the audio control affordance.

In accordance with some embodiments, displaying the audio control affordance (e.g., one or both of first audio control affordance 620 and/or second audio control affordance 622, FIG. 6) in the second portion includes displaying the audio control affordance in a webpage selection interface (e.g., webpage selection interface 660, FIG. 6) of the browser interface (e.g., browser interface 600, FIG. 6) including one or more webpages (e.g., corresponding to windows 662-666, FIG. 6).

In accordance with some embodiments, the method further includes, while the audio control affordance (e.g., one or both of first audio control affordance 620 and/or second audio control affordance 622, FIG. 6) is displayed: displaying a second browser interface (e.g., different from browser interface 600) of the browser application; receiving a twelfth input representing a selection of the audio control affordance; in response to receiving the twelfth input representing a selection of the audio control affordance, adjusting a property (e.g., mute/unmute) of a presentation of an audio content of one or more tabbed windows of the second browser interface.

In accordance with some embodiments, the method further includes in accordance with a determination that a set of one or more audio control affordance display criteria are met, displaying the audio control affordance (e.g., one or both of first audio control affordance 620 and/or second audio control affordance 622, FIG. 6), wherein the audio control affordance display criteria include a criterion that is met when the audio content is presented.

In accordance with some embodiments, the audio control affordance display criteria include a criterion that the presentation of the audio content meets or exceeds a presentation time threshold (e.g., so as to avoid flickering of one or both of first audio control affordance 620 and/or second audio control affordance 622, FIG. 6).

In accordance with some embodiments, the audio content (e.g., playing or being presented in one of the tabs of browser interface 600, FIG. 6) is one of a hypertext markup language embedded audio content, a web audio content, or a plug-in audio content.

Figure 8:
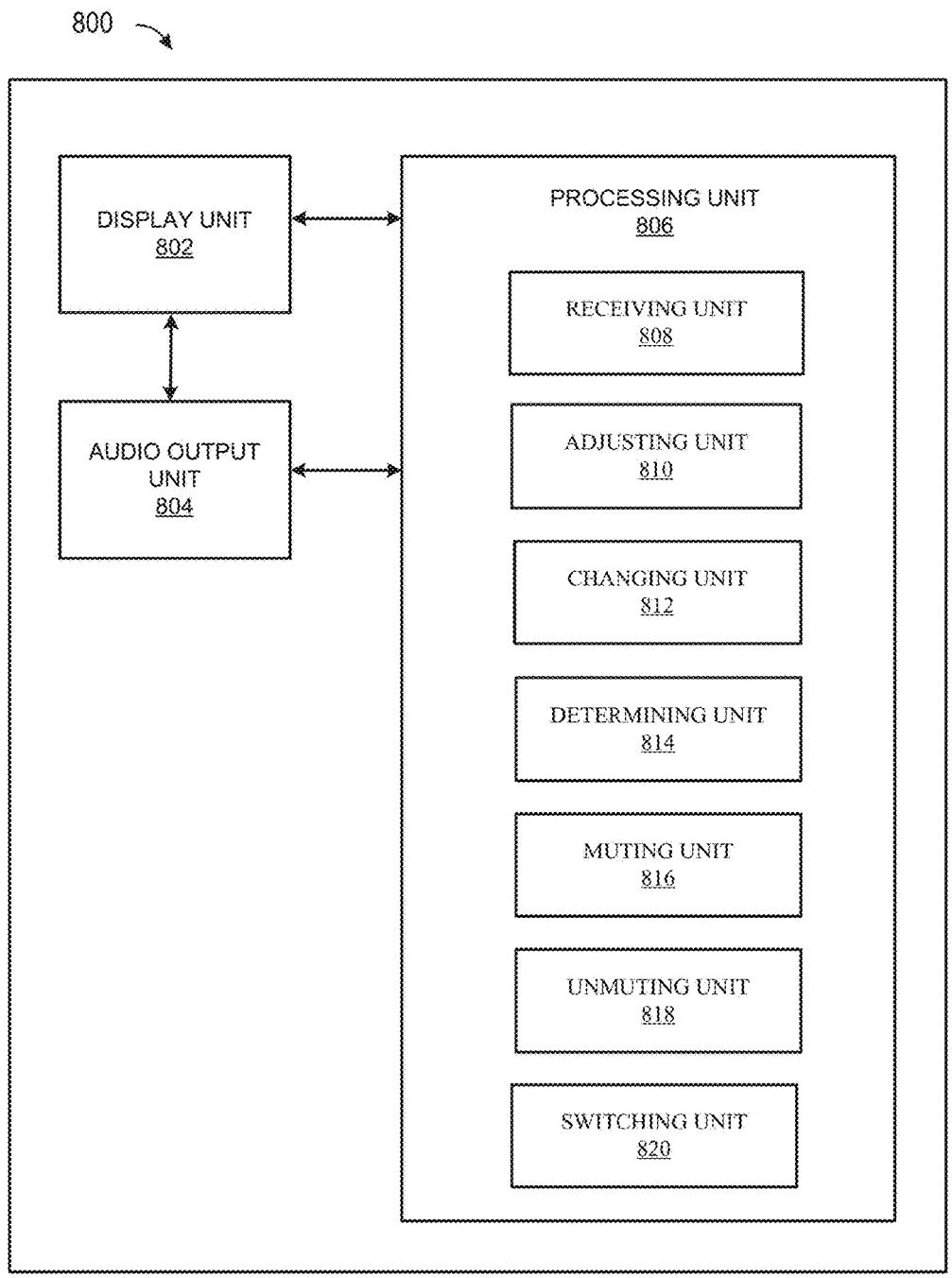
FIG. 8 is a functional block diagram in accordance with some embodiments.

In accordance with some embodiments, FIG. 8 shows an exemplary functional block diagram of an electronic device 800 configured in accordance with the principles of the various described embodiments. In accordance with some embodiments, the functional blocks of electronic device 800 are configured to perform the techniques described above. The functional blocks of the device 800 are, optionally, implemented by hardware, software, or a combination of hardware and software to carry out the principles of the various described examples. It is understood by persons of skill in the art that the functional blocks described in FIG. 8 are, optionally, combined or separated into sub-blocks to implement the principles of the various described examples. Therefore, the description herein optionally supports any possible combination or separation or further definition of the functional blocks described herein.

As shown in FIG. 8, an electronic device 800 includes a display unit 802, an audio output unit 804, and a processing unit 806 coupled to the display unit 802 and the audio output unit 804. In some embodiments, the processing unit 806 includes a receiving unit 808, adjusting unit 810, changing unit 812, determining unit 814, muting unit 816, unmuting unit 818, and switching unit 820.

The processing unit 806 is configured to: display (e.g., using display unit 802), a browser interface of a browser application, the browser interface including a first portion configured to display content in a set of tabbed windows that include a plurality of tabbed windows and a second portion distinct from the first portion that includes one or more control affordances, wherein displaying the second portion of the browser interface includes: in accordance with a determination that one or more of the tabbed windows includes audio content, display (e.g., using display unit 802) an audio control affordance in the second portion of the browser interface; while the audio control affordance is displayed, receive (e.g., using receiving unit 808) a first input representing a selection of the audio control affordance; and in response to receiving the first input representing the selection of the audio control affordance, adjust (e.g., using adjusting unit 810) a property of the presentation of the audio content.

In accordance with some embodiments, processing unit 806 is further be configured to, while the audio control affordance is displayed, determine that presentation of the audio content has terminated; and in response to determining that presentation of the audio content has terminated, cease (e.g., using display unit 802) display of the audio control affordance.

In accordance with some embodiments, processing unit 806 is further configured to while the audio control affordance is displayed, determine that presentation of the audio content has terminated; and in response to determining that presentation of the audio content has terminated, change (e.g., using changing unit 812) an appearance of the audio control affordance to indicate that the presentation of the audio content has terminated.

In accordance with some embodiments, the processing unit 806 is configured to, in accordance with a determination that the set of one or more tabbed windows do not include audio content, forgo (e.g., using display unit 802) display of the audio control affordance in the second portion of the browser interface.

In accordance with some embodiments, the audio content is associated with a webpage rendered in a background tab.

In accordance with some embodiments, the first input does not meet or exceed a characteristic threshold, and wherein the processing unit 806 is further configured to: while the audio control affordance is displayed, receive (e.g., using receiving unit 808) a second input representing a selection of the audio control affordance; in response to receiving the second input, determine (e.g., using determining unit 814) whether a characteristic of the second input meets or exceeds the characteristic threshold; in accordance with a determination that the second input meets or exceeds the characteristic threshold, display (e.g., using display unit 802) a menu associated with the audio content; and in accordance with a determination that the second input does not meet or exceed the characteristic threshold, adjust (e.g., using adjusting unit 810) a property of the presentation of the audio content.

In accordance with some embodiments, wherein to adjust the property of the presentation of the audio content, the processing unit 806 is further configured to one of mute (e.g., using muting unit 816) presentation of the audio content or unmute (e.g., using unmuting unit 818) presentation of the audio content.

In accordance with some embodiments, the menu associated with the audio content includes one or more of: a first affordance that mutes presentation of the audio content associated with a foreground tabbed window of the browser application without adjusting presentation of the audio content associated one or more other tabbed windows, a second affordance that mutes presentation of an audio content associated with a background tabbed window of the browser application without adjusting presentation of the audio content associated one or more other tabbed windows, a third affordance that unmutes presentation of the audio content associated with a foreground tabbed window of the browser application without adjusting presentation of the audio content associated one or more other tabbed windows, a fourth affordance that unmutes presentation of the audio content associated with a background tabbed window of the browser application without adjusting presentation of the audio content associated one or more other tabbed windows, and one or more affordances indicating respective tabbed windows that are associated with audio content.

In accordance with some embodiments, the menu associated with the audio content further includes one or more of: a fifth affordance that mutes presentation of the audio content associated with the foreground tabbed window of the browser application and a second audio content associated with one or more other tabbed windows, a sixth affordance that unmutes presentation of the audio content associated with the foreground tabbed window of the browser application and the second audio content associated with one or more other tabbed windows, a seventh affordance that mutes presentation of one or more audio contents associated with each background tabbed window of the browser application without adjusting presentation of the audio content associated foreground tabbed window, and an eighth affordance that switches display from a current foreground tabbed window to a tabbed window including the second audio content as the foreground tabbed window.

In accordance with some embodiments, the processing unit 806 is further configured to: receive (e.g., using receiving unit 808) a third input representing a selection of the first affordance; and in response to receiving the third input, mute (e.g., using muting unit 816) presentation of the audio content associated with a foreground tabbed window of the browser application without adjusting presentation of the audio content associated one or more other tabbed windows.

In accordance with some embodiments, the processing unit 806 is further configured to: receive (e.g., using receiving unit 808) a fourth input representing a selection of the second affordance; and in response to receiving the fourth input, mute (e.g., using muting unit 816) presentation of an audio content associated with a background tabbed window of the browser application without adjusting presentation of the audio content associated one or more other tabbed windows.

In accordance with some embodiments, the processing unit 806 is further configured to: receive (e.g., using receiving unit 808) a fifth input representing a selection of the third affordance; and in response to receiving the fifth input, unmute (e.g., using unmuting unit 818) presentation of the audio content associated with a foreground tabbed window of the browser application without adjusting presentation of the audio content associated one or more other tabbed windows.

In accordance with some embodiments, the processing unit 806 is further configured to: receive (e.g., using receiving unit 808) a sixth input representing a selection of the fourth affordance; and in response to receiving the sixth input, unmute (e.g., using unmuting unit 818) presentation of the audio content associated with a background tabbed window of the browser application without adjusting presentation of the audio content associated one or more other tabbed windows.

In accordance with some embodiments, the processing unit 806 is further configured to: receive (e.g., using receiving unit 808) a seventh input representing a selection of the fifth affordance; and in response to receiving the seventh input, mute (e.g., using muting unit 816) presentation of the audio content associated with the foreground tabbed window of the browser application and a second audio content associated with one or more other tabbed windows.

In accordance with some embodiments, the processing unit 806 is further configured to: receive (e.g., using receiving unit 808) an eighth input representing a selection of the sixth affordance; and in response to receiving the eighth input, unmute (e.g., using unmuting unit 818) presentation of the audio content associated with the foreground tabbed window of the browser application and the second audio content associated with one or more other tabbed windows.

In accordance with some embodiments, the processing unit 806 is further configured to: receive (e.g., using receiving unit 808) an ninth input representing a selection of the seventh affordance; and in response to receiving the ninth input, mute (e.g., using muting unit 816) presentation of one or more audio contents associated with each background tabbed window of the browser application without adjusting presentation of the audio content associated foreground tabbed window.

In accordance with some embodiments, the processing unit 806 is further configured to: receive (e.g., using receiving unit 808) a tenth input representing a selection of the eighth affordance; in response to receiving the tenth input: cease (e.g., using display unit 802) display of the current foreground tabbed window; and display (e.g., using display unit 802) the tabbed window including the second audio content as the foreground tabbed window.

In accordance with some embodiments, the menu associated with the audio content further includes one or more of: a ninth affordance that ceases presentation of the audio content associated with the tabbed window and initiates presentation of a previous audio content associated with the tabbed window, wherein the tabbed window is displayed as one of the foreground tabbed window or the background tabbed window; a tenth affordance that pauses presentation of the audio content associated with the tabbed window; or an eleventh affordance that ceases presentation of the audio content associated with the tabbed window and initiates presentation of a subsequent audio content associated with the tabbed window.

In accordance with some embodiments, the audio content is associated with a first webpage, and wherein to display the audio control affordance, the processing unit 806 is further configured to: determine (e.g., using determining unit 814) whether the first webpage is rendered in a foreground tab; in accordance with a determination that the first webpage is rendered in the foreground tab, display (e.g., using display unit 802) the audio control affordance having a first appearance; and in accordance with a determination that the first webpage is not rendered in the foreground tab, display (e.g., using display unit 802) the audio control affordance having a second appearance different from the first appearance.

In accordance with some embodiments, wherein to display the audio control affordance, the processing unit 806 is further configured to: determine (e.g., using determining unit 814) that the presentation of the audio content has been muted; and in accordance with a determination that the presentation of the audio content has been muted, display (e.g., using display unit 802) the audio control affordance having a third appearance different from the first appearance and the second appearance.

In accordance with some embodiments, wherein to display the audio control affordance in the second portion, the processing unit 806 is further configured to display (e.g., using display unit 802) the audio control affordance in a web address entry region of the browser interface.

In accordance with some embodiments, wherein to display the audio control affordance in the second portion, the processing unit 806 is further configured to display (e.g., using display unit 802) the audio control affordance in a tab of a second tabbed window from the set of tabbed windows within the browser interface.

In accordance with some embodiments, the processing unit 806 is further configured to: receive (e.g., using receiving unit 808) an eleventh input representing a selection of the tab, wherein the tab includes a third portion including the audio control affordance and a fourth portion configured to switch to the second tabbed window; in response to receiving the eleventh input, determine (e.g., using determining unit 814) whether the tenth input represents selection of the third portion or the fourth portion; in accordance with a determination that the eleventh input represents selection of the third portion, adjust (e.g., using adjusting unit 810) a property of the presentation of a third audio content associated with the second tabbed window without switching to the second tabbed window; and in accordance with a determination that the eleventh input represents selection of the fourth portion, switch (e.g., using switching unit 820) display to the second tabbed window as the foreground tabbed window.

In accordance with some embodiments, wherein to display the audio control affordance in the second portion, the processing unit 806 is further configured to one or both of: display (e.g., using display unit 802) an audio control affordance in an address bar of the browser interface, wherein the audio control affordance controls audio content for each tabbed window in the set of tabbed windows, or display (e.g., using display unit 802) one or more audio control affordances at each tabbed window from the set of tabbed windows, wherein the one or more audio control affordances control audio content for only the respective tabbed windows.

In accordance with some embodiments, wherein the set of tabbed windows includes a third tabbed window including fourth audio content that is not being played, wherein to display the audio control affordance, the processing unit 806 is further configured to: display (e.g., using display unit 802), in the tabbed window, the audio control affordance; and forgo display (e.g., using display unit 802), in the third tabbed window, of the audio control affordance.

In accordance with some embodiments, wherein to display the audio control affordance in the second portion, the processing unit 806 is further configured to display (e.g., using display unit 802) the audio control affordance in a webpage selection interface of the browser interface including one or more webpages.

In accordance with some embodiments, while the audio control affordance is displayed, the processing unit 806 is further configured to: display a second browser interface of the browser application; receive (e.g., using receiving unit 808) a twelfth input representing a selection of the audio control affordance; in response to receiving the twelfth input representing a selection of the audio control affordance, adjust (e.g., using adjusting unit 810) a property of a presentation of an audio content of one or more tabbed windows of the second browser interface.

In accordance with some embodiments, the processing unit 806 is further configured to: in accordance with a determination that a set of one or more audio control affordance display criteria are met, display (e.g., using display unit 802) the audio control affordance, wherein the audio control affordance display criteria include a criterion that is met when the audio content is presented.

In accordance with some embodiments, the audio control affordance display criteria include a criterion that the presentation of the audio content meets or exceeds a presentation time threshold.

In accordance with some embodiments, the audio content is one of a hypertext markup language embedded audio content, a web audio content, or a plug-in audio content.

The operations described above with reference to FIGS. 7A and 7B are, optionally, implemented by components depicted in FIGS. 1A-1B or FIG. 8. For example, displaying operation 702, determining operation 704, forgoing operation 706, displaying operation 708, receiving operation 710, adjusting operation 712, determining operation 714, ceasing operation 716, determining operation 718, and/or ceasing operation 720 can optionally be implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub event, such as activation of an affordance on a user interface. When a respective predefined event or sub-event is detected, event recognizer 180 activates an event handler 190 associated with the detection of the event or sub-event. Event handler 190 can optionally utilize or call data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying drawings, it is to be noted that various changes and modifications will become apparent to those skilled in the art. Such changes and modifications are to be understood as being included within the scope of the disclosure and examples as defined by the claims.

What is claimed is:

1. A non-transitory computer-readable storage medium comprising one or more programs for execution by one or more processors of an electronic device, the one or more programs including instructions which, when executed by the one or more processors, cause the electronic device to:
  display a browser interface of a browser application, the browser interface including a first portion configured to display content in a set of tabbed windows that include a plurality of tabbed windows and a second portion distinct from the first portion that includes one or more control affordances, wherein displaying the second portion of the browser interface includes:
    in accordance with a determination that a first tabbed window of the tabbed windows includes audio content, display an audio control affordance in the second portion of the browser interface, wherein the audio control affordance is displayed in a first tab of the first tabbed window from the set of tabbed windows;
  while the audio control affordance is displayed, receive a first input representing a selection of the audio control affordance;
  in response to receiving the first input representing the selection of the audio control affordance, determine whether a characteristic of the first input meets or exceeds a characteristic threshold;
    in accordance with a determination that the first input does not meet or exceed the characteristic threshold, adjust a property of the presentation of the audio content; and
    in accordance with a determination that the first input meets or exceeds the characteristic threshold, display a menu associated with the audio content, wherein the menu includes one or more affordances for interacting with background tabbed windows that have associated audio content, wherein the one or more affordances for interacting with background tabbed windows includes a first affordance;
  while a second tabbed window of the set of tabbed windows is a background tabbed window, and while a third tabbed window of the set of tabbed windows is a foreground tabbed window, receive a second input representing a selection of the first affordance; and
  in response to receiving the second input:
    switch the third tabbed window from a foreground tabbed window to a background tabbed window; and
    switch the second tabbed window from a background tabbed window to a foreground tabbed window.

2. The non-transitory computer-readable storage medium of claim 1, wherein the one or more programs include instructions which cause the electronic device to:
  while the audio control affordance is displayed, determine that presentation of the audio content has terminated; and
  in response to determining that presentation of the audio content has terminated, cease display of the audio control affordance.

3. The non-transitory computer-readable storage medium of claim 2, wherein the one or more programs include instructions which cause the electronic device to, in accordance with a determination that the set of one or more tabbed windows do not include audio content, forgo display of the audio control affordance in the second portion of the browser interface.

4. The non-transitory computer-readable storage medium of claim 1, wherein the one or more programs include instructions which cause the electronic device to:
while the audio control affordance is displayed, determine that presentation of the audio content has terminated; and
in response to determining that presentation of the audio content has terminated, change an appearance of the audio control affordance to indicate that the presentation of the audio content has terminated.

5. The non-transitory computer-readable storage medium of claim 1, wherein the audio content is associated with a webpage rendered in a background tab.

6. The non-transitory computer-readable storage medium of claim 1, wherein the menu associated with the audio content includes one or more of:
a second affordance that mutes presentation of the audio content associated with a foreground tabbed window of the browser application without adjusting presentation of the audio content associated with one or more other tabbed windows,
a third affordance that mutes presentation of an audio content associated with a background tabbed window of the browser application without adjusting presentation of the audio content associated with one or more other tabbed windows,
a fourth affordance that unmutes presentation of the audio content associated with a foreground tabbed window of the browser application without adjusting presentation of the audio content associated with one or more other tabbed windows,
a fifth affordance that unmutes presentation of the audio content associated with a background tabbed window of the browser application without adjusting presentation of the audio content associated with one or more other tabbed windows, and
one or more affordances indicating respective tabbed windows that are associated with audio content.

7. The non-transitory computer-readable storage medium of claim 6, wherein the one or more programs include instructions which cause the electronic device to:
receive a third input representing a selection of the second affordance; and
in response to receiving the third input, mute presentation of the audio content associated with a foreground tabbed window of the browser application without adjusting presentation of the audio content associated with one or more other tabbed windows.

8. The non-transitory computer-readable storage medium of claim 6, wherein the one or more programs include instructions which cause the electronic device to:
receive a fourth input representing a selection of the third affordance; and
in response to receiving the fourth input, mute presentation of an audio content associated with a background tabbed window of the browser application without adjusting presentation of the audio content associated with one or more other tabbed windows.

9. The non-transitory computer-readable storage medium of claim 6, wherein the one or more programs include instructions which cause the electronic device to:
receive a fifth input representing a selection of the fourth affordance; and
in response to receiving the fifth input, unmute presentation of the audio content associated with a foreground tabbed window of the browser application without adjusting presentation of the audio content associated with one or more other tabbed windows.

10. The non-transitory computer-readable storage medium of claim 6, wherein the one or more programs include instructions which cause the electronic device to:
receive a sixth input representing a selection of the fifth affordance; and
in response to receiving the sixth input, unmute presentation of the audio content associated with a background tabbed window of the browser application without adjusting presentation of the audio content associated with one or more other tabbed windows.

11. The non-transitory computer-readable storage medium of claim 1, wherein the menu associated with the audio content further includes one or more of:
a sixth affordance that mutes presentation of the audio content associated with a foreground tabbed window of the browser application and a second audio content associated with one or more other tabbed windows,
a seventh affordance that unmutes presentation of the audio content associated with the foreground tabbed window of the browser application and the second audio content associated with one or more other tabbed windows, and
an eighth affordance that mutes presentation of one or more audio contents associated with each background tabbed window of the browser application without adjusting presentation of the audio content associated with the foreground tabbed window.

12. The non-transitory computer-readable storage medium of claim 11, wherein the one or more programs include instructions which cause the electronic device to:
receive a seventh input representing a selection of the sixth affordance; and
in response to receiving the seventh input, mute presentation of the audio content associated with the foreground tabbed window of the browser application and a second audio content associated with one or more other tabbed windows.

13. The non-transitory computer-readable storage medium of claim 11, wherein the one or more programs include instructions which cause the electronic device to:
receive an eighth input representing a selection of the seventh affordance; and
in response to receiving the eighth input, unmute presentation of the audio content associated with the foreground tabbed window of the browser application and the second audio content associated with one or more other tabbed windows.

14. The non-transitory computer-readable storage medium of claim 11, wherein the one or more programs include instructions which cause the electronic device to:
receive an ninth input representing a selection of the eighth affordance; and
in response to receiving the ninth input, mute presentation of one or more audio contents associated with each background tabbed window of the browser application without adjusting presentation of the audio content associated with the foreground tabbed window.

15. The non-transitory computer-readable storage medium of claim 1, wherein the menu associated with the audio content further includes one or more of:

a ninth affordance that ceases presentation of the audio content associated with the first tabbed window and initiates presentation of a previous audio content associated with the first tabbed window, wherein the first tabbed window is displayed as one of a foreground tabbed window or a background tabbed window;

a tenth affordance that pauses presentation of the audio content associated with the first tabbed window; or an eleventh affordance that ceases presentation of the audio content associated with the first tabbed window and initiates presentation of a subsequent audio content associated with the first tabbed window.

16. The non-transitory computer-readable storage medium of claim 1, wherein the audio content is associated with a first webpage, and wherein to display the audio control affordance, the one or more programs include instructions which cause the electronic device to:

determine whether the first webpage is rendered in a foreground tab;
in accordance with a determination that the first webpage is rendered in the foreground tab, display the audio control affordance having a first appearance; and
in accordance with a determination that the first webpage is not rendered in the foreground tab, display the audio control affordance having a second appearance different from the first appearance.

17. The non-transitory computer-readable storage medium of claim 1, wherein to display the audio control affordance, the one or more programs include instructions which cause the electronic device to:

determine that the presentation of the audio content has been muted; and
in accordance with a determination that the presentation of the audio content has been muted, display the audio control affordance having a third appearance different from the first appearance and the second appearance.

18. The non-transitory computer-readable storage medium of claim 1, wherein to display the audio control affordance in the second portion, the one or more programs include instructions which cause the electronic device to display the audio control affordance in a web address entry region of the browser interface.

19. The non-transitory computer-readable storage medium of claim 1, wherein the one or more programs include instructions which cause the electronic device to:

receive a tenth input representing a selection of the first tab, wherein the first tab includes a third portion including the audio control affordance and a fourth portion configured to switch to the first tabbed window;
in response to receiving the tenth input, determine whether the tenth input represents selection of the third portion or the fourth portion;
in accordance with a determination that the tenth input represents selection of the third portion, adjust a property of the presentation of the audio content without switching to the first tabbed window; and
in accordance with a determination that the tenth input represents selection of the fourth portion, switch display to the first tabbed window as a foreground tabbed window.

20. The non-transitory computer-readable storage medium of claim 1, wherein to display the audio control affordance in the second portion, the one or more programs include instructions which cause the electronic device to one or both of:

display an audio control affordance in an address bar of the browser interface, wherein the audio control affordance controls audio content for each tabbed window in the set of tabbed windows, or
display one or more audio control affordances at each tabbed window from the set of tabbed windows, wherein the one or more audio control affordances control audio content for only the respective tabbed windows.

21. The non-transitory computer-readable storage medium of claim 1, wherein the set of tabbed windows includes a fourth tabbed window including fourth audio content that is not being played, wherein to display the audio control affordance, the one or more programs include instructions which cause the electronic device to:

display, in the tabbed window, the audio control affordance; and
forgo display, in the fourth tabbed window, of the audio control affordance.

22. The non-transitory computer-readable storage medium of claim 1, wherein to display the audio control affordance in the second portion, the one or more programs include instructions which cause the electronic device to display the audio control affordance in a webpage selection interface of the browser interface including one or more webpages.

23. The non-transitory computer-readable storage medium of claim 1, while the audio control affordance is displayed, the one or more programs include instructions which cause the electronic device to:

display a second browser interface of the browser application;
receive an eleventh input representing a selection of the audio control affordance; and
in response to receiving the eleventh input representing a selection of the audio control affordance, adjust a property of a presentation of an audio content of one or more tabbed windows of the second browser interface.

24. The non-transitory computer-readable storage medium of claim 1, wherein the one or more programs include instructions which cause the electronic device to:

in accordance with a determination that a set of one or more audio control affordance display criteria are met, display the audio control affordance,
wherein the audio control affordance display criteria include a criterion that is met when the audio content is presented.

25. The non-transitory computer-readable storage medium of claim 24, wherein the audio control affordance display criteria include a criterion that the presentation of the audio content meets or exceeds a presentation time threshold.

26. The non-transitory computer-readable storage medium of claim 1, wherein the audio content is one of a hypertext markup language embedded audio content, a web audio content, or a plug-in audio content.

27. A method, comprising:
at an electronic device including a display and one or more audio output devices:
displaying, on a display, a browser interface of a browser application, the browser interface including a first portion configured to display content in a set of tabbed windows that include a plurality of tabbed windows and a second portion distinct from the first portion that includes one or more control affordances, wherein displaying the second portion of the browser interface includes:

determining that a first tabbed window of the tabbed windows includes audio content;

in accordance with the determination that a first tabbed window of the tabbed windows includes audio content, displaying an audio control affordance in the second portion of the browser interface, wherein the audio control affordance is displayed in a first tab of the first tabbed window from the set of tabbed windows;

while the audio control affordance is displayed, receiving a first input representing a selection of the audio control affordance;

in response to receiving the first input representing the selection of the audio control affordance, determining that a characteristic of the first input meets or exceeds a characteristic threshold;

in accordance with the determination that the first input meets or exceeds the characteristic threshold, displaying a menu associated with the audio content, wherein the menu includes one or more affordances for interacting with background tabbed windows that have associated audio content, wherein the one or more affordances for interacting with background tabbed windows includes a first affordance;

while a second tabbed window of the set of tabbed windows is a background tabbed window, and while a third tabbed window of the set of tabbed windows is a foreground tabbed window, receiving a second input representing a selection of the first affordance; and in response to receiving the second input:

switching the third tabbed window from a foreground tabbed window to a background tabbed window; and switching the second tabbed window from a background tabbed window to a foreground tabbed window.

28. The method of claim 27, further comprising:

while the audio control affordance is displayed, determining that presentation of the audio content has terminated; and in response to determining that presentation of the audio content has terminated, ceasing display of the audio control affordance.

29. The method of claim 28, further comprising: in accordance with a determination that the set of one or more tabbed windows do not include audio content, forgoing display of the audio control affordance in the second portion of the browser interface.

30. The method of claim 27, further comprising:

while the audio control affordance is displayed, determining that presentation of the audio content has terminated; and in response to determining that presentation of the audio content has terminated, changing an appearance of the audio control affordance to indicate that the presentation of the audio content has terminated.

31. The method of claim 27, wherein the audio content is associated with a webpage rendered in a background tab.

32. The method of claim 27, wherein the menu associated with the audio content includes one or more of:

a second affordance that mutes presentation of the audio content associated with a foreground tabbed window of the browser application without adjusting presentation of the audio content associated with one or more other tabbed windows, a third affordance that mutes presentation of an audio content associated with a background tabbed window of the browser application without adjusting presentation of the audio content associated with one or more other tabbed windows, a fourth affordance that unmutes presentation of the audio content associated with a foreground tabbed window of the browser application without adjusting presentation of the audio content associated with one or more other tabbed windows, a fifth affordance that unmutes presentation of the audio content associated with a background tabbed window of the browser application without adjusting presentation of the audio content associated with one or more other tabbed windows, and one or more affordances indicating respective tabbed windows that are associated with audio content.

33. The method of claim 32, further comprising:

receiving a third input representing a selection of the second affordance; and in response to receiving the third input, muting presentation of the audio content associated with a foreground tabbed window of the browser application without adjusting presentation of the audio content associated with one or more other tabbed windows.

34. The method of claim 32, further comprising:

receiving a fourth input representing a selection of the third affordance; and in response to receiving the fourth input, muting presentation of an audio content associated with a background tabbed window of the browser application without adjusting presentation of the audio content associated with one or more other tabbed windows.

35. The method of claim 32, further comprising:

receiving a fifth input representing a selection of the fourth affordance; and in response to receiving the fifth input, unmuting presentation of the audio content associated with a foreground tabbed window of the browser application without adjusting presentation of the audio content associated with one or more other tabbed windows.

36. The method of claim 32, further comprising:

receiving a sixth input representing a selection of the fifth affordance; and in response to receiving the sixth input, unmuting presentation of the audio content associated with a background tabbed window of the browser application without adjusting presentation of the audio content associated with one or more other tabbed windows.

37. The method of claim 27, wherein the menu associated with the audio content further includes one or more of:

a sixth affordance that mutes presentation of the audio content associated with a foreground tabbed window of the browser application and a second audio content associated with one or more other tabbed windows, a seventh affordance that unmutes presentation of the audio content associated with the foreground tabbed window of the browser application and the second audio content associated with one or more other tabbed windows, and an eighth affordance that mutes presentation of one or more audio contents associated with each background tabbed window of the browser application without adjusting presentation of the audio content associated with the foreground tabbed window.

38. The method of claim 37, further comprising:

receiving a seventh input representing a selection of the sixth affordance; and in response to receiving the seventh input, muting presentation of the audio content associated with the foreground tabbed window of the browser application and a second audio content associated with one or more other tabbed windows.

39. The method of claim 37, further comprising:
receiving an eighth input representing a selection of the seventh affordance; and
in response to receiving the eighth input, unmuting presentation of the audio content associated with the foreground tabbed window of the browser application and the second audio content associated with one or more other tabbed windows.

40. The method of claim 37, further comprising:
receiving an ninth input representing a selection of the eighth affordance; and
in response to receiving the ninth input, muting presentation of one or more audio contents associated with each background tabbed window of the browser application without adjusting presentation of the audio content associated with the foreground tabbed window.

41. The method of claim 27, wherein the menu associated with the audio content further includes one or more of:
a ninth affordance that ceases presentation of the audio content associated with the first tabbed window and initiates presentation of a previous audio content associated with the first tabbed window, wherein the first tabbed window is displayed as one of a foreground tabbed window or a background tabbed window;
a tenth affordance that pauses presentation of the audio content associated with the first tabbed window; or
an eleventh affordance that ceases presentation of the audio content associated with the first tabbed window and initiates presentation of a subsequent audio content associated with the first tabbed window.

42. The method of claim 27, wherein the audio content is associated with a first webpage, and wherein displaying the audio control affordance comprises:
determining whether the first webpage is rendered in a foreground tab;
in accordance with a determination that the first webpage is rendered in the foreground tab, displaying the audio control affordance having a first appearance; and
in accordance with a determination that the first webpage is not rendered in the foreground tab, displaying the audio control affordance having a second appearance different from the first appearance.

43. The method of claim 27, wherein displaying the audio control affordance comprises:
determining that the presentation of the audio content has been muted; and
in accordance with a determination that the presentation of the audio content has been muted, displaying the audio control affordance having a third appearance different from the first appearance and the second appearance.

44. The method of claim 27, wherein displaying the audio control affordance in the second portion comprises displaying the audio control affordance in a web address entry region of the browser interface.

45. The method of claim 27, further comprising:
receiving a tenth input representing a selection of the first tab, wherein the first tab includes a third portion including the audio control affordance and a fourth portion configured to switch to the first tabbed window;
in response to receiving the tenth input, determining whether the tenth input represents selection of the third portion or the fourth portion;
in accordance with a determination that the tenth input represents selection of the third portion, adjusting a property of the presentation of the audio content without switching to the first tabbed window; and
in accordance with a determination that the tenth input represents selection of the fourth portion, switching display to the first tabbed window as a foreground tabbed window.

46. The method of claim 27, wherein displaying the audio control affordance in the second portion comprises one or both of:
displaying an audio control affordance in an address bar of the browser interface, wherein the audio control affordance controls audio content for each tabbed window in the set of tabbed windows, or
displaying one or more audio control affordances at each tabbed window from the set of tabbed windows, wherein the one or more audio control affordances control audio content for only the respective tabbed windows.

47. The method of claim 27, wherein the set of tabbed windows includes a fourth tabbed window including fourth audio content that is not being played, wherein displaying the audio control affordance comprises:
displaying, in the tabbed window, the audio control affordance; and
forgoing display, in the fourth tabbed window, of the audio control affordance.

48. The method of claim 27, wherein displaying the audio control affordance in the second portion comprises displaying the audio control affordance in a webpage selection interface of the browser interface including one or more webpages.

49. The method of claim 27, further comprising, while the audio control affordance is displayed:
displaying a second browser interface of the browser application;
receiving an eleventh input representing a selection of the audio control affordance; and
in response to receiving the eleventh input representing a selection of the audio control affordance, adjusting a property of a presentation of an audio content of one or more tabbed windows of the second browser interface.

50. The method of claim 27, further comprising:
in accordance with a determination that a set of one or more audio control affordance display criteria are met, displaying the audio control affordance,
wherein the audio control affordance display criteria include a criterion that is met when the audio content is presented.

51. The method of claim 50, wherein the audio control affordance display criteria include a criterion that the presentation of the audio content meets or exceeds a presentation time threshold.

52. The method of claim 27, wherein the audio content is one of a hypertext markup language embedded audio content, a web audio content, or a plug-in audio content.

53. An electronic device, comprising:
one or more processors;
memory;
a display and one or more audio output devices each coupled to the one or more processors and memory; and
one or more programs stored in memory, the one or more programs including instructions for:
displaying, on the display, a browser interface of a browser application, the browser interface including a first portion configured to display content in a set of tabbed windows that include a plurality of tabbed windows and a second portion distinct from the first portion that includes one or more control affordances, wherein displaying the second portion of the browser interface includes:
   in accordance with a determination that a first tabbed window of the tabbed windows includes audio content, displaying an audio control affordance in the second portion of the browser interface, wherein the audio control affordance is displayed in a first tab of the first tabbed window from the set of tabbed windows;
   while the audio control affordance is displayed, receiving a first input representing a selection of the audio control affordance;
   in response to receiving the first input representing the selection of the audio control affordance, determining whether a characteristic of the first input meets or exceeds a characteristic threshold;
   in accordance with a determination that the first input does not meet or exceed the characteristic threshold, adjusting a property of the presentation of the audio content; and
   in accordance with a determination that the first input meets or exceeds the characteristic threshold, displaying a menu associated with the audio content, wherein the menu includes one or more affordances for interacting with background tabbed windows that have associated audio content, wherein the one or more affordances for interacting with background tabbed windows includes a first affordance;
   while a second tabbed window of the set of tabbed windows is a background tabbed window, and while a third tabbed window of the set of tabbed windows is a foreground tabbed window, receiving a second input representing a selection of the first affordance; and
   in response to receiving the second input:
     switch the third tabbed window from a foreground tabbed window to a background tabbed window; and
     switch the second tabbed window from a background tabbed window to a foreground tabbed window.

54. The electronic device of claim 53, wherein the one or more programs include instructions for:
   while the audio control affordance is displayed, determining that presentation of the audio content has terminated; and
   in response to determining that presentation of the audio content has terminated, ceasing display of the audio control affordance.

55. The electronic device of claim 54, wherein the one or more programs include instructions for, in accordance with a determination that the set of one or more tabbed windows do not include audio content, forgoing display of the audio control affordance in the second portion of the browser interface.

56. The electronic device of claim 53, wherein the one or more programs include instructions for:
   while the audio control affordance is displayed, determining that presentation of the audio content has terminated; and
   in response to determining that presentation of the audio content has terminated, changing an appearance of the audio control affordance to indicate that the presentation of the audio content has terminated.

57. The electronic device of claim 53, wherein the audio content is associated with a webpage rendered in a background tab.

58. The electronic device of claim 53, wherein the menu associated with the audio content includes one or more of:
   a second affordance that mutes presentation of the audio content associated with a foreground tabbed window of the browser application without adjusting presentation of the audio content associated with one or more other tabbed windows,
   a third affordance that mutes presentation of an audio content associated with a background tabbed window of the browser application without adjusting presentation of the audio content associated with one or more other tabbed windows,
   a fourth affordance that unmutes presentation of the audio content associated with a foreground tabbed window of the browser application without adjusting presentation of the audio content associated with one or more other tabbed windows,
   a fifth affordance that unmutes presentation of the audio content associated with a background tabbed window of the browser application without adjusting presentation of the audio content associated with one or more other tabbed windows, and
   one or more affordances indicating respective tabbed windows that are associated with audio content.

59. The electronic device of claim 58, wherein the one or more programs include instructions for:
   receiving a third input representing a selection of the second affordance; and
   in response to receiving the third input, muting presentation of the audio content associated with a foreground tabbed window of the browser application without adjusting presentation of the audio content associated with one or more other tabbed windows.

60. The electronic device of claim 58, wherein the one or more programs include instructions for:
   receiving a fourth input representing a selection of the third affordance; and
   in response to receiving the fourth input, muting presentation of an audio content associated with a background tabbed window of the browser application without adjusting presentation of the audio content associated with one or more other tabbed windows.

61. The electronic device of claim 58, wherein the one or more programs include instructions for:
   receiving a fifth input representing a selection of the fourth affordance; and
   in response to receiving the fifth input, unmuting presentation of the audio content associated with a foreground tabbed window of the browser application without adjusting presentation of the audio content associated with one or more other tabbed windows.

62. The electronic device of claim 58, wherein the one or more programs include instructions for:
   receiving a sixth input representing a selection of the fifth affordance; and
   in response to receiving the sixth input, unmuting presentation of the audio content associated with a background tabbed window of the browser application without adjusting presentation of the audio content associated with one or more other tabbed windows.

63. The electronic device of claim 53, wherein the menu associated with the audio content further includes one or more of:
- a sixth affordance that mutes presentation of the audio content associated with a foreground tabbed window of the browser application and a second audio content associated with one or more other tabbed windows,
- a seventh affordance that unmutes presentation of the audio content associated with the foreground tabbed window of the browser application and the second audio content associated with one or more other tabbed windows, and
- an eighth affordance that mutes presentation of one or more audio contents associated with each background tabbed window of the browser application without adjusting presentation of the audio content associated with the foreground tabbed window.

64. The electronic device of claim 63, wherein the one or more programs include instructions for:
- receiving a seventh input representing a selection of the sixth affordance; and
- in response to receiving the seventh input, muting presentation of the audio content associated with the foreground tabbed window of the browser application and a second audio content associated with one or more other tabbed windows.

65. The electronic device of claim 63, wherein the one or more programs include instructions for:
- receiving an eighth input representing a selection of the seventh affordance; and
- in response to receiving the eighth input, unmuting presentation of the audio content associated with the foreground tabbed window of the browser application and the second audio content associated with one or more other tabbed windows.

66. The electronic device of claim 63, wherein the one or more programs include instructions for:
- receiving an ninth input representing a selection of the eighth affordance; and
- in response to receiving the ninth input, muting presentation of one or more audio contents associated with each background tabbed window of the browser application without adjusting presentation of the audio content associated with the foreground tabbed window.

67. The electronic device of claim 53, wherein the menu associated with the audio content further includes one or more of:
- a ninth affordance that ceases presentation of the audio content associated with the first tabbed window and initiates presentation of a previous audio content associated with the first tabbed window, wherein the first tabbed window is displayed as one of a foreground tabbed window or a background tabbed window;
- a tenth affordance that pauses presentation of the audio content associated with the first tabbed window; or
- an eleventh affordance that ceases presentation of the audio content associated with the first tabbed window and initiates presentation of a subsequent audio content associated with the first tabbed window.

68. The electronic device of claim 53, wherein the audio content is associated with a first webpage, and wherein displaying the audio control affordance comprises:
- determining whether the first webpage is rendered in a foreground tab;
- in accordance with a determination that the first webpage is rendered in the foreground tab, displaying the audio control affordance having a first appearance; and
- in accordance with a determination that the first webpage is not rendered in the foreground tab, displaying the audio control affordance having a second appearance different from the first appearance.

69. The electronic device of claim 53, wherein displaying the audio control affordance comprises:
- determining that the presentation of the audio content has been muted; and
- in accordance with a determination that the presentation of the audio content has been muted, displaying the audio control affordance having a third appearance different from the first appearance and the second appearance.

70. The electronic device of claim 53, wherein displaying the audio control affordance in the second portion comprises displaying the audio control affordance in a web address entry region of the browser interface.

71. The electronic device of claim 53, wherein the one or more programs include instructions for:
- receiving a tenth input representing a selection of the first tab, wherein the first tab includes a third portion including the audio control affordance and a fourth portion configured to switch to the first tabbed window;
- in response to receiving the tenth input, determining whether the tenth input represents selection of the third portion or the fourth portion;
  - in accordance with a determination that the tenth input represents selection of the third portion, adjusting a property of the presentation of the audio content without switching to the first tabbed window; and
  - in accordance with a determination that the tenth input represents selection of the fourth portion, switching display to the first tabbed window as a foreground tabbed window.

72. The electronic device of claim 53, wherein displaying the audio control affordance in the second portion comprises one or both of:
- displaying an audio control affordance in an address bar of the browser interface, wherein the audio control affordance controls audio content for each tabbed window in the set of tabbed windows, or
- displaying one or more audio control affordances at each tabbed window from the set of tabbed windows, wherein the one or more audio control affordances control audio content for only the respective tabbed windows.

73. The electronic device of claim 53, wherein the set of tabbed windows includes a fourth tabbed window including fourth audio content that is not being played, and wherein displaying the audio control affordance comprises:
- displaying, in the tabbed window, the audio control affordance; and
- forgoing display, in the fourth tabbed window, of the audio control affordance.

74. The electronic device of claim 53, wherein displaying the audio control affordance in the second portion comprises displaying the audio control affordance in a webpage selection interface of the browser interface including one or more webpages.

75. The electronic device of claim 53, wherein the one or more programs include instructions for, while the audio control affordance is displayed:

displaying a second browser interface of the browser application;

receiving an eleventh input representing a selection of the audio control affordance; and in response to receiving the eleventh input representing a selection of the audio control affordance, adjusting a property of a presentation of an audio content of one or more tabbed windows of the second browser interface.

76. The electronic device of claim 53, wherein the one or more programs include instructions for:

in accordance with a determination that a set of one or more audio control affordance display criteria are met, displaying the audio control affordance, wherein the audio control affordance display criteria include a criterion that is met when the audio content is presented.

77. The electronic device of claim 76, wherein the audio control affordance display criteria include a criterion that the presentation of the audio content meets or exceeds a presentation time threshold.

78. The electronic device of claim 53, wherein the audio content is one of a hypertext markup language embedded audio content, a web audio content, or a plug-in audio content.

* * * * *